United States Patent
Kidambi et al.

(10) Patent No.: US 10,318,614 B2
(45) Date of Patent: *Jun. 11, 2019

(54) TRANSFORMATION OF MARKED-UP CONTENT INTO A FILE FORMAT THAT ENABLES AUTOMATED BROWSER BASED PAGINATION

(71) Applicant: TNQ Books and Journals Private Limited, Chennai (IN)

(72) Inventors: Venkatesan Sumangali Kidambi, Chennai (IN); Bhaskar Mannargudi Venkatraman, Chennai (IN); Srikanth Vittal, Chennai (IN)

(73) Assignee: TNQ Books and Journals Private Limited, Chennai (IN)

( * ) Notice: Subject to any disclaimer, the term of this patent is extended or adjusted under 35 U.S.C. 154(b) by 0 days.

This patent is subject to a terminal disclaimer.

(21) Appl. No.: 15/695,017

(22) Filed: Sep. 5, 2017

(65) Prior Publication Data

US 2017/0364485 A1 Dec. 21, 2017

Related U.S. Application Data

(63) Continuation-in-part of application No. 15/551,292, filed on Aug. 16, 2017.

(30) Foreign Application Priority Data

Jul. 1, 2015 (IN) .......................... 3348/CHE/2015
Jun. 22, 2016 (WO) ................. PCT/IN2016/000159
Mar. 30, 2017 (IN) ............................. 201743011293

(51) Int. Cl.
*G06F 17/00* (2019.01)
*G06F 17/21* (2006.01)
(Continued)

(52) U.S. Cl.
CPC .......... *G06F 17/217* (2013.01); *G06F 16/258* (2019.01); *G06F 17/218* (2013.01);
(Continued)

(58) Field of Classification Search
CPC ............................. G06F 17/217; G06F 17/211
See application file for complete search history.

(56) References Cited

U.S. PATENT DOCUMENTS 5,336,124 A * 8/1994 Garside .................. A22B 5/161
452/125
5,779,154 A * 7/1998 Martin .................. B05B 7/2462
239/310

(Continued)

OTHER PUBLICATIONS

Alfie Abdul-Rahman, Roger Gimson, John Lumley, Automatic Pagination of HTML Documents in a Web Browser, Hewlett-Packard Labs, Long Down Avenue, Bristol BS34 8QZ, UK {alfie.abdul-rahman, roger.gimson, john.lumley}@hp.com, Jul. 24, 2009.

*Primary Examiner* — Laurie A Ries
(74) *Attorney, Agent, or Firm* — Ashok Tankha

(57) ABSTRACT

A method and a file format transformation system (FFTS) for transforming marked-up content in a first file format (FFF) to a second file format (SFF) that enables automated browser based pagination are provided. The FFTS reflows marked-up content of the FFF into a continuous page. The FFTS generates and appends tags to spaces and block elements identified in the reflown marked-up content of the FFF. For each space and block element, the FFTS determines and tags line breaks in the reflown marked-up content. For each line break, the FFTS identifies, tags, and positions anchored floats and footnotes on a current page based on space availability. The FFTS positions page breaks in the continuous page based on a configurable page height and the line breaks. The FFTS groups the marked-up content, inserts (Continued)

pagination elements and renders the grouped marked-up content in the SFF based on a selected level of reversibility.

25 Claims, 41 Drawing Sheets

(51) Int. Cl.
    *G06K 9/00*         (2006.01)
    *G06F 17/28*       (2006.01)
    *G06F 17/24*       (2006.01)
    *G06F 16/25*       (2019.01)
    *G06F 17/22*       (2006.01)
    *G06F 17/26*       (2006.01)

(52) U.S. Cl.
    CPC ........ *G06F 17/227* (2013.01); *G06F 17/2247* (2013.01); *G06F 17/2294* (2013.01); *G06F 17/24* (2013.01); *G06F 17/248* (2013.01); *G06F 17/26* (2013.01); *G06F 17/289* (2013.01); *G06K 9/00463* (2013.01); *G06F 17/2229* (2013.01)

(56) References Cited

U.S. PATENT DOCUMENTS

| | | | | |
|---|---|---|---|---|
| 5,789,229 A * | 8/1998 | Wertz | | C07K 14/005 435/235.1 |
| 5,845,303 A * | 12/1998 | Templeman | | G06F 17/2264 715/255 |
| 6,336,124 B1 | 1/2002 | Alam et al. | | |
| 6,556,217 B1 * | 4/2003 | Makipaa | | G06F 17/217 345/667 |
| 6,779,154 B1 | 8/2004 | Nussbaum et al. | | |
| 6,789,229 B1 | 9/2004 | Dunietz et al. | | |
| 7,028,258 B1 * | 4/2006 | Thacker | | G06F 17/217 345/660 |
| 7,496,835 B1 * | 2/2009 | Chen | | G06F 17/211 715/234 |
| 7,496,838 B2 * | 2/2009 | Salter | | G06F 17/2247 715/239 |
| 7,533,110 B2 * | 5/2009 | Kreiner | | G06F 17/2247 |
| 7,647,553 B2 * | 1/2010 | Mogilevsky | | G06F 17/212 715/234 |
| 7,653,876 B2 * | 1/2010 | Ethier | | G06F 17/218 715/249 |
| 7,844,889 B2 * | 11/2010 | Rohrabaugh | | H04L 67/2823 715/200 |
| 8,375,294 B2 * | 2/2013 | Toebes | | G06F 17/24 715/234 |
| 2006/0248440 A1 * | 11/2006 | Rhoads | | G06F 17/30728 715/236 |
| 2006/0259524 A1 * | 11/2006 | Horton | | G06F 17/2288 |
| 2008/0028335 A1 * | 1/2008 | Rohrabaugh | | H04L 67/2823 715/800 |
| 2009/0089657 A1 * | 4/2009 | Davis | | G06F 16/9558 715/234 |
| 2009/0125802 A1 * | 5/2009 | Chen | | G06F 17/2247 715/234 |
| 2009/0165339 A1 * | 7/2009 | Watanabe | | E02F 9/2816 37/454 |
| 2010/0177970 A1 * | 7/2010 | King | | G06F 17/218 382/229 |
| 2011/0131482 A1 * | 6/2011 | Shteinvil | | G06F 17/218 715/229 |
| 2013/0334300 A1 * | 12/2013 | Evans | | G06F 17/30017 235/375 |
| 2014/0075273 A1 * | 3/2014 | Fisher | | G06F 17/2264 715/201 |
| 2014/0331125 A1 * | 11/2014 | Tigchelaar | | G06F 17/211 715/249 |
| 2015/0199314 A1 * | 7/2015 | Ratnakar | | G06F 17/24 715/255 |
| 2016/0026730 A1 * | 1/2016 | Hasan | | G06F 16/986 715/234 |
| 2017/0116179 A1 * | 4/2017 | Gagne-Langevin | | G06F 17/24 |

* cited by examiner

| ARTICLE | SUPPLEMENTARY | MODE | EDIT | PROOF | are properties of water. Furthermore, using data from published data on oxygen solubility in water, it was found that solubility bears a linear and inverse relationship with the mass transfer coefficient.

Keywords: Physics methods; Physical chemistry; Energy; Chemical engineering; Civil engineering

1 Introduction

The main objective is to develop a mechanistic model to replace the current empirical model in the evaluation of the standardized mass transfer coefficient ($Kla_{20}$) being used by the ASCE Standard 2-06 [1, 2, 3]. The topic is about gas transfer in water, (how much and how fast), in response to changes in water temperature. This topic is important in wastewater treatment, fermentation, and other types of bioreactors. The capacity to absorb gas into liquid is usually expressed as solubility, Cs; whereas the mass transfer coefficient represents the speed of transfer, Kla, (in addition to the concentration gradient between the gas phase and the liquid phase which is not discussed here). These two factors, capacity, and speed, are related and the manuscript advocates the hypothesis that they are inversely proportional to each other, i.e., the higher the water temperature, the faster the transfer rate, but at the same time less gas will be transferred.

This hypothesis was difficult to prove because there is not enough literature or experimental data to support it. (Some data do support it, but they are approximate, because some other factors skew the relationship, for example, concentration gradient; and the hypothesis is only correct if these other factors are normalized or held constant) [4].

FIG. 4A

| ARTICLE | SUPPLEMENTARY | MODE | ✓ EDIT | ⌕ PROOF | SESSION REPORT | HELP | SAVE | SUBMIT | are properties of water. Furthermore, using data from published data on oxygen solubility in water, it was found that solubility bears a linear and inverse relationship with the mass transfer coefficient.

Keywords: Physics methods; Physical chemistry; Energy; Chemical engineering; Civil engineering

1 Introduction

The main objective is to develop a mechanistic model to replace the current empirical model in the evaluation of the standardized mass transfer coefficient ($Kla_{20}$) being used by the ASCE Standard 2-06 [1, 2, 3]. The topic is about gas transfer in water, (how much and how fast), in response to changes in water temperature. This topic is important in wastewater treatment, fermentation, and other types of bioreactors. The capacity to absorb gas into liquid is usually expressed as solubility, Cs; whereas the mass transfer coefficient represents the speed of transfer, Kla, (in addition to the concentration gradient between the gas phase and the liquid phase which is not discussed here). These two factors, capacity, and speed, are related and the manuscript advocates the hypothesis that they are inversely proportional to each other, i.e., the higher the water temperature, the faster the transfer rate, but at the same time less gas will be transferred.

This hypothesis was difficult to support it. (Some data do support it, but they are approximate, because some other factors skew the relationship, for example, concentration gradient; and the hypothesis is only correct if these other factors are normalized or held constant) [4].

QUICKLINKS

⑥ QUERIES

◁ Q1 Q2 Q3 Q4 Q5 Q6 ▷

THE AUTHOR NAMES HAVE BEEN TAGGED AS GIVEN NAMES AND SURNAMES (SURNAMES ARE HIGHLIGHTED IN TEAL COLOR). PLEASE CONFIRM IF THEY HAVE BEEN IDENTIFIED CORRECTLY $B.1...X_2...X^2...\Omega$

ATTACH (OPTIONAL) LIMIT UPTO 20MB/FILE

| CHOOSE FILE | NO FILE CHOSEN |

EDIT LOG

▼ MODE [EDIT] [PROOF] [↓]

Journal logo      Article No-c00248

$$Kla_{20} = Kla\frac{(E\rho\sigma)_{20}}{(E\rho\sigma)_T}(\frac{T_{20}}{T})^s$$

where T is in degree Kelvin, and the subscripts refer to degree Celsius; E, ρ, σ are properties of water. Furthermore, using data from published data on oxygen solubility in water, it was found that solubility bears a linear and inverse relationship with the mass transfer coefficient.

Keywords: Physics methods; Physical chemistry; Energy; Chemical engineering
Civil engineering

1. Introduction

The main objective is to develop a mechanistic model to replace the current empirical model in the evaluation of the standardized mass transfer coefficient ($Kla_{20}$) being used by the ASCE Standard 2-06 [1, 2, 3]. The topic is about gas transfer in water, (how much and how fast), in response to changes in water temperature. This topic is important in wastewater treatment, fermentation, and other types of bioreactors. The capacity to absorb gas into liquid is usually expressed as solubility, Cs; whereas the mass transfer coefficient represents the speed of transfer, Kla, (in addition to the concentration gradient between the gas phase and the liquid phase which is not discussed here). These two factors, capacity, and speed, are related and the manuscript advocates the hypothesis that they are inversely proportional to each other, i.e., the higher the water temperature, the faster the transfer rate, but at the same time less gas will be transferred.

This hypothesis was difficult to prove because there is not enough literature or experimental data to support it. (Some data do support it, but they are approximate, because some other factors skew the relationship, for example, concentration gradient; and the hypothesis is only correct if these other factors are normalized or held constant) [4].

2   http://dx.doi.org/10.1016/j.heliyon.2017.e00248
2405-8440/©2016 Published by <Publisher_Name>. This is an open access article under the CC BY-NC-ND license
(http://creativecommons.org/licenses/byncnd/4.0/).

FIG. 4C

╔══════════════════════════════════════════╗
| ARTICLE | SUPPLEMENTARY | MODE | ✏ EDIT | 🔍 PROOF |

Development of a model to determine mass transfer coefficient and oxygen solubility in bioreactors

Johnny ~~Lee~~*
fearlessflyingman@gmail.com
Kitchener, Waterloo, Ontario, Canada
*Corresponding author at: 317 Pine Valley Drive, Kitchener, Ontario, N2 P 2V5, Canada.

Abstract

The ~~objective~~ aim of this paper is to present an experimentally validated mechanistic model to predict the oxygen transfer rate coefficient (Kla) in aeration tanks for different water temperatures. Using experimental data created by Hunter [1] and Vogelaar [2], the formula precisely reproduces experimental results for the standardized Kla at 20°C, comparatively better than the current model used by ASCE 2-06 based on the equation $Kla_{20} = Kla \cdot \theta^{(20-T)}$ where T is in °C. Currently, reported values for $\theta$ range from 1.008 to 1.047. Because it is a geometric function, large error can result if an incorrect value of $\theta$ is used. Establishment of such value for an aeration system can only be made by means of series of full scale testing over a range of temperatures required. The new model predicts oxygen transfer coefficients to within 1% error compared to observed measurements. This is a breakthrough since the correct prediction of the volumetric mass transfer coefficient (Kla) is a crucial step in the design, operation and scale up of bioreactors including

FIG. 8A

| ARTICLE | SUPPLEMENTARY | MODE | EDIT | PROOF | SESSION REPORT | HELP | SAVE | SUBMIT |

Development of a model to determine mass transfer coefficient and oxygen solubility in bioreactors

Johnny Lee*
fearlessflyingman@gmail.com
Kitchener, Waterloo, Ontario, Canada
*Corresponding author at: 317 Pine Valley Drive, Kitchener, Ontario, N2 P 2V5, Canada.

Abstract

The ~~objectiveaim~~ of this paper is to present an experimentally validated mechanistic model to predict the oxygen transfer rate coefficient (Kla) in aeration tanks for different water temperatures. Using experimental data created by Hunter [1] and Vogelaar [2], the formula precisely reproduces experimental results for the standardized Kla at 20°C, comparatively better than the current model used by ASCE 2-06 based on the equation $Kla_{20} = Kla \cdot \theta^{(20-T)}$ where T is in °C. Currently, reported values for θ range from 1.008 to 1.047. Because it is a geometric function, large error can result if an incorrect value of θ is used. Establishment of such value for an aeration system can only be made by means of series of full scale testing over a range of temperatures required. The new model predicts oxygen transfer coefficients to within 1% error compared to observed measurements. This is a breakthrough since the correct prediction of the volumetric mass transfer coefficient (Kla) is a crucial step in the design, operation and scale up of bioreactors including

QUICKLINKS
QUERIES
Q1 Q2 Q3 Q4 Q5 Q6

THE AUTHOR NAMES HAVE BEEN TAGGED AS GIVEN NAMES AND SURNAMES (SURNAMES ARE HIGHLIGHTED IN TEAL COLOR). PLEASE CONFIRM IF THEY HAVE BEEN IDENTIFIED CORRECTLY $B \ 1 \ ... \ X_2 \ ... \ X^2 \ ... \ \Omega$

ATTACH (OPTIONAL) LIMIT UPTO 20MB/FILE

CHOOSE FILE  NO FILE CHOSEN

EDIT LOG

FIG. 8B

| ARTICLE | SUPPLEMENTARY | MODE | ✓EDIT | ⌕PROOF |

In the application of the temperature correction model for $Kla_{20}$, therefore, $Kla_{20}$ is obtained by multiplying $Kla_T$ by the correction number N in column 8 at the test temperature T.

4.3 The solubility model

As mentioned in the introduction, the author advocates the hypothesis that solubility is inversely proportional to Kla. The foregoing sections have established that Kla is related directly to the 5th order of temperature. If this hypothesis is true, then one would expect the solubility also bears a 5th order relationship with temperature, but in an inverse manner. The following sections illustrate that solubility is indeed related to the 5th order of temperature using published scientific data. This section is significant for 2 reasons:

First, a new physical law is discovered. By definition according to Oxford English dictionary, a physical law 'is a theoretical principle deduced from particular facts, applicable to a defined group or class of phenomena, and expressible by the statement that a particular phenomenon always occurs if certain conditions be present.' The rationale behind the solubility law is similar to the Universal Gas Law which is in fact an extension of Boyle's Law or Charles' Law. As Boyle's Law states that for a fixed temperature, volume is inversely proportional to pressure; so the Universal Gas Law states that, for any pressure and temperature, volume is

FIG. 8D

| ARTICLE | SUPPLEMENTARY | | MODE | ✓EDIT | ◯PROOF | | SESSION REPORT | HELP | SAVE | SUBMIT |

401 → 803 402

QUICKLINKS

QUERIES
◁ Q1 | Q2 | Q3 | Q4 | Q5 | Q6

THE AUTHOR NAMES HAVE BEEN TAGGED AS GIVEN NAMES AND SURNAMES (SURNAMES ARE HIGHLIGHTED IN TEAL COLOR). PLEASE CONFIRM IF THEY HAVE BEEN IDENTIFIED CORRECTLY $B \; . \; I \; ... X_2 .... X^2 .... \Omega$

ATTACH (OPTIONAL) LIMIT UPTO 20MB/FILE

CHOOSE FILE | NO FILE CHOSEN

EDIT LOG

In the application of the temperature correction model for $Kla_{20}$, therefore, $Kla_{20}$ is obtained by multiplying $Kla_T$ by the correction number N in column 8 at the test temperature T.

4.3 The solubility model

As mentioned in the introduction, the author advocates the hypothesis that solubility is inversely proportional to Kla. The foregoing sections have established that Kla is related directly to the 5th order of temperature. If this hypothesis is true, then one would expect the solubility also bears a 5th order relationship with temperature, but in an inverse manner. The following sections illustrate that solubility is indeed related to the 5th order of temperature using published scientific data. This section is significant for 2 reasons:

First, a new physical law is discovered. By definition according to Oxford English dictionary, a physical law 'is a theoretical principle deduced from particular facts, applicable to a defined group or class of phenomena, and expressible by t- he statement that a particular phenomenon always occurs if certain conditions be present.' The rationale behind the solubility law is similar to the Universal Gas Law which is in fact an extension of Boyle's Law or Charles' Law. As Boyle's La- w states that for a fixed temperature, volume is inversely proportional to pressure; so the Universal Gas Law states that, for any pressure and temperature, volume is

FIG. 8E

| ARTICLE | SUPPLEMENTARY | | MODE | ✎EDIT | ⊙PROOF | where S is salinity in parts per thousand (‰) and T is temperature in Kelvin. P is the barometric pressure in atmospheres, Pvt is the vapor pressure of water in atmospheres, and θ₀ is related to the second virial coefficient of oxygen. Using the above equations it was possible to construct a solubility Table similar to the published Table CG-1 as given in ASCE 2-06. Such a constructed Table for zero salinity is given in Table 5 col. 2 below:

Table 5 Physical Properties of water at various temperatures [11][3].

| T (°C) | $C_S(T)$ (mg/L) | $\rho$ (kg/m³) | $E/10^6$ (kN/m²) | $\sigma$ (N/m) | $\mu \times 10^3$ (N.s/m²) | $\gamma \times 10^6$ (m²/s) | $P_V$ (kN/m²) |
|---|---|---|---|---|---|---|---|
| 0 | 14.62 | 999.8 | 1.98 | 0.0765 | 1.787 | 1.785 | 0.61 |
| 5 | 12.77 | 1000 | 2.05 | 0.0749 | 1.518 | 1.519 | 0.87 |
| 10 | 11.29 | 999.7 | 2.1 | 0.0742 | 1.307 | 1.306 | 1.23 |
| 15 | 10.08 | 999.1 | 2.15 | 0.0735 | 1.139 | 1.139 | 1.7 |
| 20 | 9.09 | 998.2 | 2.19 | 0.0728 | 1.002 | 1.003 | 2.34 |
| 25 | 8.26 | 997 | 2.22 | 0.072 | 0.89 | 0.893 | 3.17 |
| 30 | 7.56 | 995.7 | 2.25 | 0.0712 | 0.798 | 0.8 | 4.24 |
| 40 | 6.41 | 992.2 | 2.28 | 0.0696 | 0.653 | 0.658 | 7.38 |
| 50 | 5.49 | 988 | 2.29 | 0.0679 | 0.547 | 0.553 | 12.33 |
| 60 | 4.71 | 983.2 | 2.28 | 0.0662 | 0.466 | 0.474 | 19.92 |

The other data pertaining to the physical properties of water as shown in Table 5 is from

FIG. 8J

| ARTICLE | SUPPLEMENTARY | | MODE | EDIT | QPROOF | SESSION REPORT | HELP | SAVE | SUBMIT |

QUICKLINKS

QUERIES
◁ Q1 Q2 Q3 Q4 Q5 Q6 ▷

THE AUTHOR NAMES HAVE BEEN TAGGED AS GIVEN NAMES AND SURNAMES (SURNAMES ARE HIGHLIGHTED IN TEAL COLOR). PLEASE CONFIRM IF THEY HAVE BEEN IDENTIFIED CORRECTLY $B \, .1 \ldots x_2, \ldots x^2, \ldots \Omega$

ATTACH (OPTIONAL) LIMIT UPTO 20MB/FILE

| CHOOSE FILE | NO FILE CHOSEN |

EDIT LOG

Where S is salinity in parts per thousand (%₀) and T is temperature in Kelvin. P is the barometric pressure in atmospheres, Pvt is the vapor pressure of water in atmospheres, and θ₀ is related to the second virial coefficient of oxygen. Using the above equations it was possible to construct a solubility Table similar to the published Table CG-1 as given in ASCE 2-06. Such a constructed Table for zero salinity is given in Table 5 col. 2 below:

Table 5 Physical Properties of water at various temperatures [11][3].

| T (°C) | $C_S(T)$ (mg/L) | $\rho$ (kg/m³) | $E/10^6$ (kN/m²) | $\sigma$ (N/m) | $\mu \times 10^3$ (N·s/m²) | $\gamma \times 10^6$ (m²/s) | $P_v$ (kN/m²) |
|---|---|---|---|---|---|---|---|
| 0 | 14.62 | 999.8 | 1.98 | 0.0765 | 1.787 | 1.785 | 0.6 |
| 5 | 12.77 | 1000 | 2.05 | 0.0749 | 1.518 | 1.519 | 0.8 |
| 10 | 11.29 | 999.7 | 2.1 | 0.0742 | 1.307 | 1.306 | 1.2 |
| 15 | 10.08 | 999.1 | 2.15 | 0.0735 | 1.139 | 1.139 | 1.7 |
| 20 | 9.09 | 998.2 | 2.19 | 0.0728 | 1.002 | 1.003 | 2.34 |
| 25 | 8.26 | 997 | 2.22 | 0.072 | 0.89 | 0.893 | 3.1 |
| 30 | 7.56 | 995.7 | 2.25 | 0.0712 | 0.798 | 0.8 | 4.24 |
| 40 | 6.41 | 992.2 | 2.28 | 0.0696 | 0.653 | 0.658 | 7.38 |
| 50 | 5.49 | 988 | 2.29 | 0.0679 | 0.547 | 0.553 | 12.3 |
| 60 | 4.71 | 983.2 | 2.28 | 0.0662 | 0.466 | 0.474 | 19.9 |

The other data pertaining to the physical properties of water as shown in Table 5 is

FIG. 8K

MODE /EDIT 🔍PROOF

Journal Logo          Article No-c00248 and pressure factors are equal to 1.0

$$DO_0 = \exp(-139.34411 + \frac{1.575701 \times 10^5}{T} - \frac{6.642308 \times 10^7}{T^2} + \frac{1.243800 \times 10^{10}}{T^3} - \frac{8.631949 \times 10^{11}}{T^4})$$

The salinity correction factor and the pressure correction factor are given by:

$$F_S = \exp[-S.(0.017674 - \frac{10.754}{T} + \frac{2140.7}{T^2})] \quad (39)$$

$$F_p = \frac{P - Pvt}{1 - Pvt} \cdot \frac{1 - \theta_v.P}{1 - \theta_o} \quad (40)$$

where S is salinity in parts per thousand (%₀) and T is temperature in Kelvin. P is the barometric pressure in atmospheres, Pvt is the vapor pressure of water in

Table 5 Physical Properties of water at various temperatures [11][3].

| T (°C) | $C_S(T)$ (mg/L) | $\rho$ (kg/m³) | $E/10^6$ (kN/m²) | $\sigma$ (N/m) | $\mu \times 10^3$ (N.s/m²) | $\gamma \times 10^6$ (m²/s) | $p_v$ (kN/m²) |
|---|---|---|---|---|---|---|---|
| 0 | 14.62 | 999.8 | 1.98 | 0.0765 | 1.787 | 1.785 | 0.61 |
| 5 | 12.77 | 1000 | 2.05 | 0.0749 | 1.518 | 1.519 | 0.87 |
| 10 | 11.29 | 999.7 | 2.1 | 0.0742 | 1.307 | 1.306 | 1.23 |
| 15 | 10.08 | 999.1 | 2.15 | 0.0735 | 1.139 | 1.139 | 1.7 |
| 20 | 9.09 | 998.2 | 2.19 | 0.0728 | 1.002 | 1.003 | 2.34 |
| 25 | 8.26 | 997 | 2.22 | 0.072 | 0.89 | 0.893 | 3.17 |
| 30 | 7.56 | 995.7 | 2.25 | 0.0712 | 0.798 | 0.8 | 4.24 |
| 40 | 6.41 | 992.2 | 2.28 | 0.0696 | 0.653 | 0.658 | 7.38 |
| 50 | 5.49 | 988 | 2.29 | 0.0679 | 0.547 | 0.553 | 12.33 |
| 60 | 4.71 | 983.2 | 2.28 | 0.0662 | 0.466 | 0.474 | 19.92 |

29  http://dx.doi.org/10.1016/j.heliyon_2017.e00248
2405-8440/©2016 Published by <Publisher_Name>. This is an open access article under the CC BY-NC-ND license (http://creativecommons.org/licenses/byncnd/4.0/).

FIG. 8L

| ARTICLE | SUPPLEMENTARY | MODE | EDIT | QPROOF |

Footnotes

²Con Dao is the largest island of the Con Dao Archipelago which consists of fifteen small islands and islets, Much of the main island is over 200 m above sea level and two peaks exceed 500 m (Tranh Cia Mountain 577 m Chua Mountain 515 m). http://www.arcbc.org.ph/wetlands/vietnam/vnm_condaoar.htm.

³The discussion about the criteria of islands or rocks is deeply developed by the issue of Okinotorisluma island which is the subject of controversy between Japan and China, which is located 1,400 yards apart and no more than two feet out of the water at high tide the Chinese government recognizes Japanese sovereignty over it, but maintain that it is a rock (not an island) which cannot sustain human and economic life. See discussion on the topic at Yamamoto, Lilian and Esteban, Miguel, Atoll Island States and International Law-climate change displacement and sovereignty, Springer, 2013, pp. 135-136.

⁴The UNCLOS in fact does not indicate whether the boundaries of the maritime zones move as baselines move. Baselines are clearly not fixed, as they are based on low-water marks, and these move following various morphological processes. This has led a number of commentators to conclude that these outer boundaries of the territorial see must be ambulatory, p. 216 and p.634. This principle of the ambulatory nature of baselines and maritime zones is accepted by most researchers. All authors referenced in this chapter accept this concept of the ambulatory nature of baselines and a proof of this is that a significant number of papers have attempted to find solutions to this problem, see for example. p.3 and p.271-230.

FIG. 8M

Journal Logo        Article No-c00248

Rearranging the above equation, $T^4$ can be expressed in terms of viscosity and therefore, $$T^4 = K' * \left(\frac{1}{\mu} + 0.7815\right) \quad (6)$$

where K' is a proportionality constant.
Substitute (Eq. (6)) into (Eq. (1)), therefore, $$Kla_T = K * \frac{(E\rho\sigma)_T}{P_S} * K' * \left(\frac{1}{\mu} + 0.7815\right) * T \quad (7)$$

Grouping the constants therefore, $$Kla_T = K'' * \frac{(E\rho\sigma)_T}{P_S} * \left(\frac{1}{\mu} + 0.7815\right) * T \quad (8)$$

where K" is another proportionality constant.

Therefore, Kla can be expressed as either (Eq. (8)) or as (Eq. (1)). For the sake of easy referencing to this model, this model shall be called the 5th power mode.[2]

2.1.3. Background

The universal understanding is that the mass transfer coefficient is more related to diffusivity and its temperature dependence at a fundamental level on a microscopic scale. Although Lewis and Whitman long ago advanced the two-film theory [5] and subsequent research postulated that the liquid film thickness is related to the fourth power of temperature in $^0$K [6], it was not thought that this relationship could be applied on a macro scale. In a laboratory scale, Professor Haslam [6] conducted an experiment to examine the

---

[2]Con Dao is the largest island of the Con Dao Archipelago which consists of fifteen small islands and islets. Much of the main island is over 200 m above sea level and two peaks exceed 500 m (Tranh Cia Mountain 577 m Chua Mountain 515 m)

http://dx.doi.org/10.1016/j.heliyon_2017.e00248
2405-8440/©2016 Published by <Publisher_Name>. This is an open access article under the CC BY-NC-ND license (http://creativecommons.org/licenses/byncnd/4.0/).

TRANSFORMATION OF MARKED-UP CONTENT INTO A FILE FORMAT THAT ENABLES AUTOMATED BROWSER BASED PAGINATION

CROSS-REFERENCE TO RELATED APPLICATIONS

This application is a continuation-in-part application of the non-provisional patent application titled "Transformation Of Marked-up Content To A Reversible File Format For Automated Browser Based Pagination", application Ser. No. 15/551,292, filed in the United States Patent and Trademark Office on Aug. 16, 2017, which is a national stage application of the PCT international application titled "Transformation Of Marked-up Content To A Reversible File Format For Automated Browser Based Pagination", international application number PCT/IN2016/000159, filed in the Indian Patent Office on Jun. 22, 2016, which claims priority to and the benefit of the non-provisional patent application titled "Transformation Of Marked-up Content To A Reversible File Format For Automated Browser Based Pagination", application number 3348/CHE/2015, filed in the Indian Patent Office on Jul. 1, 2015. This application also claims priority to and the benefit of the patent of addition application titled "Transformation Of Marked-up Content Into A File Format That Enables Automated Browser Based Pagination", application number 201743011293, filed in the Indian Patent Office on Mar. 30, 2017, which is a patent of addition of non-provisional patent application titled "Transformation Of Marked-up Content To A Reversible File Format For Automated Browser Based Pagination", application number 3348/CHE/2015, filed in the Indian Patent Office on Jul. 1, 2015. The specifications of the above referenced patent applications are incorporated herein by reference in their entirety.

BACKGROUND

With the increase in internet usage and applications, users are now accessing information and searching for information online. Information on the web is typically represented through electronic documents created using markup languages. Electronic documents created using markup languages are easily accessible to users through a typical web browser. A typical markup language document is made of different types of content, for example, textual content, images, videos, etc., and carries syntax information that instructs a browser how to render different types of content in the markup language document to a user. The syntax information comprises a set of markup language tags that are executed on the browser. Furthermore, rendering a document on a browser can be controlled, for example, by using cascading style sheets (CSS) that describe the formatting of a document written in a markup language. A CSS document is typically attached, embedded, or linked to a markup language document. The CSS defines how each element, for example, font size of text, color of a background or text, position and alignment of content elements, etc., in the markup language document appears on the browser.

Conventional markup language documents are typically displayed as continuous running documents without any page breaks. These continuous running documents are not print-friendly. A typical markup language document can accommodate a large amount of content, whereas a standard print ready page has, for example, 8.5"×11" dimensions with margins that reduce the space available for accommodation of a large amount of content during a print operation. The content has to be broken at two levels, that is, a horizontal level or page width and a vertical level or page height. The page width relates to a line break, and the page height relates to a page break. Content rendering on a browser can have loose lines, and spaces are often distributed in ways that make a page appear to have rivers of blanks flowing through the page. How the browser renders this content has to be understood in order to meaningfully interpret the content subsequently. Line breaks rendered by the browser can be discerned as belonging to four different types, namely, word space breaks (wsbr), soft hyphen breaks (wshbr), hard breaks (wbr), and paragraph breaks (wsp). Word space breaks are discerned by finding which spaces are quashed to a zero width. The word space breaks are then interpreted as an end of a line or a line break. Similarly, for manually introduced soft hyphens, if a line breaks in a soft hyphen, then the soft hyphen attains a non-zero width which is also interpreted as the end of the line or as a line break. A hard line break can be discerned when an offset decrease is encountered. Therefore, any markup language content that falls outside a printing area needs to be resized and repositioned accordingly for an optimal print output without losing any data when a print operation is performed.

One method for printing continuous running pages involves introducing page breaks based on a vertical height equal to a page of printing media upon which the content is to be printed. The problem with relying on introducing page breaks based on the vertical height is that text lines and other content are disrupted in between a page and the same is printed. There are additional problems, for example, numbering the pages as page numbers are forced and not based on the content, page layout issues on print media and on handheld devices, etc. Floats such as images and tables can split and spill across pages and trying to avoid these can result in large vertical gaps, making the presentation undesirable.

Content in a document can be easily read by a computer when the content is marked up. In markup language documents, for example, hypertext markup language (HTML) documents, word spaces and line breaks are not explicitly tagged. The word spaces and the line breaks remain anonymous, for example, as generic word spaces and line breaks, and hence are difficult to read and understand for printing accurately. With the advent of handheld devices, for example, smartphones, tablets, etc., there is a need for an optimized rendering of markup language documents and hence the concept of a fluid page was originated. The non-print-friendly documents, page numbering issues, and other page layout problems still exist in fluid pages. There is a need for bridging fluid web-content and fixed-page typesetting originating as a fluid HTML, without a reference printer at the destination.

Markup language documents are typically interactive and dynamic in nature, whereas the print is essentially static in nature. For example, hypertext markup language (HTML) documents contain free flowing or reflowing content. Images, paragraphs, videos and other similar content are arranged in an HTML document as tags. HTML documents are adaptable to different devices. That is, if an HTML document is viewed in a web browser, then the HTML document adapts to the web browser and displays content of the HTML document as per the specifications of the web browser. If this HTML document is viewed on a mobile browser of a mobile device, then the HTML document adapts to the specifications of the mobile browser. However, the HTML content is not suitable to print. Since the HTML content is not fixed, a printer would interpret specific elements of the HTML content inaccurately and therefore print the HTML content inaccurately. While there are many transformation techniques and file formats, these file formats are not reversible and do not restore fluidity of the transformed markup language documents. One of the main reasons that the fluidity cannot be restored is that the page output in non-reversible file formats are defined graphically as a set of printer instructions at a glyph level that lose structural information at a character level and a content level.

To generate an output page, multiple actions are performed on different page elements, for example, floats, line breaks, page breaks, footnotes, etc., of a markup language document. Consider an example where page elements such as anchored floats in a markup language document are shifted from an original position to a destination at either the bottom or top of the output page. On shifting, the output page loses the original text anchoring position of the anchored floats in the markup language document. Consider another example of an output page in a non-reversible format where a float such as a table is broken across more than one page. The table is rotated for fitting in one page. On rotating, the table is disassembled and difficult to restore to its original layout in the output page. Other page elements, for example, a line break, a page break, footnotes, etc., introduce artificial rigidity to an original fluid flow of text stream in the output page. For the output page to be generated in a completely reversible file format, the actions performed on the markup language document of the page output need to be tracked. Tracking results in increased programming complexity and reduced efficiency for rendering the markup language document in a reversible file format. Increased programming complexity results in a need for increased processing power and memory. Therefore, there is a need for reducing some levels of reversibility of the output page without losing the ability to generate a paginated output page, and hence there is a need for rendering the markup language document in a reversible file format, or a partially reversible file format, or a non-reversible file format based on a selected level of reversibility, in runtime.

Markup language content and associated content elements are interpreted and defined using markup language tags on any standard web browser. The tags included in a markup language document are typically executed on a server or on a web browser on a user's client device. Scripts or tags that run directly on a web browser have less latency time compared to a server side execution of tags. Pagination of a hypertext markup language (HTML) document involves partitioning content of the HTML document and presenting the partitioned content on individual pages. Conventional solutions include pagination of HTML documents based either on cut-off markers or the number of items to be displayed per page. These solutions are typically implemented using server side technologies. There is a need for a client side implementation, and there have been a few attempts at client side pagination due to the improved performance that the client side pagination can yield. While a client side implementation executes pagination scripts for producing pages on demand with improved performance, there is a need for rendering pages ahead of demand and time using a server side implementation, for example, for speedy delivery of fixed pages where no alterations were made over time. Moreover, since the server preserves archival copies of a fixed page in a fixed layout, a server side implementation would facilitate restoring a paginated HTML document to the fixed page using the archival copies.

U.S. Pat. No. 7,647,553 B2 provides a hypertext markup language view template that allows a hypertext markup language content document to flow into a series of containers. This is performed by identifying the layout of the hypertext markup language document by using view templates. In this method, a hypertext markup language authorship is provided that takes a bottomless continuous running hypertext markup language page and positions the content in a series of predefined containers within the display media. The content is flowed into the predefined containers. This method does not handle the positioning of footnotes on the same page where respective footnote citations reside, which makes it difficult for a user to refer to citations. This method also does not place floats proximate to their corresponding citations, which makes it difficult for the user to access floats corresponding to the citations. Furthermore, this method does not address header and footer conversion issues.

U.S. Pat. No. 6,789,229 B1 addresses issues with pagination that involves more processor intensive tasks. This method uses pagination techniques that involve determining reproducible pages followed by numbering individual pages based on hard breaks. This method requires a predetermined list of hard breaks occurring in the document being processed which requires a lot of processing time to display page numbers and therefore, there is a need for a faster and efficient technique to process page numbers.

A publication by Hewlett-Packard Laboratories titled "Automatic Pagination of HTML Documents in a Web Browser" discloses automatic pagination of hypertext markup language (HTML) documents on the client side. The methods disclosed in this publication utilize a built-in library of JavaScript® functions in a browser and size attributes to format an HTML page. The paginations are performed through extensible stylesheet language transformation (XSLT). These pagination techniques render page numbers in tabs which occupy more space if the number of pages is large. These methods do not handle page numbers when a print operation is initiated. Moreover, these methods do not position floats and footnotes on the same page where their respective citations reside. These methods transform a regular HTML page into individual pages with paginated tabs, but do not efficiently handle a journal or a novel style HTML page which translates to hundreds or even thousands of individual pages.

Conventional file formats, for example, the portable document format (PDF) of Adobe Systems Incorporated and the electronic publication (ePub®) format of Open eBook Forum DBA are two typical file formats used in documentation. The portable document format is based on a fixed layout and does not support a fluid layout. Page numbers in the portable document format are forced and not based on the content. The ePub file format is designed with reflowable content, which can optimize text and graphics according to a display device. However, the ePub file format does not support header and footer at a conversion stage, places floats at random locations, and does not proxy floats, for example, videos and long tables to a linked source, thereby hindering the user experience.

Hence, there is a long felt need for a computer implemented method and a file format transformation system deployed on a client device, or in an embodiment, on a server, that transform marked-up content in a first file format, for example, a hypertext markup language (HTML) format to a second file format that enables automated browser based pagination and that can be stored offline, executed with less latency and improved performance speed, and can be restored to a continuous page. Moreover, there is a need for a computer implemented method and a file format transformation system that render the marked-up content in the second file format on demand and ahead of demand based on a selected level of reversibility to reduce programming complexity and increase rendering efficiency, without losing the ability to generate a paginated output page. Furthermore, there is a need for a computer implemented method and a file format transformation system that implement document tagging of all content including spaces and line breaks to transform fluid pages to fixed pages that are print-friendly and provide a fixed page view that captures document elements, for example, line breaks, floats, footnotes or end notes, page numbers, headers and footers, captions, etc., which are expressed relationally and assigned page appropriate placement. Furthermore, there is a need for a computer implemented method and a file format transformation system that position floats and footnotes on the same page where their respective citations reside, support headers and footers at a conversion stage, place floats at appropriate locations, and proxy floats, for example, videos and long tables to a linked source, thereby enhancing user experience.

SUMMARY OF THE INVENTION

This summary is provided to introduce a selection of concepts in a simplified form that are further disclosed in the detailed description of the invention. This summary is not intended to determine the scope of the claimed subject matter.

The method and the file format transformation system (FFTS) deployed on a client device, and in an embodiment, on a server, disclosed herein address the above recited need for transforming marked-up content in a first file format, for example, a hypertext markup language (HTML) format to a second file format that enables automated browser based pagination and that can be stored offline, executed with less latency and improved performance speed, and can be restored to a continuous page. Moreover, the method and the FFTS deployed on a client device, and in an embodiment on a server, render the marked-up content in the second file format on demand and ahead of demand based on a selected level of reversibility to reduce programming complexity and increase rendering efficiency, without losing the ability to generate a paginated output page. The second file format is therefore a reversible file format, or a partially reversible file format, or a non-reversible file format. The reversible file format allows the marked-up content to be reversed to the first file format to restore the continuous page.

Furthermore, the method and the file format transformation system (FFTS) disclosed herein implement document tagging of all content including spaces and line breaks to transform fluid pages to fixed pages that are print-friendly and provide a fixed page view that captures document elements, for example, line breaks, floats, footnotes or end notes, page numbers, headers and footers, captions, etc., which are expressed relationally and assigned page appropriate placement. In the absence of tags for blanks, for example, word spaces and line breaks, it would be difficult to instruct and cajole a browser to reflow content, thereby limiting the scope to the default content flow of the browser. Consequently, a meaningful page break cannot be assigned and scripts that interpret the tags to produce page breaks do not have handles with which to produce the page breaks. In the second file format disclosed herein, word spaces, line breaks, and page breaks are explicitly tagged. The FFTS therefore generates fixed format virtual pages in the second file format with line breaks and page breaks placed in appropriate locations within a continuous document. In a virtual page rendering, the continuous page is first rendered with demarcation lines or page borders for page breaks. A cascading style sheet (CSS) instruction is provided to a printer to not print the demarcation lines but interpret the demarcation lines instead as page breaks.

The client side implementation of the method and the file format transformation system (FFTS) disclosed herein allows a user of a document to be presented with an alternate presentation of the document without additional communication costs between a server and the user's client device. Moreover, the client side and server side implementation of the method and the FFTS disclosed herein enables automated browser based pagination of markup language documents, for example, hypertext markup language (HTML) documents based on the dimensions of a web browser's window and the rendered size of components. The reversible file format allows a user to view the page-broken document as a continuous document on a browser. The user can switch between the two views. The partially reversible format or the non-reversible format reduces the programming complexity involved in generating a paginated output. The computer implemented method and the FFTS disclosed herein position floats and footnotes on the same page where their respective citations reside, support headers and footers at a conversion stage, place floats at appropriate locations, and proxy floats, for example, videos and long tables to a linked source, thereby enhancing user experience. The computer implemented method disclosed herein is minimalistic in terms of document object model (DOM) manipulation and performs minimum manipulation to create pages.

The computer implemented method disclosed herein employs the file format transformation system (FFTS) deployed on a client device, or in an embodiment, on a server, comprising at least one processor configured to execute computer program instructions for transforming marked-up content in a first file format to a second file format that enables automated browser based pagination. The FFTS receives the marked-up content of the first file format. The FFTS reflows the received marked-up content of the first file format into a continuous page having a configurable page width. The FFTS identifies spaces and block elements in the reflown marked-up content of the first file format. The FFTS generates and appends tags to the identified spaces and the identified block elements in the reflown marked-up content of the first file format. For each of the identified spaces and the identified block elements, the FFTS determines line breaks in the reflown marked-up content of the first file format based on preconfigured criteria associated with the appended tags and tags the determined line breaks.

For each of the determined line breaks, the file format transformation system (FFTS) identifies anchored floats, for example, figures, tables, images, videos, etc., in the reflown marked-up content of the first file format and tags the identified anchored floats. The FFTS positions the tagged anchored floats on a current page based on availability of space for the tagged anchored floats on the current page. The FFTS identifies footnotes in the reflown marked-up content of the first file format and tags the identified footnotes. The FFTS positions the tagged footnotes at a footnote section on the current page based on availability of space for the tagged footnotes on the current page. The FFTS positions page breaks in the continuous page based on a configurable page height and the determined line breaks for the positioning of the tagged anchored floats and the tagged footnotes on a subsequent page on non-availability of space on the current page. The FFTS groups the marked-up content with the positioned anchored floats and the positioned footnotes on each page. The FFTS inserts one or more of multiple pagination elements, for examples, page numbers, a header, a footer, etc., on each page containing the grouped marked-up content. The FFTS renders the grouped marked-up content with the inserted pagination elements in the second file format based on the selected level of reversibility. The method disclosed herein performs tagging of the spaces and the block elements with <span data-ph5="ws"> and <span data-ph5="wsp">, and tagging the line breaks with <span data-ph5="wsbr">, the paragraph breaks with <span data-ph5="wsp">, etc. In an embodiment, the second file format allows the marked-up content to be reversed to the first file format, restoring continuity, for example, by converting <span data-ph5="wsbr"> and <span data-ph5="wsp"> back to <span data-ph5=WS>. The data-ph5 attribute described above pertains to hypertext markup language5 (HTML5). For backward compatibility with HTML 4, the "class" attribute can be used instead of the data-ph5 attribute. Class attribute expressions in legacy HTML impose certain limitations to reversibility compared to the data-ph5 attribute in HTML5.

In an embodiment, the file format transformation system (FFTS) tracks positions of the identified anchored floats and the identified footnotes in the reflown marked-up content of the first file format, and positions of the page breaks in the continuous page prior to grouping the marked-up content and inserting the pagination elements on each page for rendering the grouped marked-up content with the inserted pagination elements in the second file format based on the selected level of reversibility. In another embodiment, the FFTS tracks positions of the inserted pagination elements for rendering the grouped marked-up content with the inserted pagination elements in the second file format based on the selected level of reversibility.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

FIGS. 4A-4B exemplarily illustrate screenshots showing edit views of marked-up content.

FIG. 4C exemplarily illustrates a screenshot showing a proof view of the marked-up content rendered in a reversible file format.

DETAILED DESCRIPTION OF THE INVENTION

The computer implemented method and the file format transformation system (FFTS) deployed on a client device as disclosed in the co-pending non-provisional patent application with application number 3348/CHE/2015 titled "Transformation Of Marked-up Content To A Reversible File Format For Automated Browser Based Pagination", filed in the Indian Patent Office on 1 Jul. 2015 and incorporated herein by reference in its entirety, transform marked-up content in a first file format to a reversible second file format. The FFTS disclosed herein is not limited to be deployed on a client device. The FFTS is also deployable on a server to render the marked-up content ahead of demand to the client device. In an embodiment as disclosed in the present patent of addition application, the computer implemented method and the file format transformation system (FFTS) deployed on the client device or the server transform the marked-up content in a first file format to a second file format based on a selected level of reversibility. The FFTS allows rendering of the marked-up content in the second file format in different levels of reversibility. As used herein, "different levels of reversibility" refer to extents to which the transformed marked-up content in the second file format can be reversed to an original layout, that is, to the first file format to restore a continuous page. The different levels of reversibility of the second file format are completely reversible, or partially reversible, or non-reversible. A user selects a desired level of reversibility of the second file format and the FFTS transforms the marked-up content from a first file format to the second file format based on the selected level of reversibility. While the co-pending non-provisional patent application with application number 3348/CHE/2015 discloses transformation of the marked-up content from the first file format to a reversible second file format, the present patent of addition application discloses transformation of the marked-up content from the first file format to a reversible second file format, or a partially reversible second file format, or a non-reversible second file format based on the selected level of reversibility, on demand or ahead of demand by the FFTS deployed on the client device or the server. With different levels of reversibility, the overheads of programming complexity and rendering efficiency are reduced.

Figure 1A:
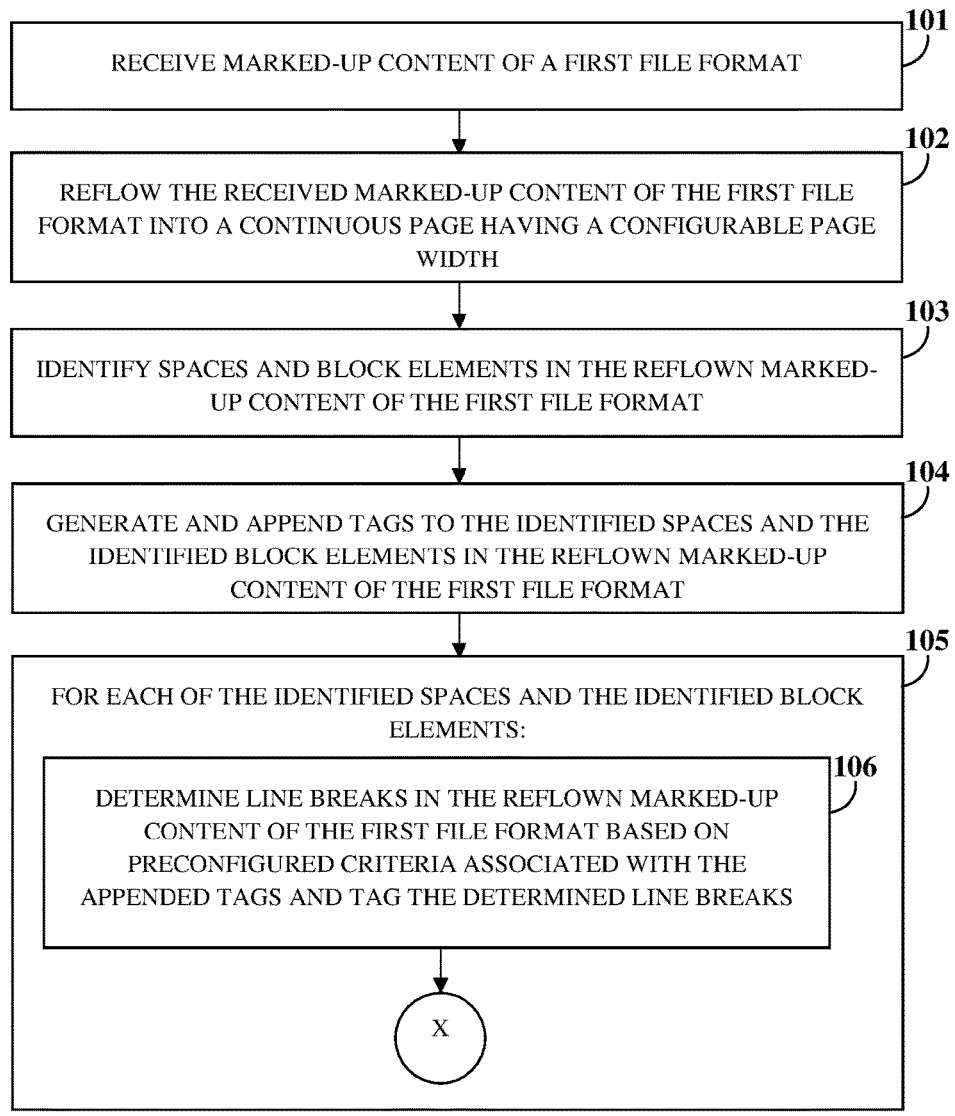
FIGS. 1A-1B illustrate a computer implemented method for transforming marked-up content in a first file format to a second file format that enables automated browser based pagination.
Figure 1B:
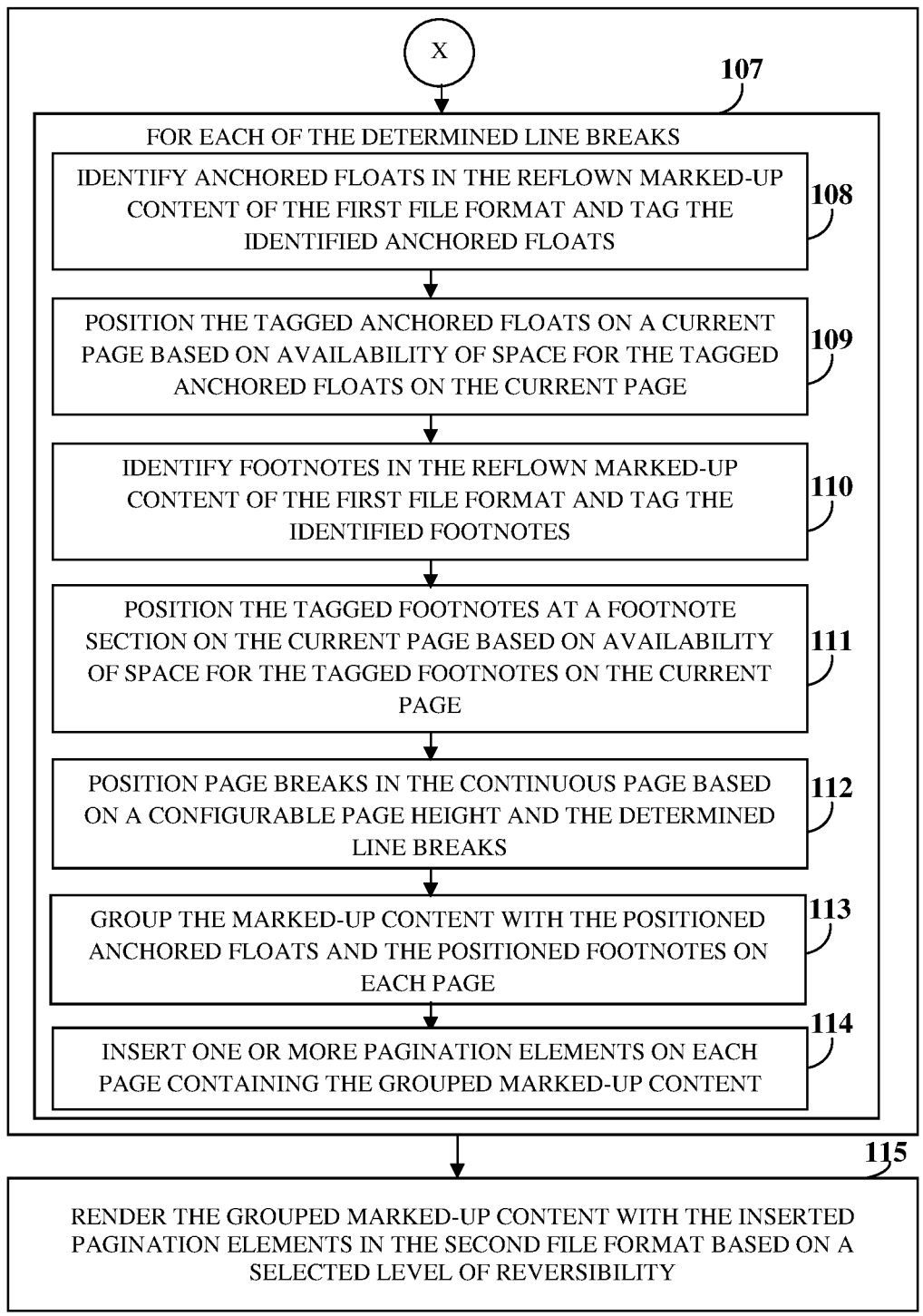

FIGS. 1A-1B illustrate a computer implemented method for transforming marked-up content in a first file format to a second file format that enables automated browser based pagination. As used herein, "marked-up content" refers to content having markups or appended tags that indicate the type of content, for example, a header, a footer, a caption, a table, a figure, an image, a video, a line break, etc. Also, as used herein, "line break" refers to a pagination element representing the end of a line of text. The second file format disclosed herein is named, for example, as "PH5" that represents pagination with hypertext markup language 5 (HTML5) and comprises a set of properties including tags that are generated in accordance with structural semantics of documents in the first file format, for example, hypertext markup language (HTML) documents, and recognizes scripts that shape the PH5 output. The scripts that shape the PH5 output vary.

The computer implemented method disclosed herein employs the file format transformation system (FFTS) deployed on a client device or, in an embodiment, on a server, comprising at least one processor configured to execute computer program instructions for transforming marked-up content in a first file format to a second file format that enables automated browser based pagination. The client device is a computing device, for example, a personal computer, a tablet computing device, a mobile computer, a mobile phone, a smart phone, etc. The FFTS converts web content seamlessly using document tagging. The FFTS receives 101 marked-up content of a first file format, for example, a hypertext markup language (HTML) format or an extensible hypertext markup language format (XHTML). The marked-up content of the first file format is processed, transformed, and executed by an algorithm in the FFTS for rendering the marked-up content in the second file format based on a selected level of reversibility. The user selects the desired level of reversibility of the second file format by declaring a token corresponding to the desired level of reversibility. The FFTS receives document contents, for example, in the HTML format. In an embodiment, the first file format is an extensible markup language (XML) format. In this embodiment, the FFTS converts a document from the XML format to an HTML format and then transforms the marked-up content in the HTML format to the second file format with the selected level of reversibility, for example, as a reversible file format, or a partially reversible file format, or a non-reversible file format. As used herein, "reversible file format" refers to a file format that can be back transformed into the first file format. The reversible file format allows the marked-up content to be reversed to the first file format to restore the continuous page. Also, as used herein, "partially reversible file format" refers to a file format where a few aspects of the marked-up content can be back transformed into the first file format. Also, as used herein, "non-reversible file format" refers to a file format with rigidity that does not allow back transforming of the marked-up content to the first file format.

A browser that loads the marked-up content of the first file format inserts code points, for example, soft hyphens in the marked-up content of the first file format based on dictionary elements, for example, dictionary syllables such as—im-por-tant, con-se-quence, ap-pear-ance, etc. As used herein, "soft hyphens" refer to code points reserved in coded character sets used for breaking words across lines by inserting visible hyphens. Unicode defines the soft hyphens as invisible characters that allow a manual specification of positions where hyphenated breaks are allowed without forcing a line break in an inconvenient place if the content or text is later reflowed. In the embodiment of the file format transformation system (FFTS) deployed on the server, the browser is a headless browser implemented as a server side application, for example, a command line server application. As used herein, "headless browser" refers to a web browser without a graphical user interface. The headless browser is a piece of software that accesses web pages without a display. The headless browser provides automated control of webpages and, in an embodiment, provides the content of web pages to other programs. The headless browser is executed via a command-line interface or using a network communication. Examples of the headless browsers comprise PhantomJS with WebKit® of Apple Inc., or Selenium® WebDriver of Software Freedom Conservancy, Inc., as a Firefox® extension of Mozilla Foundation Corporation, California. While the FFTS produces pages of marked-up content on demand in the second file format with improved performance by executing browser-based pagination scripts on the client side, that is, on the client device, in an embodiment, when the pages of marked-up content need to be rendered ahead of demand, the FFTS implemented on the server side, that is, on the server, runs the same browser-based pagination scripts using a headless browser. For example, the FFTS renders a fixed page where no alterations were made over time, ahead of time for speedy delivery. The FFTS also maintains archival copies in a fixed layout for facilitating a restore of a paginated hypertext markup language (HTML) document to the fixed page using the archival copies.

The marked-up content received by the file format transformation system (FFTS) is transformed as disclosed in the following method steps 102-115. The FFTS reflows 102 the received marked-up content of the first file format into a continuous page having a configurable page width. As used herein, the term "reflow" refers to a browser process of recalculating positions of hypertext markup language (HTML) elements in the HTML content and re-rendering the HTML elements with new positions. A generic computer using a generic program cannot reflow the received marked-up content of the first file format into a continuous page having a configurable page width in accordance with the method steps disclosed above. The FFTS identifies 103 spaces and block elements in the reflown marked-up content of the first file format. In an embodiment, the FFTS identifies existing break elements, for example, hard breaks such as soft hyphen breaks, line breaks, and paragraph breaks in the reflown marked-up content of the first file format. The FFTS also identifies unanchored or uncited floats in the reflown marked-up content of the first file format. The block elements are content elements that create blocks or large groupings of content and generally begin new lines of text. The block elements expand to fill a parent container containing text, inline elements, etc., and can have margins and/or padding, fitting child elements. A <div> element is a block element in the HTML. The block elements, for example, (<div>, <h1>-<h6>, <p>) in a document start on a new line and take up the full width available. A generic computer using a generic program cannot identify spaces and block elements in the reflown marked-up content of the first file format in accordance with the method steps disclosed above.

The file format transformation system (FFTS) generates and appends 104 tags to the identified spaces and the identified block elements in the reflown marked-up content of the first file format. The FFTS generates tags in accordance with structural semantics of the marked-up content, which then helps the scripts recognize the tags. The FFTS replaces the identified word spaces, for example, with <span data-PH5 =WS>, where the term "span" is a tag used to group inline elements, for example, <a>, <img>, etc., in the HTML content that do not start on a new line and only take up a necessary width. As used herein, "word space" refers to a single space between two words. The FFTS tags the identified block elements, for example, as <div class WSP>, where "WSP" refers to paragraph break. In an embodiment, floats and footnotes have prior representation in an input document of the first file format, for example, the HTML format and need no specific tagging. As used herein, the term "floats" refers, for example, to images, videos, audio content, tables, figures, etc., that float unhinged from the main content flow, except in their relationship to their citations as available in the input document. Image floats have, for example, <img> tags. Table floats can be recognized by the presence of various tag elements, for example, <td>, <tr>, etc. Also, as used herein, the term "footnotes" refers to content that is intended to be placed at the bottom of a page and used to cite references to content on the page. Footnotes are in a number series and are shown as superscript <sup> numbers that are assigned to specific locations in the main content flow, and these superscripts reference notes appended to the main content, for example, at the bottom in a continuous page. A generic computer using a generic program cannot generate and append tags to the identified spaces and the identified block elements in the reflown marked-up content of the first file format in accordance with the method steps disclosed above.

Figure 3A:
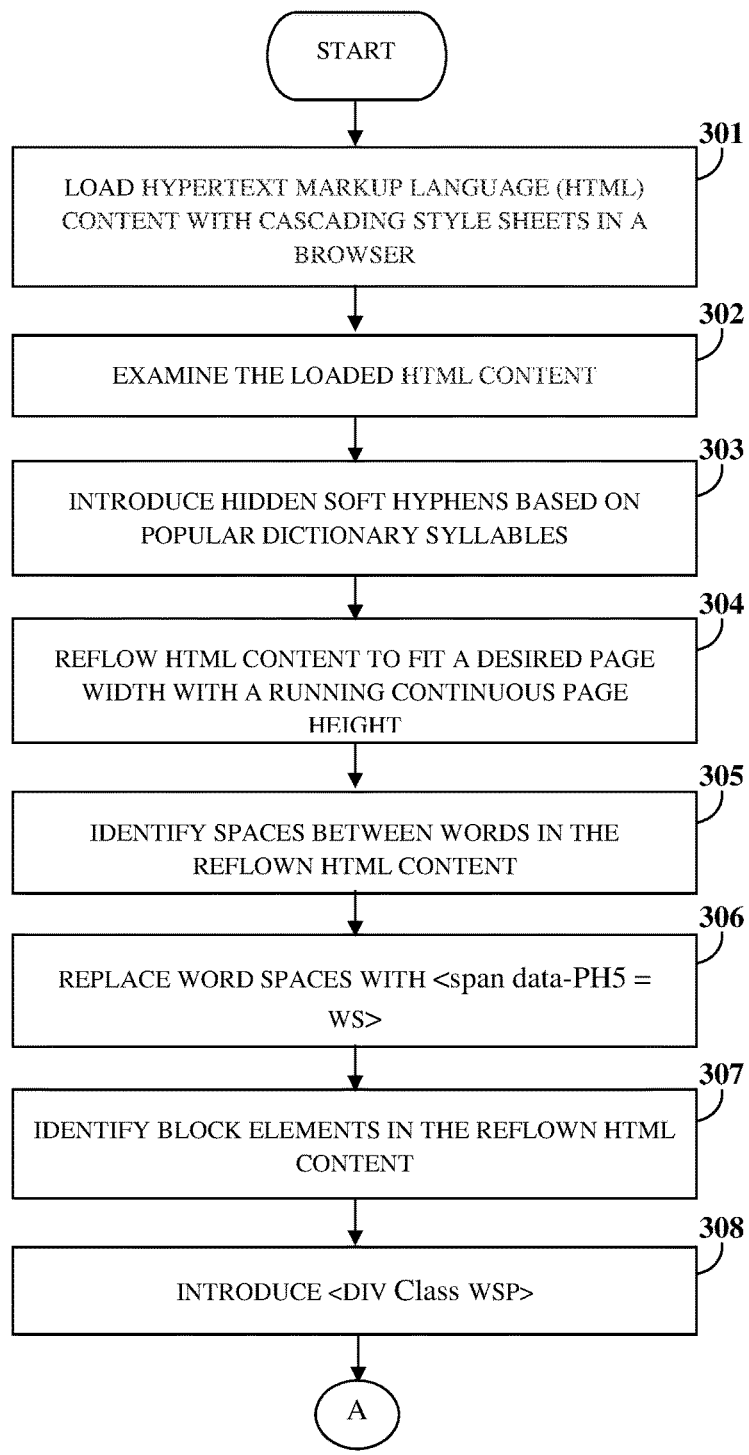
FIGS. 3A-3F exemplarily illustrate a flowchart comprising the steps performed by a file format transformation system for transforming marked-up content in a first file format to a reversible second file format.
Figure 3B:
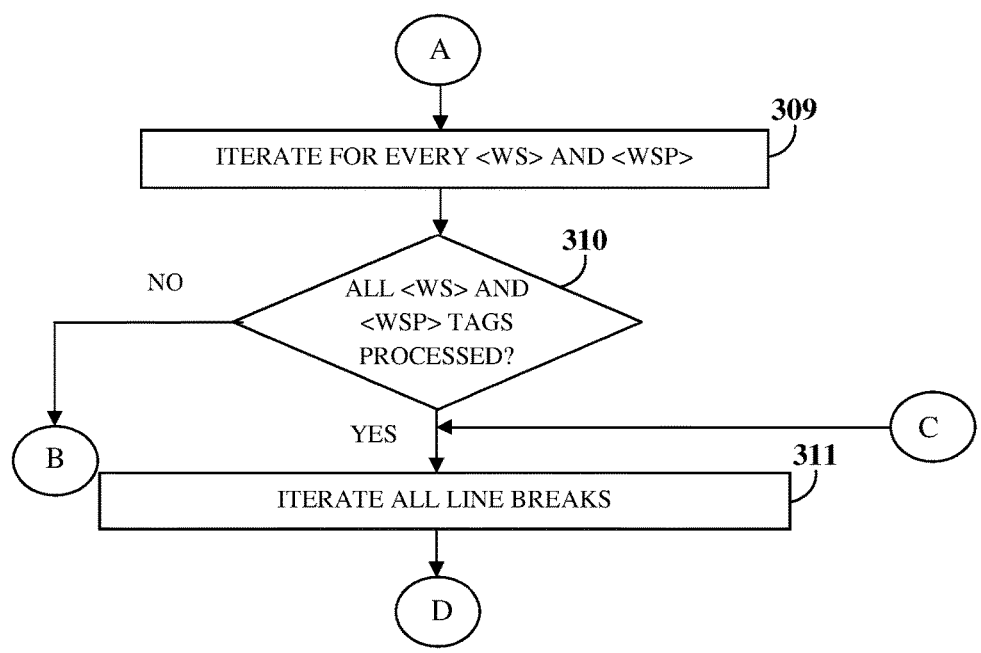
Figure 3C:
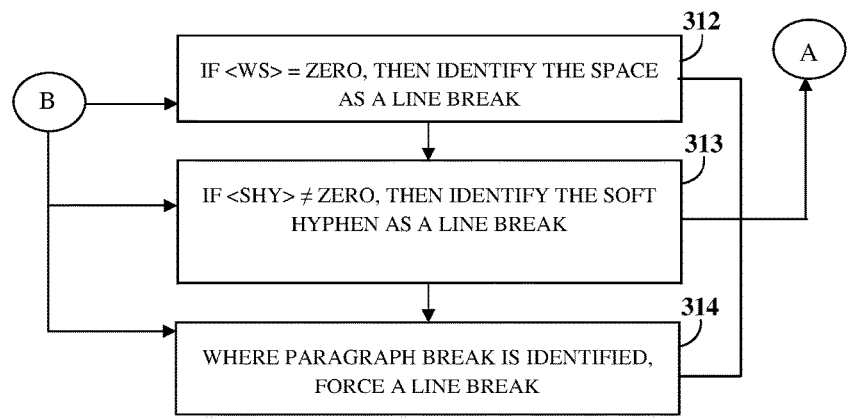

For each of the identified spaces and the identified block elements 105, the file format transformation system (FFTS) determines 106 line breaks in the reflown marked-up content of the first file format based on preconfigured criteria associated with the appended tags as disclosed in the detailed description of FIG. 3C, and tags the determined line breaks. The line breaks retain integrity of the second file format by hyphenating and adjusting spaces in the marked-up content rendered in the second file format. In an embodiment, the FFTS identifies the line breaks through JavaScript® developed by Sun Microsystems, Inc.

For each of the determined line breaks 107, the file format transformation system (FFTS) identifies 108 anchored floats in the reflown marked-up content of the first file format and tags the identified anchored floats. The FFTS positions 109 the tagged anchored floats on a current page based on availability of space for the tagged anchored floats on the current page. The FFTS positions the tagged anchored floats proximal to associated float citations on the current page based on availability of space for the tagged anchored floats on the current page. The FFTS identifies 110 footnotes in the reflown marked-up content of the first file format and tags the identified footnotes. The FFTS places the footnotes initially as "line notes" immediately below the cited line, works out the available space after flowing the main text, and then reflows the footnotes to the bottom of the same page. The FFTS positions 111 the tagged footnotes at a footnote section on the current page based on availability of space for the tagged footnotes on the current page. The FFTS positions the tagged footnotes proximal to associated footnote citations on the current page based on availability of space for the tagged footnotes on the current page. The FFTS positions 112 page breaks in the continuous page based on a configurable page height and the determined line breaks for the positioning of the tagged anchored floats and the tagged footnotes on a subsequent page on non-availability of space on the current page. As used herein, "page break" refers to a marker that indicates that content which follows the marker is part of a new page. The FFTS groups 113 the marked-up content with the positioned anchored floats and the positioned footnotes on each page. The FFTS inserts 114 one or more of multiple pagination elements, for example, page numbers, a header, a footer, a footnote ruler, fillers, etc., on each page containing the grouped marked-up content.

The file format transformation system (FFTS) tags the identified word spaces, for example, as <span data-ph5="ws">. The FFTS tags the line breaks, for example, as <span data-ph5="wsbr">. The FFTS represents the lines ending with hyphenations, for example, as <span data-ph5="wshbr">. At the end of every paragraph in the reflown marked-up content, the FFTS introduces a paragraph break. As used herein, "paragraph break" refers to a pagination element representing the end of a paragraph. The paragraph break is a non-intrusive data model that preserves an original data model of the hypertext markup language (HTML). The FFTS represents the paragraphs, for example, as <p>, <div>, etc., and appends appropriate tags, for example, <div data-ph5="wsp"> to the paragraphs. The FFTS tags the paragraph breaks, for example, as <div data-ph5="wsp">.

The file format transformation system (FFTS) positions the floats, for example, figures, tables, text boxes, etc., closer to anchors within the available space. Where anchors are not available, the FFTS appends anchors at the input locations of the floats. The FFTS represents each of the floats, for example, as <div data-ph5="float"> with a relevant identifier (id) attribute. The corresponding anchors are represented as <span data-ph5="float-anchor"> with a "refid" attribute matching the "id" attribute value of the corresponding float. The FFTS initially positions the floats near their anchors and then moves the floats to the bottom or top of the current page, or to one of the following pages according to the availability of space similar to footnotes. The FFTS positions floats, for example, images, tables, text boxes, pullouts, etc., in proximity to the anchors and ensures that grouped elements such as captions for the floats, if any, appear immediately before or after the floats, and that the captions are not widowed or orphaned. The FFTS handles the grouped elements comprising, for example, a float and a caption associated with the float in the second file format at a position assigned in the marked-up content of the first file format to the float.

The file format transformation system (FFTS) declares uniform resource locater (URL) breaks to a paging engine. The FFTS couples expressions such as footnotes to page breaks. The page break breaks a web page into a predefined length and delivers cut pages, while ensuring headings and words at the beginning and end paragraphs are not widowed or orphaned. The FFTS introduces page breaks when a script cookie cuts the fluid page to a reference dimension. The FFTS introduces a page break tag, for example, <div data-ph5="wspbr"> to the appropriate line break. The FFTS initially positions footnotes next to the corresponding citations. The FFTS moves the footnotes to the footnote section of the page after introduction of the page breaks. The FFTS tags the footnotes, for example, as <div data-ph5="footnote">, where the first footnote comprises an additional class called "firstFootnote" and the rest of the footnotes comprise an additional class called "notFirstFootnote". The FFTS numbers the footnotes and positions the footnotes at the bottom of the relevant page.

The file format transformation system (FFTS) inserts page numbers, a header, a footer, a footnote ruler, fillers, etc., or any combination thereof in one or more pages in the second file format. The FFTS inserts page number tags, for example, <div data-ph5="page-number"> in the line breaks. The FFTS inserts page numbers on the pages based on a predefined numbering style. The FFTS inserts the footnote ruler, for example, as a horizontal line to separate running text and the footnotes. The FFTS tags the footnote ruler, for example, as <div data-ph5="footNoteRuler">. The FFTS allows the footnote ruler to be tweaked on and off in the cut pages. For fixed page rendering, the FFTS uses filler compensation for eliminating orphans, widows, and divorce between couples, for example, a section heading and a paragraph, a figure and a table, a table heading and a table, etc. The FFTS represents the fillers, for example, as <span data-ph5="fillerText">. The FFTS automatically deploys fillers, for example, line spaces, if needed, to fill a page to increase aesthetics. A generic computer using a generic program cannot determine and tag the line breaks in the reflown marked-up content of the first file format; identify, tag, and position the anchored floats on the current page; identify, tag, and position the footnotes at the footnote section on the current page; position the page breaks in the continuous page; group the marked-up content with the positioned anchored floats and the positioned footnotes on each page; and insert the pagination elements on each page containing the grouped marked-up content in accordance with the method steps disclosed above.

The file format transformation system (FFTS) renders 115 the grouped marked-up content with the inserted pagination elements in the second file format based on the selected level of reversibility, for example, as a reversible file format, or a partially reversible file format, or a non-reversible file format. Different levels of reversibility of the second file format reduce programming complexity and increase rendering efficiency of the FFTS to render the marked-up content. In an embodiment, the FFTS renders the grouped marked-up content in the second file format by sacrificing some aspects of reversibility, without losing the ability to generate a paginated output. Based on business requirements, a user of the FFTS indicates to the FFTS whether to restore the grouped marked-up content in the second file format to a continuous page to retain the full richness of the marked-up content or not. The user provides this indication to the browser of the FFTS using tokens. The FFTS, using the tokens, determines whether to retain the marked-up content in the second file format or reverse the marked-up content in the second file format to the first file format to restore the continuous page to the earlier state of the marked-up content before the transformation of the marked-up content by the FFTS. If the token corresponds to a reversible file format, the FFTS back transforms the marked-up content of the second file format to the first file format. If the token corresponds to a partially reversible or custom reversible file format, the FFTS reverses the marked-up content with document elements, for example, the identified anchored floats, the identified footnotes, the inserted pagination elements, etc., to original positions in the first file format based on the level of reversibility desired. For example, a token indicates if some parts of the marked-up content need to be filtered out for security reasons in some reader use case, such as in legal documents, or when required by a publisher of the continuous page. If the token corresponds to a non-reversible file format, the FFTS retains the marked-up content with the document elements, for example, the identified anchored floats, the identified footnotes, the inserted pagination elements, etc., in the second file format.

The file format transformation system (FFTS) compiles and positions the reflown marked-up content and the pagination elements with associated properties at predetermined context based positions across multiple pages based on page dimensions and the appended tags. The FFTS performs hyphenation and justification of the rendered marked-up content in the second file format to provide kerning based on aesthetics, for example, for avoidance of loose lines and blank rivers. In an embodiment, the FFTS achieves lossless reversibility of the marked-up content from the reversible file format to the first file format. As used herein, "lossless reversibility" refers to reversibility where the marked-up content is completely back transformed from the reversible file format to the first file format, that is, to the continuous page. The reversible file format allows the marked-up content to be reversed to the first file format to restore the continuous page. The partially reversible file format allows the marked-up content to be partially reversed to the first file format to partially restore the continuous page. The rendered marked-up content in the second file format is accessible on multiple browsers on multiple operating systems.

The fixed page in the second file format to which the marked-up content in the first file format is transformed is expressed, for example, as a pixel dimension equivalent of a paper size or a device size. The data model of the second file format, for example, referred to as the PH5 format transforms a fluid page, for example, in a hypertext markup language (HTML) format to a fixed page, for example, in the reversible file format or the PH5 format, where the transformation is reversible. That is, the file format transformation system (FFTS) interprets a fluid page and delivers a fixed page. The tagged input allows the transformation of the fluid page to the fixed page. The enriched inheritance comprises page breaks. The other elements are defined in terms of the page breaks. The extension of the fixed page in the PH5 format is, for example, .PH5. The FFTS bridges fluid web content and fixed page typesetting, originating as a fluid HTML, without a reference printer at the destination. The PH5 format is similar, for example, to a zip file format such as an electronic publication (ePub) format and can be opened in a common browser on any operating system in a fixed page view. A PH5 file can be back-transformed into a standard HTML file from which the PH5 file was generated with the fluidity of the HTML file restored. A generic computer using a generic program cannot render the grouped marked-up content with the inserted pagination elements in the second file format based on the selected level of reversibility in accordance with the method steps disclosed above.

In the PH5 data model, the file format transformation system (FFTS) performs document intelligence tagging. Tagging the spaces or blanks effects visible content for emulation and standardization. In the PH5 format, line break candidates are identified and marked up as page breaks. With this method, implicit statements in the document are understood and tagged for downstream machine reading or paging. The transformation from a fluid file format to the second file format, for example, the PH5 format is accomplished subject to the availability of a tag set that exposes an understanding of document semantics to scripts that generate the PH5 package. Creation of the tag set allows creation of a fixed page view that captures document elements that are expressed relationally and that are then assigned page-and-context-appropriate placement and styling. A PH5 file as a portable document anticipates the tag set in a work queue and defines a standard for creating the same. The PH5 files do not need reference printers, driver installations, configuration of printer settings, etc., and also do not need a reader application or a browser plug-in. Furthermore, the PH5 files allow offline storage of information.

In an embodiment, the file format transformation system (FFTS) tracks positions of the identified anchored floats and the identified footnotes in the reflown marked-up content of the first file format, and positions of the page breaks in the continuous page prior to grouping the marked-up content and inserting the pagination elements on each page for rendering the grouped marked-up content with the inserted pagination elements in the second file format based on the selected level of reversibility. In the PH5 data model, the FFTS tracks original positions of floats and footnotes in the marked-up content in the first file format, that is, the continuous page, before moving the floats and the footnotes to new positions in the marked-up content of the second file format. The FFTS further tracks positions of the inserted pagination elements for rendering the grouped marked-up content with the inserted pagination elements in the second file format based on the selected level of reversibility. The FFTS also tracks pagination elements, for example, a header, a footer, a page-number-folio, page breaks, borders, etc., that were not present in the first file format, that is, the continuous page. Tracking positions of the floats, the footnotes, the pagination elements, etc., allows the FFTS to reverse the marked-up content from the second file format to the first file format to restore the continuous page completely. In an embodiment, the FFTS degrades some levels of reversibility of the second file format to the continuous page. All document elements or artifacts of pagination, that is, the pagination elements, the floats, the headers, the footers, the footnotes, the page breaks, etc., are difficult to track and reverse to the first file format to restore the continuous page. Some artifacts, for example, reflow of the marked-up content that occurs during repositioning of floats, are side effects of pagination that are not explicit. Hence, the FFTS allows degradation of some of the reversibility because of the unaccounted reflows.

The focus of the computer implemented method and the file format transformation system (FFTS) disclosed herein is on an improvement to automated browser based pagination, and not on tasks for which a generic computer is used in its ordinary capacity. Accordingly, the method and the FFTS disclosed herein are not directed to an abstract idea. Rather, the method and the FFTS disclosed herein are directed to a specific improvement to the way the processor in the client device or the server deploying the FFTS operate, embodied in, for example, rendering the grouped marked-up content with the inserted pagination elements in the second file format on demand or ahead of demand based on a selected level of reversibility.

In the method disclosed herein, the design and the flow of data and interactions between a web browser on the client device or the headless browser on the server and the file format transformation system (FFTS) are deliberate, designed, and directed. The FFTS processes the marked-up content of the first file format to steer the FFTS towards a finite set of predictable outcomes. The FFTS implements one or more specific computer programs to transform the marked-up content in the first file format to the second file format on demand or ahead of demand based on the selected level of reversibility. The interactions between the web browser on the client device or the headless browser on the server and the FFTS allow the FFTS to receive the marked-up content of the first file format. From this marked-up content, the FFTS, through the use of other, separate and autonomous computer programs, transforms the marked-up content from the first file format to the second file format. This transformation requires twelve or more separate computer programs and subprograms, the execution of which cannot be performed by a person using a generic computer with a generic program. The steps performed by the FFTS disclosed above are tangible, provide useful results, and are not abstract. The combination of software and hardware implementation of the FFTS on the client device or the server is an improvement in computer related technology.

The computer implemented method disclosed herein improves the functionality of the computer, that is, the client device or the server, and provides an improvement in computer related technology as follows: While pagination was typically performed outside the browser through external components residing external to the browser at the operating system level, and directed towards a device such as a printer, the method and the file format transformation system (FFTS) disclosed herein achieve such a pagination within the context of the browser generated hypertext markup language (HTML) rendering, while also making the HTML document compatible with external pagination devices such as print drivers of printers. Thus, the FFTS avoids the problem of incompatibly issues with external print drivers in rendering a page. Pagination within the context of the browser generated HTML rendering helps publishers to create print ready deliverables directly through a cloud without external applications comprising, for example, existing desktop publishing (DTP) software. The method and the FFTS disclosed herein are diverse in converting paginated outputs for rendering document fragments within handheld devices, or within devices with larger screen widths and form factors such as in projection display devices. The FFTS therefore tweaks pagination to achieve a desired end use of rendering on handheld devices or larger screens.

Figure 2:
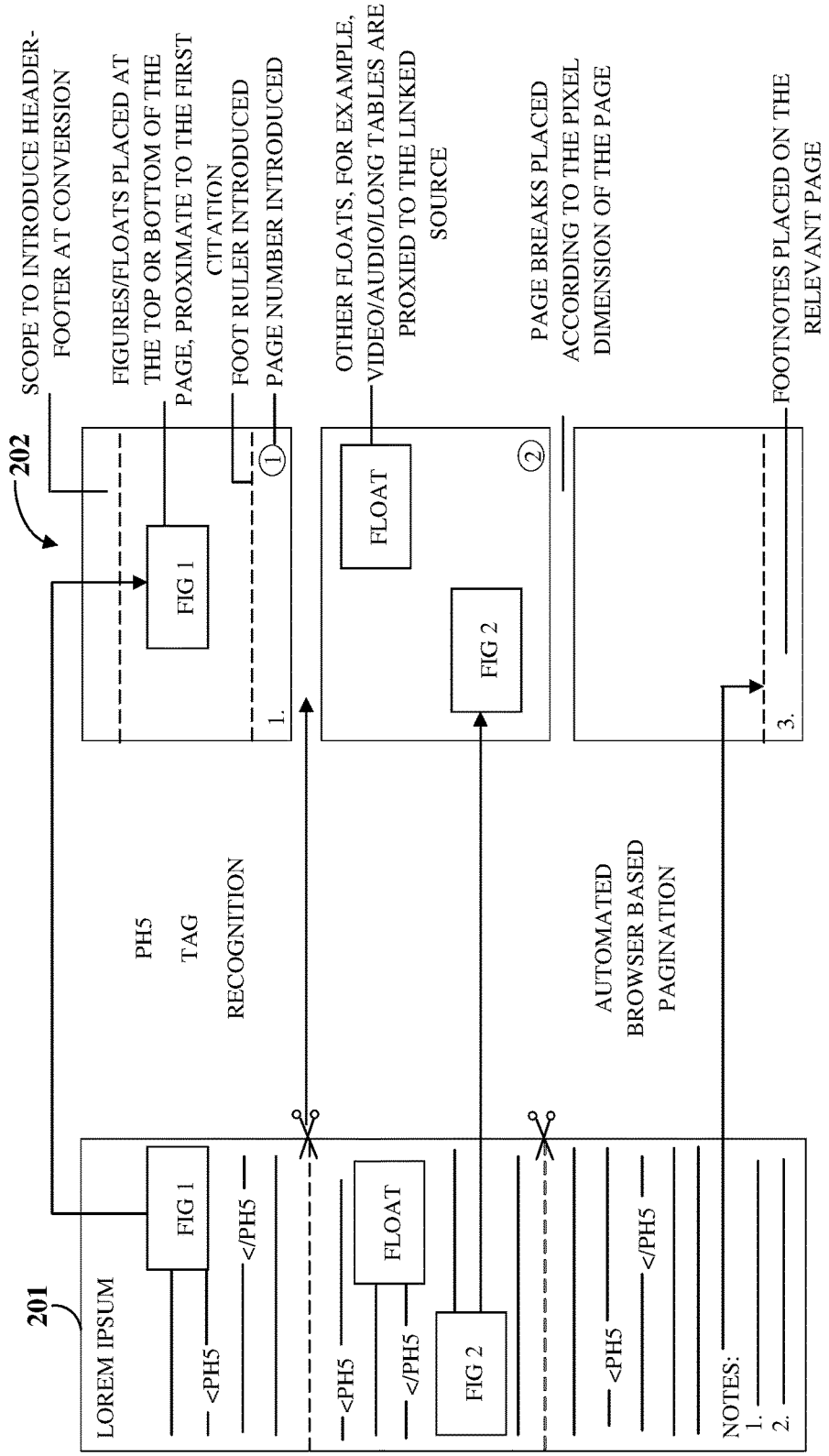
FIG. 2 exemplarily illustrates an interpretation of marked-up content in a second file format.

FIG. 2 exemplarily illustrates an interpretation of marked-up content in a second file format, for example, the PH5 format. A typical hypertext markup language (HTML) page does not have tags specified for spaces. The HTML page comprises a header, a footer, footnotes, floats such as figures, tables, images, video, audio, etc. The file format transformation system (FFTS) loads a hypertext markup language (HTML) page with associated cascading style sheets and transforms the HTML page to a PH5 page 201 of the PH5 format as exemplarily illustrated in FIG. 2. During the transformation, the FFTS identifies word spaces and block elements in the HTML page and appends the identified word spaces and the identified block elements with appropriate PH5 format tags. For example, the FFTS tags each word space with a tag <span data-ph5="ws"> and appends a tag <div data-ph5="wsp"> at the end of every paragraph. The FFTS identifies line breaks using JavaScript® and tags the identified line breaks, for example, with a tag <span data-ph5="wsbr">. Further, the FFTS tags the line breaks that end with a hyphen, for example, with a tag <span data-ph5="wshbr">. The FFTS performs tagging without replacing the original HTML tags, thereby preserving the original HTML tags to allow the final output second file format to be reverted back into the HTML page, if a user wants to suppress the changes and revert back to the HTML page. The tagged HTML page, that is, the PH5 page 201 exemplarily illustrated in FIG. 2, contains all the content of the original input HTML page along with the PH5 format tags. The tagging process allows the FFTS to transform a fluid HTML page into fixed HTML pages. A fluid HTML page contains responsive content elements that resize their position and geometry according to a web browser width.

The file format transformation system (FFTS) further introduces a page break tag <div data-ph5="wspbr"> next to an appropriate line break with reference to dimensions of the page. The FFTS inserts a page number tag <div data-ph5="page-number"> at the bottom of the page. The FFTS positions any available footnotes proximate to a respective citation and once the page breaks are introduced, the FFTS tags the footnotes <div data-ph5="footnote"> and positions the footnotes at the bottom of the page. The FFTS places an additional class tag after the first footnote "firstFootnote" and tags the following footnotes with an additional tag "notFirstFootnote" to differentiate between the first footnote and the following footnotes. The FFTS introduces a horizontal line to separate the main content from the footnote matter and tags the horizontal line as <div data-ph5="footNoteRuler">. The FFTS tags floats, for example, "FIG. 1" and "FIG 2." exemplarily illustrated in FIG. 2, as <div data-ph5="float"> with relevant "id" attributes and tags corresponding anchors as <span data-ph5="float-anchor"> with a "refid" attribute matching the "id" attribute value of the corresponding float. The FFTS renders the PH5 page 201 with the PH5 tags disclosed above. The FFTS creates headers and footers using auto-generated content wrapped in <div data-ph5="page-header"> and <div data-ph5="page-footer"> respectively, with sub-elements for left positioning, right positioning, or center positioning.

The file format transformation system (FFTS) performs PH5 tag recognition for automated browser based pagination and generates output pages 202. The FFTS recognizes the PH5 format tags appended in the PH5 tagged hypertext markup language (HTML) page 201. As exemplarily illustrated in FIG. 2, the PH5 tagged HTML page 201 comprises two figures labeled as "FIG. 1" and "FIG. 2" along with another float. During the tag recognition process, the FFTS encounters the float tag of the first float, that is, FIG. 1, in the PH5 tagged HTML page 201 and positions "FIG. 1" proximal to the corresponding citation until the FFTS encounters a page break tag. When a page break tag is encountered based on the availability of space, the FFTS positions the float "FIG. 1" at the top or bottom of the page close to the respective citation. The FFTS then allows the reflow of the HTML content to fit in the specified page width. The FFTS, upon recognizing the footnote tag, introduces footnote matter at the bottom of the page in close proximity to the respective citation. The FFTS introduces a footnote ruler to separate the main content from the footnote matter upon recognition of the footnote tag. The FFTS further encounters a page number tag and introduces a page number at the bottom of the page after the footnote matter. The FFTS then breaks the page into an individual page after encountering the page break tag which is placed based on the reference page height.

The file format transformation system (FFTS) then proceeds to the next section after the page break tag, proxies "FIG. 2" and other floats, for example, audio, video, tables, etc., to a linked source, positions these floats according to the availability of space, positions page breaks according to a pixel dimension of the page, and inserts a page number for the current page. The FFTS then proceeds to the next section after the page break tag, positions the remaining footnotes on the next page, and inserts a page number for the next page. The FFTS performs the page transformation process until the last page break tag is recognized.

FIGS. 3A-3F exemplarily illustrate a flowchart comprising the steps performed by the file format transformation system (FFTS) for transforming marked-up content in a first file format, for example, a hypertext markup language (HTML) format to a reversible second file format, hereafter referred to as a "reversible file format". As exemplarily illustrated in FIG. 3A, the FFTS loads 301 HTML content with cascading styling sheets (CSS) in a browser and examines 302 the loaded HTML content. The FFTS analyzes and describes syntactic roles of the HTML content. The FFTS introduces 303 hidden code points, for example, hidden soft hyphens into the HTML content based on popular dictionary elements, for example, dictionary syllables. The FFTS then reflows 304 the HTML content to fit a desired page width with a running continuous page height. The reflow process is used in a markup language document to render the markup language document to different types of user devices. The FFTS identifies 305 spaces between words, herein referred to as "word spaces", in the reflown HTML content and replaces 306 each of the word spaces with a tag, for example, <span data-PH5 =WS> tag, where "WS" refers to word space. The FFTS performs word spacing according to a kerning of a selected font. The FFTS also identifies 307 block elements in the reflown HTML content and introduces 308 a tag, for example, a <div class WSP> tag for each of the identified block elements in the reflown HTML content, where "WSP" refers to word space paragraph. As used herein, "<div>" refers to a markup language tag that defines a container for holding content elements.

After tagging, the file format transformation system (FFTS) iteratively processes the generated tags and identifies, for each of the identified word spaces and the identified block elements, one or more pagination elements in the reflown hypertext markup language (HTML) content. In this example, the FFTS identifies pagination elements such as line breaks, floats, and footnotes as exemplarily illustrated in FIGS. 3C-3E respectively.

FIG. 3B exemplarily illustrates iteration steps performed by the file format transformation system (FFTS). The FFTS iterates 309 the steps of determining and assignment of line breaks for every occurrence of the <WS> tag and the <WSP> tag as exemplarily illustrated in FIG. 3C, until all the <WS> tags and the <WSP> tags are processed 310. The FFTS, after processing all the <WS> and <WSP> tags, iterates 311 all the line breaks and then proceeds to the steps exemplarily illustrated in FIGS. 3D-3E.

FIG. 3C exemplarily illustrates determination and assignment of line breaks at appropriate positions in the reversible file format. The file format transformation system (FFTS) determines and assigns line breaks upon encountering any one of the following conditions: If the word space <WS> equals zero, then the FFTS identifies 312 the word space as a line break; if a soft hyphen <SHY> is not equal to zero, then the FFTS identifies 313 the soft hyphen as a line break; and if the FFTS identifies a paragraph break, the FFTS forces 314 a line break. After assigning the line breaks, the FFTS iterates 311 all the line breaks as exemplarily illustrated in FIG. 3B.

Figure 3D:
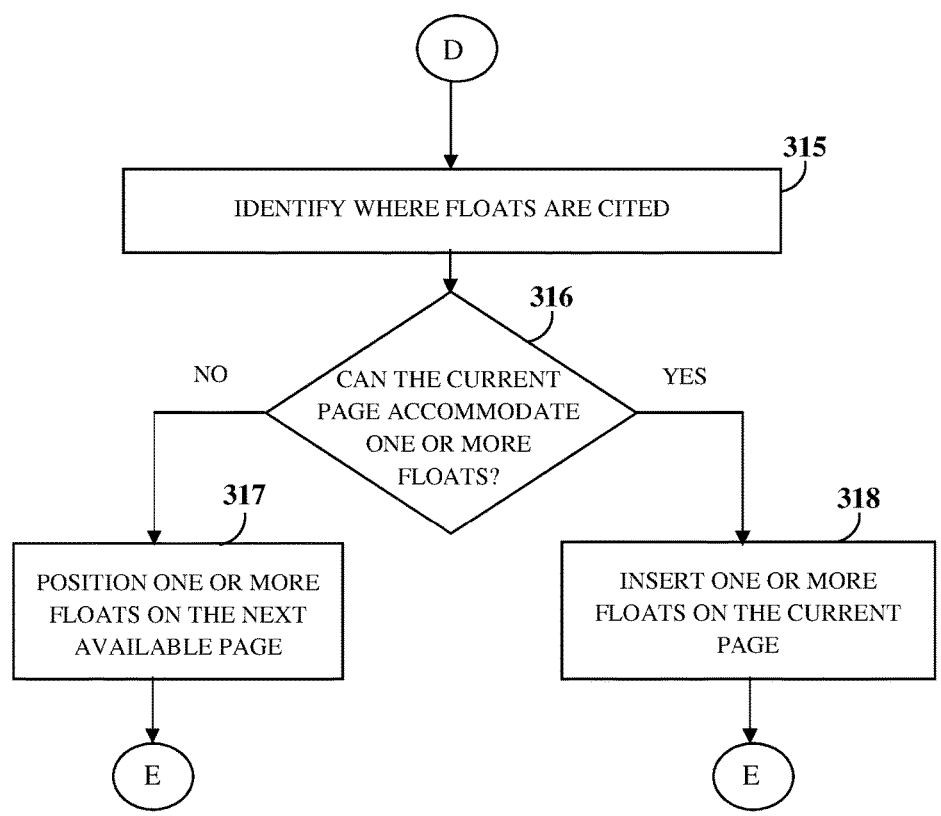

FIG. 3D exemplarily illustrates positioning of floats proximate to a first citation in the reflown hypertext markup language (HTML) content. The file format transformation system (FFTS) identifies 315 where the floats are cited in the reflown HTML content and checks 316 whether a current page can accommodate one or more floats. If the current page cannot accommodate one or more floats, the FFTS positions 317 one or more floats on the next available page proximate to their respective citation. If the current page can accommodate one or more floats, the FFTS inserts 318 one or more floats on the current page. For example, for a page with 500 pixels of fixed height, the FFTS examines each line from top to bottom until the FFTS reaches the specified page height of 500 pixels, while keeping track of the pixels covered. If the FFTS encounters a float before the 500 pixel height, the FFTS analyzes the float pixel dimension and the pixels covered so far and determines the sum of the float pixel dimension and the pixels covered till the point where the float was cited. If the sum exceeds the specified page height, for example, 500 pixels, the FFTS inserts the float on the next available page after the page break, in a way that the float follows the citation but does not precede the citation, and if the sum of the float pixel dimension and the pixels covered till the point where the float was cited is less than the specified page height, then the float is inserted on the same page proximate to its citation. After positioning of the floats proximate to a first citation in the reflown HTML content, the FFTS proceeds to the steps exemplarily illustrated in FIG. 3F.

Figure 3E:
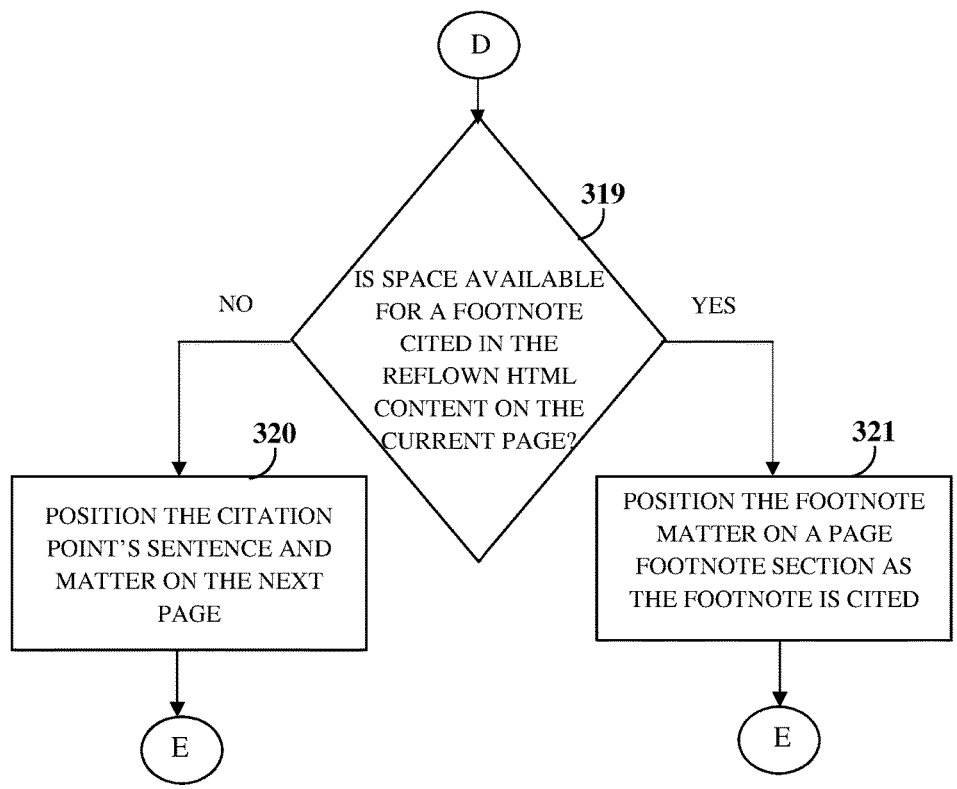

FIG. 3E exemplarily illustrates positioning of footnotes at relevant pages in the reversible file format. The file format transformation system (FFTS) identifies footnotes in the reflown hypertext markup language (HTML) content and checks 319 whether space is available for a footnote cited in the reflown HTML content in the current page. If space is not available in the current page, the FFTS positions 320 the footnote, that is, the citation point's sentence and matter, on the next page. If there is enough space available in the current page, the FFTS positions 321 the footnote matter on a page footnote section as the footnote is cited. For example, for a page with 500 pixels of fixed height, the FFTS examines each line from top to bottom until the FFTS reaches the specified page height of 500 pixels, keeping track of the pixels covered. If the FFTS encounters a footnote citation before the 500 pixel height, the FFTS analyzes the corresponding footnote pixel dimensions and the pixels covered so far and determines the sum of the footnote pixel dimension and the pixels covered till the point where the footnote was cited. If the sum exceeds the specified page height, for example, 500 pixels, the FFTS accommodates the footnote along with its citation on the next available page after the page break, and if the sum of the footnote pixel dimension and the pixels covered till the point where the footnote was cited is less than the specified page height, then the footnote is accommodated proximate to its citation in the same page at the bottom. After positioning the footnotes at relevant pages in the reversible file format, the FFTS proceeds to the steps exemplarily illustrated in FIG. 3F.

Figure 3F:
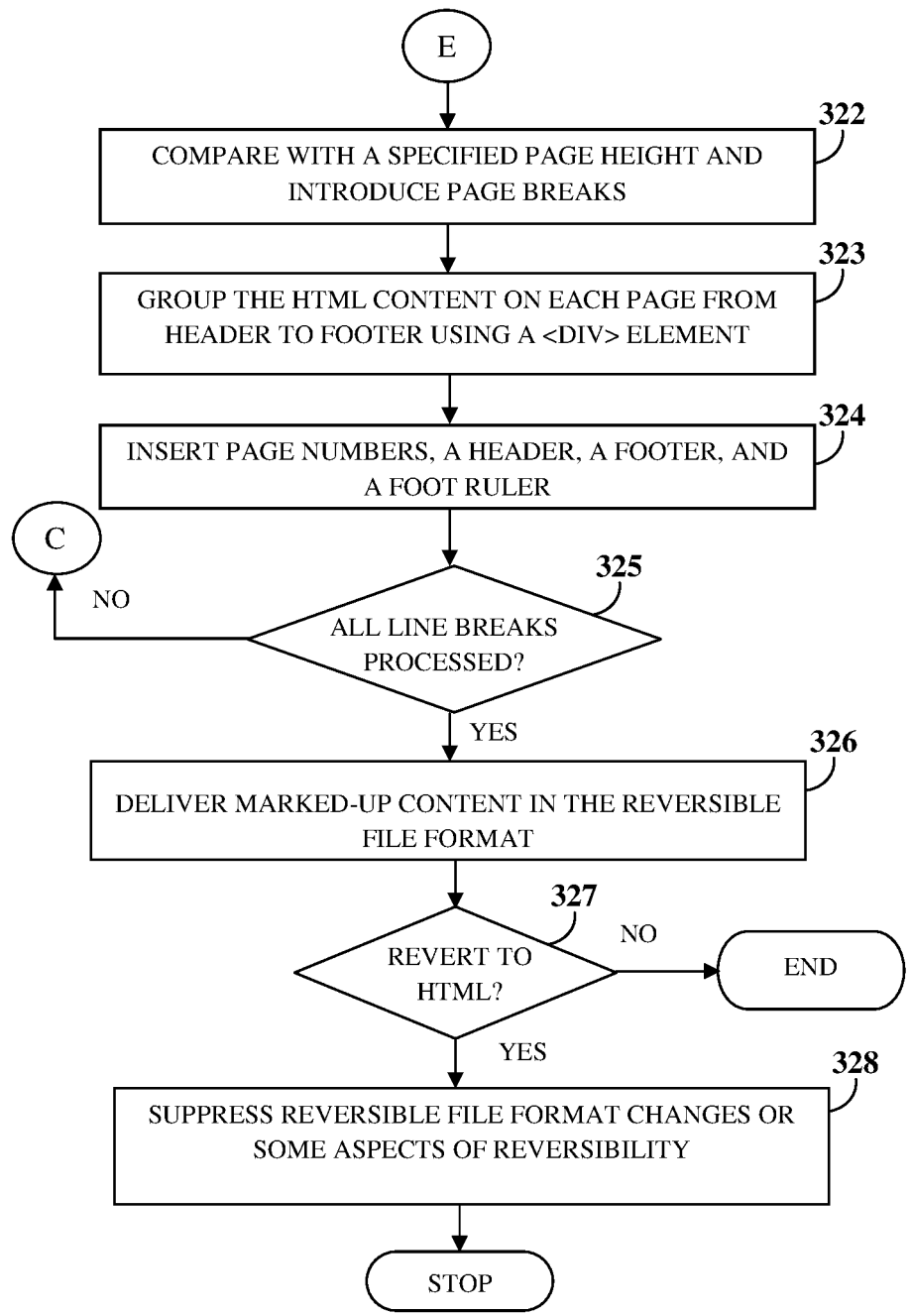

FIG. 3F exemplarily illustrates the rendering of the hypertext markup language (HTML) content in the reversible file format. The file format transformation system (FFTS) compares 322 the HTML content with a specified page height and introduces page breaks appropriately into the HTML content. The page breaks break the HTML content into individual pages of a predefined length. The FFTS groups 323 the HTML content on each page from header to footer using a <div> element. The FFTS inserts 324 page numbers into the individual pages based on a predefined numbering style, a header, a footer, and a footnote ruler wherever necessary. The FFTS checks 325 whether all the line breaks are processed. If all the line breaks are not processed, the FFTS iterates 311 all the line breaks as exemplarily illustrated in FIGS. 3B-3C. The FFTS then delivers 326 the marked-up content in the reversible file format. The FFTS provides an option to revert 327 the changes made in the reversible file format to the first file format, for example, the HTML format. If a user wants to revert from the reversible file format to the HTML format, the FFTS suppresses 328 the changes by hiding the changes in a background and displays the input HTML page having the input HTML content. Based on the user's token declaration disclosed in the detailed description of FIGS. 1A-1B, if the FFTS transforms the input HTML page to a partially reversible file format, and the user wants to revert from the partially reversible file format to the HTML format, the FFTS suppresses 328 some aspects of reversibility of the second file format of the input HTML page. To minimize programming complexity and rendering efficiency, in an embodiment, the FFTS reduces some levels of reversibility, while producing the same paginated output. Based on the user's token declaration not to revert to the HTML format, the FFTS transforms the input HTML page to a non-reversible format and the process ends.

FIGS. 4A-4B exemplarily illustrate screenshots showing edit views of marked-up content. FIG. 4A exemplarily illustrates a screenshot of an input hypertext markup language (HTML) page containing marked-up content without an edit window 402 in a right pane of a graphical user interface (GUI) 401. FIG. 4B exemplarily illustrates a screenshot of the input HTML page containing marked-up content showing the edit window 402 in the right pane of the GUI 401. A partial source code of the input HTML page in the edit view is provided below:

<div class="ce_section" id="sec0005" name="OPT_ID_899"><div class="sectionline_opt" data-heading-level="1" name="PC_2781330460" id="PC_2781330460"><span class="ce_label" name="OPT_ID_900">1</span><span class="x"> </span><span class="ce_section-title" name="OPT_ID_901">Introduction</span></div><div class="ce_para" id="par0005" name="OPT_ID_902"> The main objective is to develop a mechanistic model to replace the current empirical model in the evaluation of the standardized mass transfer coefficient (Kla<span class="ce_inf" name="OPT_ID_903">20</span>) being used by the ASCE Standard 2<span class="unicode-char">-</span>06 [<a title="bib0005" class="ce_cross-ref" name="OPT_ID_904" id="OPT_ID_904">1</a>, <a title="bib0010" class="ce_cross-ref" name="OPT_ID_905" id="OPT_ID_905">2</a>, <a title="bib0015" class="ce_cross-ref" name="OPT_ID_906" id="OPT_ID_906">3</a>]. The topic is about gas transfer in water, (how much and how fast), in response to changes in water temperature. This topic is important in<span name="LQ4"></span> wastewater treatment, fermentation, and other types of bioreactors. The capacity to absorb gas into liquid is usually expressed as solubility, Cs; whereas the mass transfer coefficient represents the speed of transfer, Kla, (in addition to the concentration gradient between the gas phase and the liquid phase which is not discussed here). These two factors, capacity, and speed, are related and the manuscript advocates the hypothesis that they are inversely proportional to each other, i.e., the higher the water temperature, the faster the transfer rate, but at the same time less gas will be transferred. </div></div>

FIG. 4C exemplarily illustrates a screenshot showing a proof view of the marked-up content rendered in a reversible file format. A partial source code of the input hypertext markup language (HTML) page containing the marked-up content in the proof view is provided below:

```
<div class="section"><span class="title_wrapper" data-trackaction="pgnBegAct#82 pgnBegAct#112"><div class="sectionline_opt" data-heading-level="1" name="PC_2781330460" id="PC_2781330460-proof" data-trackaction="pgnBegAct#112 pgnEndAct#28"><span class="ce_label" name="OPT_ID_900" data-trackaction="pgnBegAct#75 pgnBegAct#112">1.<span class="te"></span></span><span class="x" data-trackaction="pgnBegAct#74 pgnBegAct#74a"> <span class="te"></span></span><span class="ce_section-title" name="OPT_ID_901">Introduction<span class="te"></span></span></div></span><div class="ce_para" id="par0005-proof" name="OPT_ID_902" data-trackaction="pgnEndAct#28">The<span class="ws"> </span>main<span class="ws"> </span>ob &shy;jec &shy;tive<span class="ws"> </span>is<span class="ws"> </span>to<span class="ws"> </span>de &shy;velop<span class="ws"> </span>a<span class="ws"> </span>mech &shy;a &shy;nis &shy;tic<span class="ws"> </span>model<span class="ws"> </span>to<span class="ws"> </span>re &shy;place<span class="ws"> </span>the<span class="ws"> </span>cur &shy;rent<span class="ws"> </span>em &shy;pir<span class="wsbr"> </span>&shy;i&shy;cal<span class="ws"> </span>model<span class="ws"> </span>in<span class="ws"> </span>the<span class="ws"> </span>eval &shy;u &shy;a &shy;tion<span class="ws"> </span>of<span class="ws"> </span>the<span class="ws"> </span>stan &shy;dard &shy;ized<span class="ws"> </span>mass<span class="ws"> </span>trans &shy;fer<span class="ws"> </span>co &shy;ef &shy;fi &shy;cient<span class="ws"> </span>(Kla<span class="te"></span><span class="ce_inf" name="OPT_ID_903">20<span class="te"></span></span><span class="wsbr"> </span>be &shy;ing<span class="ws"> </span>used<span class="ws"> </span>by<span class="ws"> </span>the<span class="ws"> </span>ASCE<span class="ws"> </span>Stan &shy;dard<span class="ws"> </span>2<span class="te"></span><span class="unicode-char">-<span class="te"></span></span>06<span class="ws"> </span>[<span class="te"></span><a class="ce_cross-ref" name="OPT_ID_904" id="OPT_ID_904-proof" data-href="#bib0005-proof" data-trackaction="pgnBegAct#91 pgnBegAct#92 pgnEndAct#21 pgnEndAct#28">1<span class="te"></span></a>,<span class="ws"> </span><span class="te"></span><a class="ce_cross-ref" name="OPT_ID_905" id="OPT_ID_905-proof" data-href="#bib0010-proor data-trackaction="pgnBegAct#91 pgnBegAct#92 pgnEndAct#21 pgnEndAct#28">2<span class="te"></span></a>,<span class="ws"> </span><span class="te"></span><a class="ce_cross-ref" name="OPT_ID_906" id="OPT_ID_906-proof" data-href="#bib0015-proof" data-trackaction="pgnBegAct#91 pgnBegAct#92 pgnEndAct#21 pgnEndAct#28">3<span class="te"></span></a>].<span class="ws"> </span>The<span class="ws"> </span>topic<span class="ws"> </span>is<span class="ws"> </span>about<span class="ws"> </span>gas<span class="ws"> </span>trans &shy;fer<span class="ws"> </span>in<span class="wsbr"> </span>wa &shy;ter,<span class="ws"> </span>(how<span class="ws"> </span>much<span class="ws"> </span>and<span class="ws"> </span>how<span class="ws"> </span>fast),<span class="ws"> </span>in<span class="ws"> </span>re &shy;sponse<span class="ws"> </span>to<span class="ws"> </span>changes<span class="ws"> </span>in<span class="ws"> </span>wa &shy;ter<span class="ws"> </span>tem &shy;per &shy;a &shy;ture.<span class="ws"> </span>This<span class="wsbr"> </span>topic<span class="ws"> </span>is<span class="ws"> </span>im &shy;por &shy;tant<span class="ws"> </span>in<span class="te"></span><span name="LQ4"></span><span class="ws"> </span>waste &shy;water<span class="ws"> </span>treat &shy;ment,<span class="ws"> </span>fer &shy;men &shy;ta &shy;tion,<span class="ws"> </span>and<span class="ws"> </span>other<span class="ws"> </span>types<span class="ws"> </span>of<span class="ws"> </span>biore<span class="wsbr"> </span>&shy;ac &shy;tors.<span class="ws"> </span>The<span class="ws"> </span>ca &shy;pac &shy;ity<span class="ws"> </span>to<span class="ws"> </span>ab &shy;sorb<span class="ws"> </span>gas<span class="ws"> </span>into<span class="ws"> </span>liq &shy;uid<span class="ws"> </span>is<span class="ws"> </span>usu &shy;ally<span class="ws"> </span>ex &shy;pressed<span class="ws"> </span>as<span class="ws"> </span>sol &shy;u &shy;bil &shy;ity,<span class="ws"> </span>Cs;<span class="wsbr"> </span>whereas<span class="ws"> </span>the<span class="ws"> </span>mass<span class="ws"> </span>trans &shy;fer<span class="ws"> </span>co &shy;ef &shy;fi &shy;cient<span class="ws"> </span>rep &shy;re &shy;sents<span class="ws"> </span>the<span class="ws"> </span>speed<span class="ws"> </span>of<span class="ws"> </span>trans &shy;fer,<span class="ws"> </span>Kla,<span class="ws"> </span>(in<span class="ws"> </span>ad<span class="wsbr"> </span>&shy;di &shy;tion<span class="ws"> </span>to<span class="ws"> </span>the<span class="ws"> </span>con &shy;cen &shy;tra &shy;tion<span class="ws"> </span>gra &shy;di &shy;ent<span class="ws"> </span>be &shy;tween<span class="ws"> </span>the<spanclass="ws"> </span>gas<span
```

-continued

```
class="ws"> </span>phase<span class="ws"> </span>and<span class="ws">
</span>the<span class="ws"> </span>liq &shy;uid<span class="ws">
</span>phase<span class="wsbr"> </span>which<span class="ws"> </span>is<span
class="ws"> </span>not<span class="ws"> </span>dis &shy;cussed<span class="ws">
</span>here).<span class="ws"> </span>These<span class="ws"> </span>two<span
class="ws"> </span>fac &shy;tors,<span class="ws"> </span>ca &shy;pac
&shy;ity,<span class="ws"> </span>and<span class="ws"> </span>speed,<span
class="ws"> </span>are<span class="ws"> </span>re&shy;lated<span class="wsbr">
</span>and<span class="ws"> </span>the<span class="ws"> </span>man &shy;u
&shy;script<span class="ws"> </span>ad &shy;vo &shy;cates<span class="ws">
</span>the<span class="ws"> </span>hy &shy;poth &shy;e &shy;sis<span class="ws">
</span>that<span class="ws"> </span>they<span class="ws"> </span>are<span
class="ws"> </span>in &shy;versely<span class="ws"> </span>pro &shy;por
&shy;tional<span class="ws"> </span>to<span class="wsbr"> </span>each<span
class="ws"> </span>other,<span class="ws"> </span>i.e.,<span class="ws">
</span>the<span class="ws"> </span>higher<span class="ws"> </span>the<span
class="ws"> </span>wa &shy;ter<span class="ws"> </span>tem &shy;per &shy;a
&shy;ture,<span class="ws"> </span>the<span class="ws"> </span>faster<span
class="ws"> </span>the<span class="ws"> </span>trans &shy;fer<span class="ws">
</span>rate,<span class="ws"> </span>but<span class="ws"> </span>at<span
class="wsbr"> </span>the<span class="ws"> </span>same<span class="ws">
</span>time<span class="ws"> </span>less<span class="ws"> </span>gas<span
class="ws"> </span>will<span class="ws"> </span>be<span class="ws"> </span>trans
&shy;ferred.<span class="wsp"></span></div></div>
```

Figure 4D:
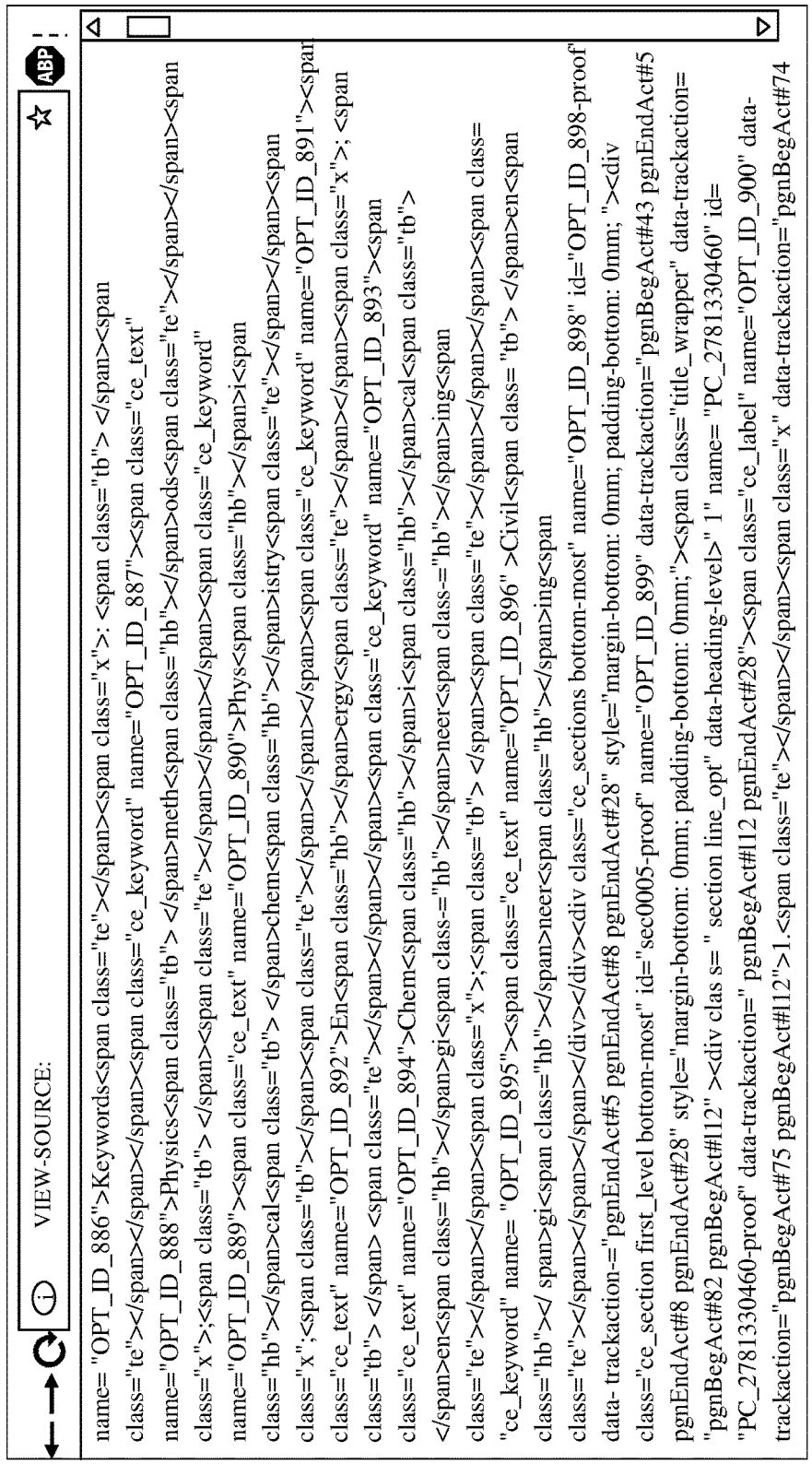
FIG. 4D exemplarily illustrates a screenshot showing a partial source code of the marked-up content rendered in a reversible file format.

The file format transformation system (FFTS) transforms the input hypertext markup language (HTML) page exemplarily illustrated in FIGS. 4A-4B, to an output page in the reversible file format, that is, the PH5 format as exemplarily illustrated in FIG. 4C. In the output page in the PH5 format, the FFTS replaces each of the word spaces identified in the marked-up content of the input HTML page exemplarily illustrated in FIG. 4A, with a tag <span class="ws">, and tags each of the line breaks with a tag <span class="wsbr">. In an embodiment, the FFTS hyphenates words where appropriate. The FFTS also introduces a tag <span class="fillerText"> to fill in orphan and widow sections with filler text. The FFTS retains the original HTML tags and appends the PH5 format tags to the marked-up content. FIG. 4D exemplarily illustrates a screenshot showing a partial source code of the marked-up content rendered in the reversible file format, that is, the PH5 format.

Figure 5:
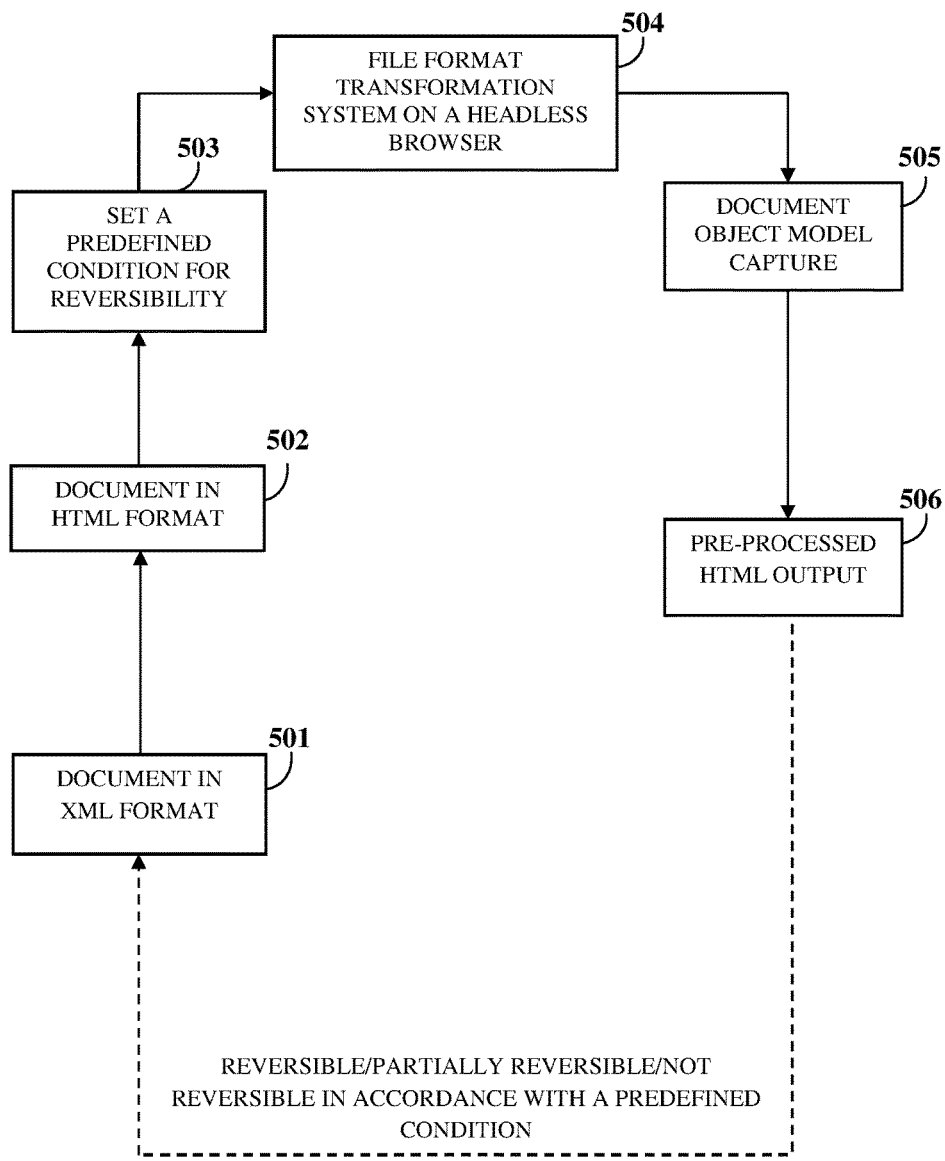
FIG. 5 exemplarily illustrates a flow diagram showing a process flow implemented by an embodiment of the file format transformation system deployed on a server for transforming marked-up content in a first file format to a second file format based on a selected level of reversibility.

FIG. 5 exemplarily illustrates a flow diagram showing a process flow implemented by an embodiment of the file format transformation system (FFTS) deployed on a server for transforming marked-up content in a first file format to a second file format based on a selected level of reversibility. In this embodiment, the FFTS receives a document in an extensible markup language (XML) format 501. The FFTS deployed on the server converts the document from the XML format 501 to an HTML format 502. The FFTS sets 503 a predefined condition for reversibility based on a selection of one of the different levels of reversibility, that is, complete or full reversibility, or partial reversibility, or non-reversibility indicated by a user, for example, via a graphical user interface (GUI) provided by the FFTS. The FFTS implemented on a headless browser 504 then transforms the document in the HTML format 502 to the second file format, for example, a reversible file format, or a partially reversible file format, or a non-reversible file format based on the set predefined condition. The FFTS captures 505 a document object model (DOM) of the HTML document and performs minimalistic manipulation to the DOM to generate a pre-processed HTML output document 506. The FFTS runs browser-based pagination scripts using the headless browser and renders the pre-processed HTML output document 506 having a level of reversibility selected by the user on a client device. With the implementation of the FFTS on the server, the FFTS renders the marked-up content in the HTML document ahead of demand to the client device. For example, a typical HTML page rendering on the client device takes about 15 seconds. With the server side implementation using the headless browser, the time consumed to render the HTML page on the client device is reduced to about 2 seconds.

Figure 6A:
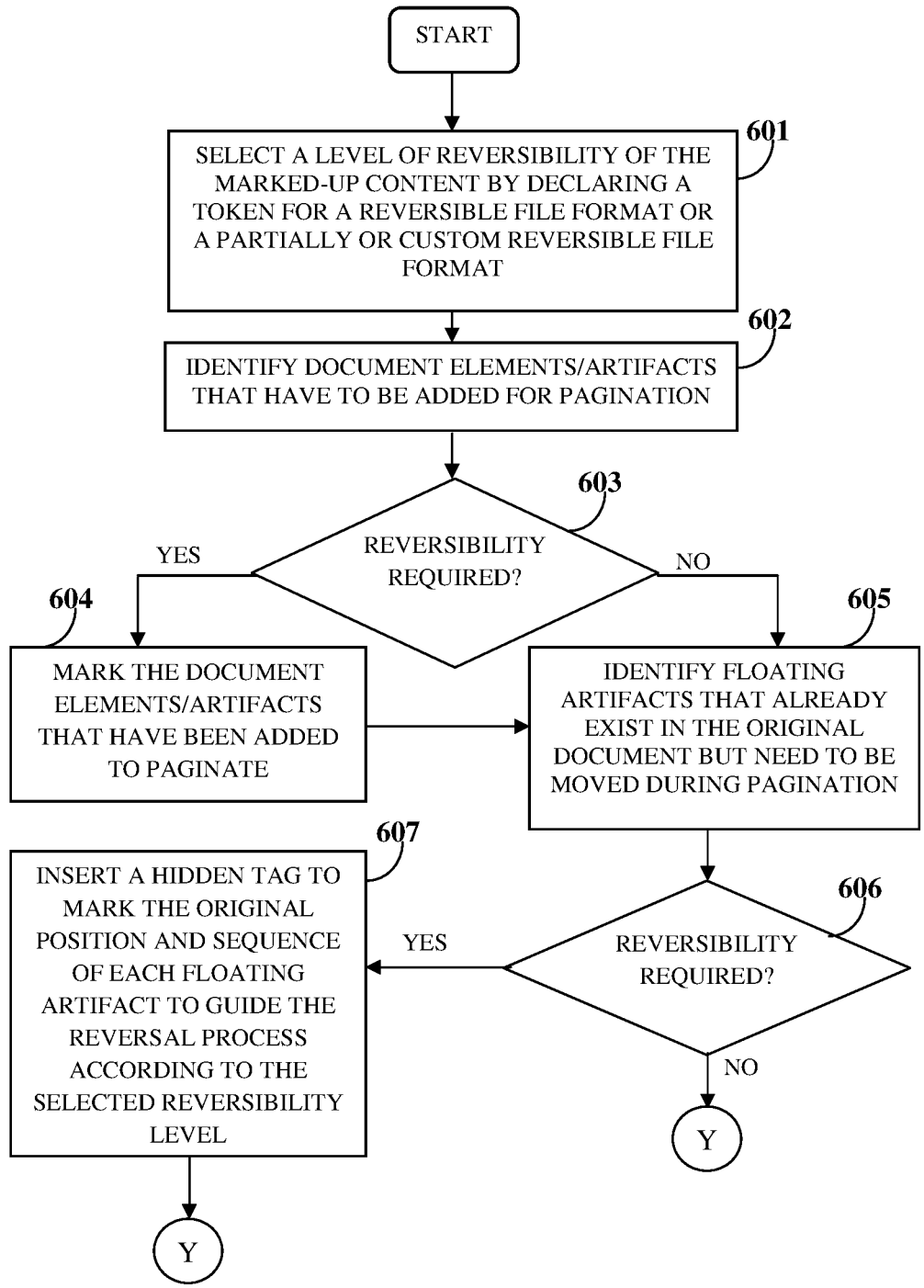
FIGS. 6A-6B exemplarily illustrate a flowchart comprising the steps performed by the file format transformation system for transforming marked-up content in a first file format to a second file format based on a selected level of reversibility.
Figure 6B:
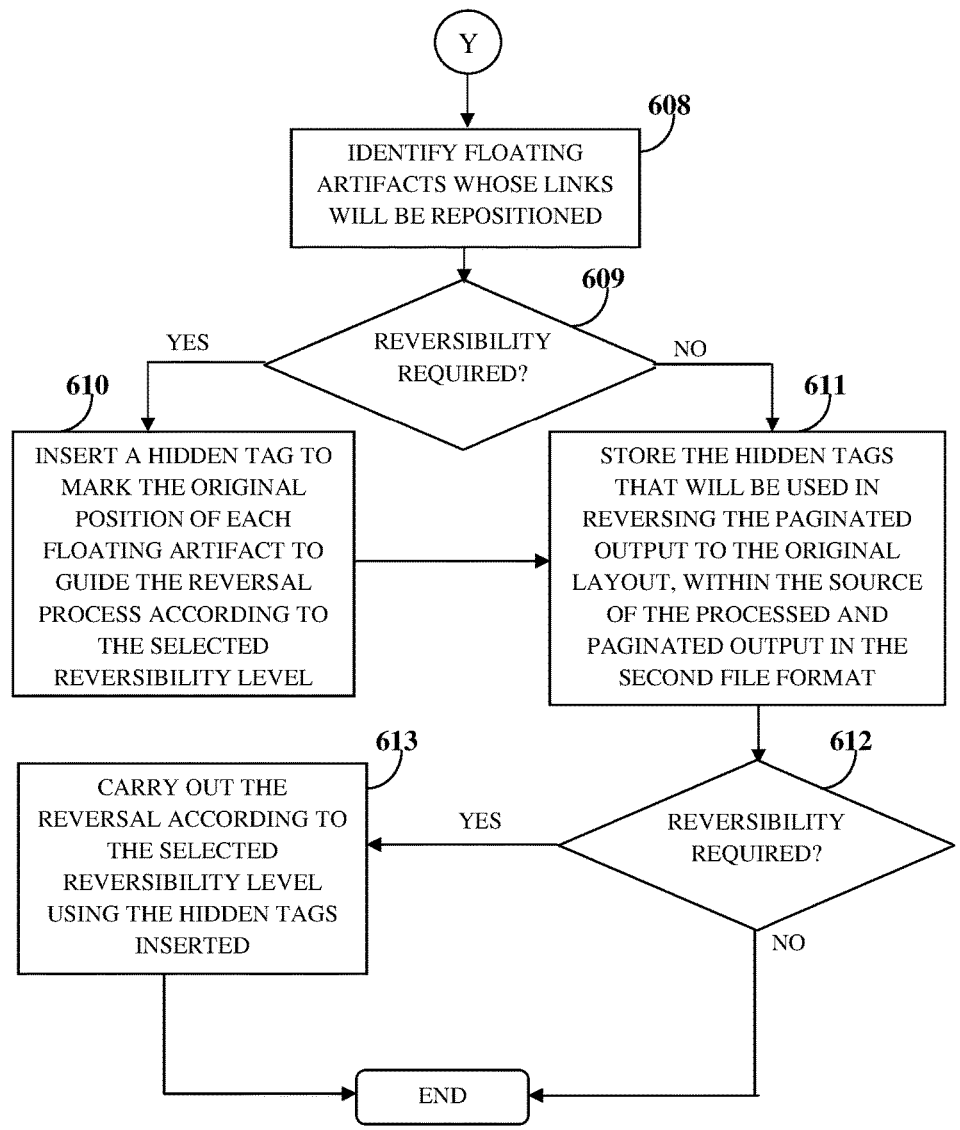

FIGS. 6A-6B exemplarily illustrate a flowchart comprising the steps performed by the file format transformation system (FFTS) for transforming marked-up content in a first file format to a second file format based on a selected level of reversibility. A user selects 601 a level of reversibility for completely or partially reversing the marked-up content of the second file format to the first file format by declaring a token for a reversible file format or a partially or custom reversible file format. The FFTS, using the token, determines whether to render the marked-up content in the second file format such that the marked-up content in the second file format can be completely or partially restored to the first file format. The FFTS identifies 602 document elements or artifacts that have to be added for pagination of the marked-up content that is in the first file format. The document elements or artifacts for pagination are the pagination elements, for example, page borders, header and footer placeholders, etc. The FFTS determines 603 whether reversibility of the marked-up content from the second file format to the first file format is required from the token declared by the user. If the declared token is for reversibility of the second file format to the first file format, the FFTS tracks the positions of the pagination elements for rendering the marked-up content with the pagination elements in the second file format with a desired level of reversibility. The FFTS marks 604 the document elements or the artifacts that have been added to paginate the marked-up content and proceeds to step 605. If reversibility of the second file format is not required, that is, if reversibility of the pagination elements in the second file format to the first file format is not required, the FFTS proceeds to identify 605 floating artifacts, that is, anchored floats, for example, figures, tables, etc., that already exist in the original document, that is, in the marked-up content of the first file format but need to be moved during pagination of the grouped marked-up content of the first file format.

After identifying the floating artifacts in the marked-up content of the first file format, the file format transformation system (FFTS) determines 606 whether reversibility of the floating artifacts in the marked-up content from the second file format to the first file format is required. If a reversible file format or a partially reversible file format is required, the FFTS inserts 607 a hidden tag to mark the original position and sequence of each floating artifact in the first file format. The hidden tag guides reversal of the marked-up content with the pagination elements from the second file format to the first file format based on the selected level of reversibility as defined by the declared token and then proceeds to step 608. If the reversibility of the floating artifacts in the second file format is not required, the FFTS identifies 608 other floating artifacts, that is, footnotes, for example, citations and references, whose links will be repositioned in the marked-up content of the second file format.

The file format transformation system (FFTS) determines 609 whether reversibility of the footnotes in the marked-up content from the second file format to the first file format is required. If reversibility of the footnotes in the marked-up content of the second file format is required, the FFTS inserts 610 a hidden tag to mark the original position of each floating artifact, that is, each footnote. The FFTS tracks positions of the identified footnotes in the marked-up content of the first file format to guide reversal of the marked-up content in the second file format to the first file format based on the selected level of reversibility and proceeds to step 611. If reversibility of the marked-up content from the second file format to the first file format is not required, the FFTS stores 611 the hidden tags that will be used in reversing the paginated output in the second file format to the original layout, that is, to the first file format, within the source of the processed and paginated output in the second file format. That is, the FFTS stores the hidden tags that will be used to reverse the paginated output in the second file format to the original layout of the continuous page within the client device. The FFTS determines 612 whether reversibility of the paginated output in the second file format to the first file format is required. If reversibility of the marked-up content from the second file format to the first file format is required, the FFTS carries 613 out the reversal according to the selected level of reversibility using the inserted hidden tags and ends the process. If reversibility of the marked-up content from the second file format to the first file format is not required, the FFTS ends the process.

Consider an example where a user selects the level of reversibility of the marked-up content in the second file format to be completely reversible to the first file format, for example, a hypertext markup language (HTML) format, that is, to be completely reversible to the continuous page with the original HTML layout. The user, accordingly, declares a token for a reversible file format. The file format transformation system (FFTS), using the token, determines to render the marked-up content in the selected reversible file format such that the marked-up content in the reversible file format can be completely restored to the HTML format. In this example, the FFTS identifies the pagination elements that have to be added for pagination of the marked-up content in the HTML format. The FFTS determines that the declared token is for the reversible file format and tracks the positions of the pagination elements for rendering the marked-up content with the pagination elements in the reversible file format. The FFTS further marks the document elements or the artifacts, for example, the page borders, the header and footer place holders, etc., that have been added to paginate the marked-up content that is in the HTML format. The FFTS then identifies floating artifacts, that is, anchored floats, for example, figures, tables, etc., that already exist in the marked-up content of the HTML format but need to be moved during pagination of the grouped marked-up content of the HTML format. The FFTS determines that reversibility of the floating artifacts in the marked-up content from the reversible file format to the HTML format is required from the declared token. The FFTS inserts a hidden tag to mark the original position and sequence of each floating artifact in the HTML format. The hidden tag guides reversal of the marked-up content in the reversible file format with the pagination elements to the HTML format as defined by the declared token.

The file format transformation system (FFTS) proceeds to identify other floating artifacts, that is, footnotes, for example, citations and references, whose links will be repositioned in the marked-up content of the reversible file format. The FFTS determines that the reversibility of the footnotes in the marked-up content from the reversible file format to the HTML format is required. The FFTS inserts a hidden tag to mark the original position of each floating artifact, that is, each footnote. The FFTS tracks positions of the identified footnotes in the marked-up content of the HTML format to guide reversal of the marked-up content in the reversible file format to the HTML format. The FFTS stores the hidden tags that will be used in reversing the paginated output in the reversible file format to the original layout, that is, the HTML format, within the source of the processed and paginated output in the reversible file format. That is, the FFTS stores the hidden tags that will be used to reverse the paginated output in the reversible file format to the original layout of the continuous page within the client device. For reversal of the reversible file format to the HTML format, the FFTS carries out the reversal using the inserted hidden tags for the floating artifacts and the positions of the pagination elements.

Consider another example where a user selects the level of reversibility of the marked-up content in the second file format to be partially reversible to the first file format, for example, a hypertext markup language (HTML) format. The marked-up content in the HTML format comprises anchored floats in original positions, footnotes in original positions, and no pagination elements. In the second file format, the file format transformation system (FFTS) inserts pagination elements into the marked-up content of the HTML format. Due to pagination of the marked-up content in the HTML format, the FFTS moves the anchored floats to new positions in the second file format. Also, the FFTS repositions the footnotes in the second file format. In this example, the user selects a level of reversibility for partially reversing the marked-up content of the second file format to the first file format by declaring a token for a partially reversible file format. The FFTS, using the token, determines to render the marked-up content in the partially reversible file format such that the marked-up content in the partially reversible file format can be partially restored to the HTML format. In this example, partially restoring the marked-up content in the partially reversible file format to the HTML format comprises removing the inserted pagination elements and moving the footnotes to the original positions as in the HTML format, while retaining the anchored floats in their new positions in the HTML format. Thus, in partial reversibility of the second file format to the first file format, reversibility of only the pagination elements and the footnotes to the first file format is selected in this example.

In this example, the file format transformation system (FFTS) identifies the pagination elements, for example, the page borders, the header and footer placeholders, etc., that have to be added for pagination of the marked-up content in the hypertext markup language (HTML) format. The FFTS determines that reversibility of the pagination elements from the partially reversible file format to the HTML format is required from the declared token and tracks the positions of the pagination elements for rendering the marked-up content with the pagination elements in the partially reversible file format. The FFTS also marks the pagination elements that have been added to paginate the marked-up content in the HTML format. The FFTS proceeds to identify the anchored floats, for example, figures, tables, etc., that already exist in the marked-up content of the HTML format but need to be moved during pagination of the grouped marked-up content of the HTML format.

After identifying the anchored floats in the marked-up content of the hypertext markup language (HTML) format, the file format transformation system (FFTS) determines whether reversibility of the anchored floats in the marked-up content of the partially reversible file format is required. In this example, since the reversibility of the anchored floats from the partially reversible file format to the HTML format is not required, the FFTS proceeds to identify footnotes, for example, citations and references, whose links will be repositioned in the marked-up content of the partially reversible file format. In this example, the FFTS does not insert tags to mark the original positions and sequence of the anchored floats in the HTML format.

The file format transformation system (FFTS) then determines that reversibility of the footnotes in the marked-up content from the partially reversible file format to the hypertext markup language (HTML) format is required and inserts a hidden tag to mark the original position of each footnote. The FFTS tracks positions of the identified footnotes in the marked-up content of the HTML format to guide reversal of the marked-up content in the partially reversible file format to the HTML format. The FFTS stores the hidden tags for the pagination elements and the footnotes that will be used in partially reversing the paginated output in the partially reversible file format to the original layout of the continuous page within the client device. The FFTS determines that partial reversibility of the paginated output in the partially reversible file format to the HTML format is required and carries out the partial reversal accordingly using the inserted hidden tags. On reversing the partially reversible file format to the HTML format, the marked-up content in the HTML format comprises the footnotes in their original positions, the anchored floats in their new positions, and the inserted pagination elements removed.

Consider another example where a user selects the level of reversibility of the second file format to be non-reversible to the hypertext markup language (HTML) format. The user, accordingly, declares a token for a non-reversible file format. The file format transformation system (FFTS), using the token, determines to render the marked-up content in the non-reversible file format such that the marked-up content is retained in the non-reversible file format. The FFTS identifies document elements or artifacts, that is, pagination elements, for example, the page borders, the header and footer place holders, etc., that have to be added for pagination of the marked-up content in the HTML format. The FFTS determines that reversibility of the pagination elements in the marked-up content of the non-reversible file format to the HTML format is not required and proceeds to identify floating artifacts, that is, anchored floats, for example, figures, tables, etc., that already exist in the marked-up content of the HTML format but need to be moved during pagination of the grouped marked-up content of the HTML format.

After identifying the floating artifacts in the marked-up content of the HTML format, the file format transformation system (FFTS) identifies other floating artifacts, that is, footnotes, for example, citations and references, whose links will be repositioned in the marked-up content of the HTML format. In this example, as reversibility of the marked-up content from the non-reversible file format to the HTML format is not required, the FFTS does not insert or store hidden tags used for reversing the paginated output to the original layout, that is, the HTML format, within the source of the processed and paginated output in the non-reversible file format.

Figure 7A:
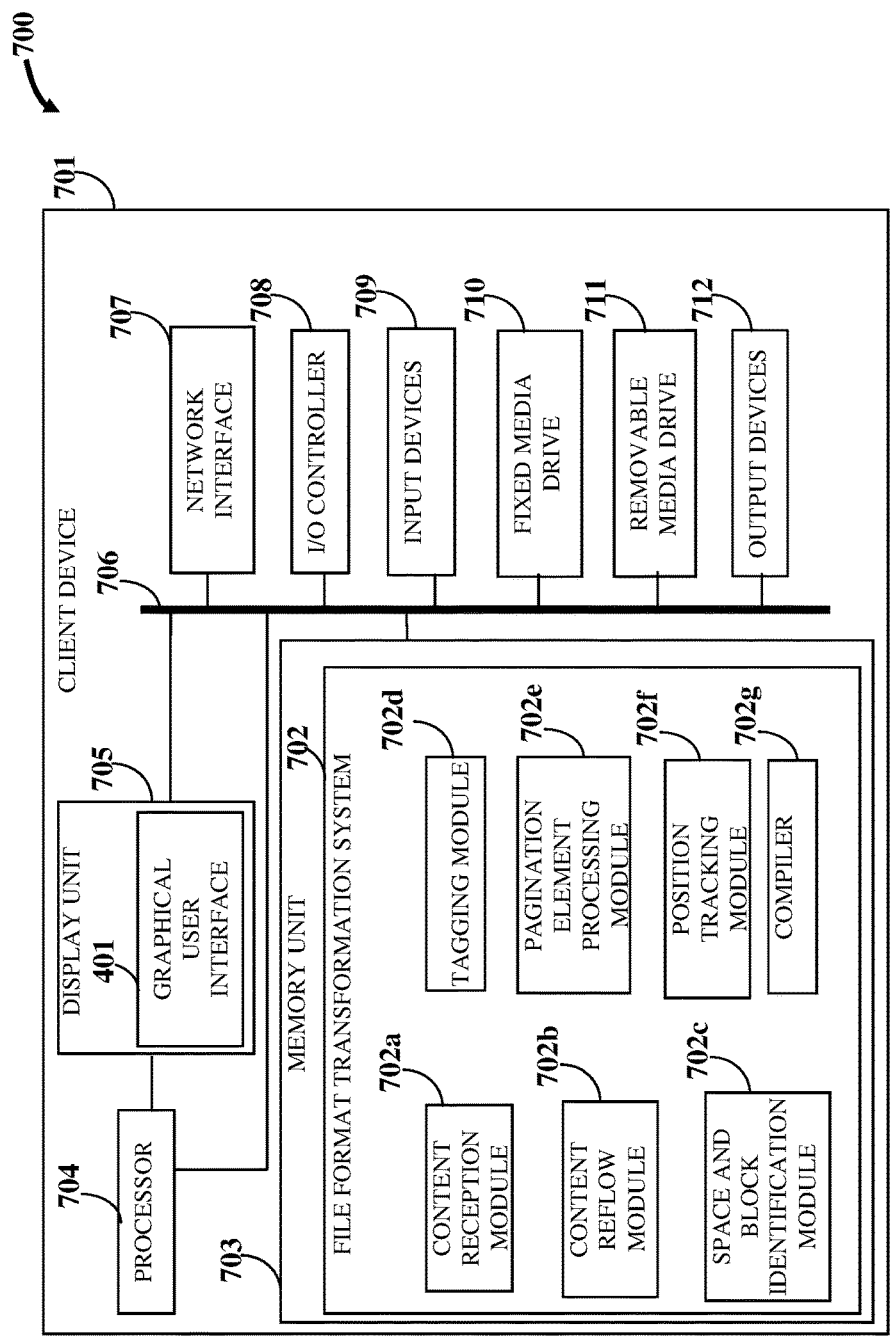
FIG. 7A exemplarily illustrates a system comprising the file format transformation system deployed on a client device for transforming marked-up content in a first file format to a second file format that enables automated browser based pagination.

FIG. 7A exemplarily illustrates a system 700 comprising the file format transformation system (FFTS) 702 deployed on a client device 701 for transforming marked-up content in a first file format to a second file format that enables automated browser based pagination. The client device 701 can be, for example, a personal computer, a tablet computing device, a mobile computer, a mobile phone, a smart phone, a portable computing device, a laptop, a personal digital assistant, a touch centric device, a workstation, a portable electronic device, a network enabled computing device, an interactive network enabled communication device, any other suitable computing equipment, combinations of multiple pieces of computing equipment, etc. The client device 701 is a computer system that is programmable using a high level computer programming language. In an embodiment, the FFTS 702 is implemented on the client device 701 using programmed and purposeful hardware. In an embodiment, the FFTS 702 is implemented as a standalone software application on the client device 701. In the client device 701, the FFTS 702 employs a browser as a client application. In an embodiment, the FFTS 702 is accessible to a user through a broad spectrum of technologies and devices, for example, cellular phones, tablet computing devices, etc., with access to the internet. The FFTS 702 comprises a content reception module 702a, a content reflow module 702b, a space and block identification module 702c, a tagging module 702d, a pagination element processing module 702e, a position tracking module 702f, and a compiler 702g.

As exemplarily illustrated in FIG. 7A, the client device 701 comprises a non-transitory computer readable storage medium such as a memory unit 703 for storing computer programs and data, a processor 704 communicatively coupled to the non-transitory computer readable storage medium, a display unit 705, a data bus 706, a network interface 707, an input/output (I/O) controller 708, input devices 709, a fixed media drive 710 such as a hard drive, a removable media drive 711 for receiving removable media, output devices 712, etc. As used herein, "non-transitory computer readable storage medium" refers to all computer readable media, for example, non-volatile media, volatile media, and transmission media, except for a transitory, propagating signal. Non-volatile media comprise, for example, solid state drives, optical discs or magnetic disks, and other persistent memory volatile media including a dynamic random access memory (DRAM), which typically constitute a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to the processor 704. The non-transitory computer readable storage medium stores computer program instructions defined by modules, for example, 702a, 702b, 702c, 702d, 702e, 702f, 702g, etc., of the file format transformation system (FFTS) 702.

The memory unit 703 is used for storing computer programs, applications, and data. For example, the content reception module 702a, the content reflow module 702b, the space and block identification module 702c, the tagging module 702d, the pagination element processing module 702e, the position tracking module 702f, the compiler 702g, etc., of the file format transformation system (FFTS) 702 exemplarily illustrated in FIG. 7A, are stored in the memory unit 703 of the client device 701. The memory unit 703 is, for example, a random access memory (RAM) or another type of dynamic storage device that stores information and instructions for execution by the processor 704. The memory unit 703 also stores temporary variables and other intermediate information used during execution of the instructions by the processor 704. The client device 701 further comprises a read only memory (ROM) or another type of static storage device that stores static information and instructions for the processor 704.

The processor 704 executes the computer program instructions defined by the modules, for example, 702a, 702b, 702c, 702d, 702e, 702f, 702g, etc., of the file format transformation system (FFTS) 702. The processor 704 refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. In an embodiment, the processor 704 is implemented as a processor set comprising, for example, a programmed microprocessor and a math or graphics co-processor. The processor 704 is selected, for example, from the Intel® processors such as the Itanium® microprocessor or the Pentium® processors, Advanced Micro Devices (AMD®) processors such as the Athlon® processor, Ultra-SPARC® processors, microSPARC® processors, hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The FFTS 702 disclosed herein is not limited to employing a processor 704. In an embodiment, the FFTS 702 employs a controller or a microcontroller. The processor 704 executes the modules, for example, 702a, 702b, 702c, 702d, 702e, 702f, 702g, etc., of the FFTS 702.

The content reception module 702a of the file format transformation system (FFTS) 702 receives the marked-up content of the first file format, for example, the hypertext markup language (HTML) format. An example of a pseudo-code of the content reception module 702a executed by the processor 704 of the client device 701 for receiving the marked-up content of the first file format is provided below:

```
function receiveContent(self, container, source) {
    var innerContainer = null, paginator = null; var content = null;
    generateContentContainer(self, container);
    paginator = domHelper.create('div');
    paginator.classList.add('paginator');
    domHelper.append(paginator, container);
    content = source;
    content = insertSoftHyphensForAllWords(content);
    innerContainer = self.domHelper.find(container, '.paginator');
    innerContainer.innerHTML = source;
}
```

The content reflow module 702b of the file format transformation system (FFTS) 702 reflows the received marked-up content of the first file format into a continuous page having a configurable page width. An example of a pseudo-code of the content reflow module 702b executed by the processor 704 of the client device 701 for reflowing the received marked-up hypertext markup language (HTML) content is provided below:

```
var options = {
    "options": {
        "page": {
            "height": "262",
            "width": "192",
            "unit": "mm"
        }
    }
}
function reflowContent(options) {
    var width = [
        "width",
        ":",
        self.options.page.width,
        self.options.page.unit
    ].join('');
    self.domHelper.addOrModifyAttribute('style', width, target);
}
```

The space and block identification module 702c of the file format transformation system (FFTS) 702 identifies spaces and block elements in the reflown marked-up content of the first file format. An example of a pseudocode of the space and block identification module 702c executed by the processor 704 of the client device 701 for identifying and tagging spaces and block elements in the reflown marked-up hypertext markup language (HTML) content is provided below:

```
function putSpanForWordSpace(self, content) {
    var ws = self.ws;
    contentfind('*:visible').contents( ).filter(function ( ) {
        var value = "";
        if (this.nodeType === 3) {
            value = this.nodeValue;
            if (value.indexOf(" ") !== -1) {
                return true;
            }
        }
        return false;
    })
    .replaceWith(function ( ) {
        var str = "", spaces = [ ], replacedStr = "", dummy = null,
            finalstr = "",
        str = jQ(this).text( );
        dummy = jQ('<div></div>');
        finalstr = dummy.text(str).html( );
        spaces = finalstr.split(' ');
        replacedStr = spaces.join("<span data-ph5='ws'> </span>");
        return replacedStr;
    });
}
function identifyBlockElements(content) {
    visibleDivs = content.find('div:visible');
    length = visibleDivs.length;
    for (; i < length; i += 1) {
        visibleDiv = jQ(visibleDivs[i]);
```

```
        if (visibleDiv.css('display') !== "inline") {
            visibleDiv.append("<div data-ph5='wsp'></div>");
        }
      }
    }
  }
```

The tagging module 702d of the file format transformation system (FFTS) 702 generates and appends tags to the identified spaces and the identified block elements in the reflown marked-up content of the first file format. For each of the identified spaces and the identified block elements, the pagination element processing module 702e determines line breaks in the reflown marked-up content of the first file format based on preconfigured criteria associated with the appended tags. The tagging module 702d tags the determined line breaks. An example of the pseudocode of the pagination element processing module 702e executed by the processor 704 of the client device 701 for determining the line breaks is provided below:

```
function determineLineBreaks( ) {
    paginationElements = content.find("span.ws,span.shy,div.wsp");
    length = paginationElements.length;
    for (; i < length; i += 1) {
        linebreak = false;
        curElement = jQ(paginationElements[i]);
        if ((curElement.class('ws') == true) &&
(curElement.width( ) == 0)) {
            linebreak = true;
        }
        else if ((curElement.class('shy') == true) &&
(curElement.width( ) == 1)) {
            linebreak = true;
        }
        else if (curElement.class('wsp') == true) {
            linebreak = true;
        }
        if (linebreak == true) {
            introduceLineBreak( );
        }
    }
}
```

For each of the determined line breaks, the pagination element processing module 702e identifies anchored floats in the reflown marked-up content of the first file format. The tagging module 702d tags the identified anchored floats. Further, for each of the determined line breaks, the pagination element processing module 702e positions the tagged anchored floats on a current page based on availability of space for the tagged anchored floats on the current page. The pagination element processing module 702e positions the tagged anchored floats proximal to associated float citations on the current page based on the availability of space for the tagged anchored floats on the current page. An example of a pseudocode of the pagination element processing module 702e executed by the processor 704 of the client device 701 for positioning anchored floats in the output hypertext markup language (HTML) document is provided below:

```
if (lbr.hasClass('float-anchor') === true) { // if a line has float
anchor
    floatHeight = getFloatHeight(floatItem);
    if (currentFilledHeight + floatHeight < pageHeight) {
        pushFloatToCurrentPage(floatItem);
        currentFilledHeight = currentFilledHeight + floatHeight;
    } else {
        pushFloatToNextAvailablePage(floatItem);
    }
}
```

Further, for each of the determined line breaks, the pagination element processing module 702e of the file format transformation system (FFTS) 702 identifies footnotes in the reflown marked-up content of the first file format. The tagging module 702d tags the identified footnotes. Further, for each of the determined line breaks, the pagination element processing module 702e positions the tagged footnotes at a footnote section on the current page based on availability of space for the tagged footnotes on the current page. The pagination element processing module 702e positions the tagged footnotes proximal to associated footnote citations on the current page based on the availability of space for the tagged footnotes on the current page. An example of a pseudocode of the pagination element processing module 702e executed by the processor 704 of the client device 701 for positioning footnotes in the output hypertext markup language (HTML) document is provided below:

```
if (lbr.hasClass('footnote') === true) { // if a line has footnote
    footnoteHeight = getFootnoteHeight(footnoteItem);
    if (currentFilledHeight + footnoteHeight < pageHeight) {
        pushFootnoteToCurrentPage(footnoteItem);
        currentFilledHeight = currentFilledHeight + footnoteHeight;
    } else {
        pushCurrentLineAndRelatedFootnotesToNextPage( );
    }
}
```

Further, the pagination element processing module 702e positions page breaks in the continuous page based on a configurable page height and the determined line breaks for the positioning of the tagged anchored floats and the tagged footnotes on a subsequent page on non-availability of space on the current page. An example of a pseudocode of the pagination element processing module 702e executed by the processor 704 of the client device 701 for creating pages in the output hypertext markup language (HTML) document is provided below:

```
var wordSpaces = $(document.body).find('span.ws,div.wsp');
for(var i=0; i < wordSpaces.length; i++) {
    var ws = wordSpaces.eq(i);
    if(ws.width( ) == 0 || ws.attr('class') == 'wsp' ) { // its a line break
        var y = ws.offset( ).top;
        if(y-ydef > px) {
            pageSize.push(y-ydef);
            ydef = y;
            pageBreak = ws.attr('class','wspbr');
        }
    }
}
```

The compiler 702g of the file format transformation system (FFTS) 702 groups the marked-up content with the positioned anchored floats and the positioned footnotes on each page. The pagination element processing module 702e inserts one or more pagination elements, for example, page numbers, a header, a footer, a footnote ruler, fillers, etc., on each page containing the grouped marked-up content. An example of the pseudocode of the compiler 702g executed by the processor 704 of the client device 701 for performing the steps of grouping and insertion of page numbers is provided below:

```
function makePageBlocks( ) {
    var pageBreaks = content.find(".wspr");
    var startPage = content.top( );
    for(var i=0; i < pageBreaks.length; i++) {
       endPage = pageBreaks[i];
       wrapPageWithNumber("<div class='page" + i + "'>", i, start-
Page,
endPage);
       startPage = endPage;
    }
}
```

The compiler 702g renders the grouped marked-up content with the inserted pagination elements in the second file format based on a selected level of reversibility. That is, the second file format is a reversible file format, or a partially reversible file format, or a non-reversible file format. The reversible file format allows the marked-up content to be completely reversed to the first file format to restore the continuous page. The pagination element processing module 702e handles grouped elements comprising, for example, a float and a caption associated with the float in the second file format at a position assigned in the marked-up content of the first file format to the float. If a user wants to revert back to the input marked-up content page, the compiler 702g completely or partially reverses the marked-up content in the second file format, for example, the reversible file format or the partially reversible file format to the first file format to completely or partially restore the continuous page. An example of the pseudocode of the compiler 702g executed by the processor 704 of the client device 701 for reversing the marked-up content in the PH5 format to the marked-up content in the original input hypertext markup language (HTML) format is provided below:

```
function removePaginationArtifacts( ) {
    var headerFooter = content.find(".page-header-footer");
    headerFooter.remove( );
    var footnotes = content.find(".footnote");
    footnotes.moveToEndOfDocument( );
    var floats = content.find(".floats");
    floats.moveAfterCitationPara( );
    var paginationElements = content.find(".ws,.shy,.wsp");
    paginationElements.removeTagsWithContent( );
    removeSoftHyphensAndPseudoBreaks( );
}
```

The position tracking module 702f of the file format transformation system (FFTS) 702 tracks positions of the identified anchored floats and the identified footnotes in the reflown marked-up content of the first file format, and positions of the page breaks in the continuous page prior to the grouping of the marked-up content by the compiler 702g and the insertion of the pagination elements on each page by the pagination element processing module 702e for rendering the grouped marked-up content with the inserted pagination elements in the second file format based on the selected level of reversibility. An example of a pseudocode of the position tracking module 702f executed by the processor 704 of the client device 701 for tracking the anchored floats and the footnotes in the reflown marked-up content of the first file format is provided below:

```
function anchorFloats (floats) {
    floats.forEach (float) {
       var anchor = document.createElement("a");
       anchor.addAttribute("id", floatID);
       anchor.appendElement(float);
    }
}
```

Furthermore, the position tracking module 702f tracks positions of the inserted pagination elements for rendering the grouped marked-up content with the inserted pagination elements in the second file format based on the selected level of reversibility. An example of a pseudocode of the position tracking module 702f executed by the processor 704 of the client device 701 for tracking the pagination elements, for example, header, footer, page-number-folio, page-break, borders, etc., in the reflown marked-up content of the first file format is provided below:

```
function tagPageElements (foos) {
    foos.forEach (foo) {
       var tag = document.createElement("div");
       tag.addAttribute("class", "pageElements");
       wrapElement(tag, foo);
    }
}
/* CSS style: */
div.pageElements {
    display: none;
}
```

The display unit 705 of the client device 701, via the graphical user interface (GUI) 401 displays information such as the marked-up content, display interfaces, user interface elements such as text fields, etc., for allowing a user of the file format transformation system (FFTS) 702 to view an input page in the first file format and a processed, transformed and paginated output page in the second file format. The display unit 705 comprises, for example, a liquid crystal display, a plasma display, an organic light emitting diode (OLED) based display, etc. The data bus 706 permits communications between the modules, for example, 703, 704, 705, 707, 708, 709, 710, 711, 712, etc., of the client device 701. The network interface 707 enables connection of the client device 701 to a network, for example, a short range network or a long range network. In an embodiment, the network interface 707 is provided as an interface card also referred to as a line card. The network interface 707 is, for example, one or more of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The I/O controller 708 controls input actions and output actions performed by the FFTS 702.

The input devices 709 are used for inputting data into the client device 701. Users of the client device 701 use the input devices 709 to provide inputs to the file format transformation system (FFTS) 702. For example, a user may enter a file format, declare a token to select a level of reversibility of the marked-up content from the second file format to the first file format, or edit an input page on the graphical user interface (GUI) 401 using the input devices 709. The input devices 709 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc. Computer applications and computer programs are used for operating the FFTS 702. The computer programs are loaded onto the fixed media drive 710 and into the memory unit 703 of the client device 701 via the removable media drive 711. In an embodiment, the computer applications and computer programs are loaded directly via a network. Computer applications and computer programs are executed by double clicking a related icon displayed on the display unit 705 using one of the input devices 709. The output devices 712, for example, a printer outputs the results of operations performed by the FFTS 702. For example, the FFTS 702 renders the paginated output page in the second file format using the output devices 712.

The processor 704 of the client device 701 executes an operating system selected, for example, from the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., Palm OS®, the Solaris operating system developed by Sun Microsystems, Inc., the Android operating system, the Windows Phone® operating system of Microsoft Corporation, the BlackBerry® operating system of BlackBerry Limited, the iOS operating system of Apple Inc., the Symbian™ operating system of Symbian Foundation Limited, etc. The file format transformation system (FFTS) 702 employs the operating system for performing multiple tasks. The operating system is responsible for management and coordination of activities and sharing of resources of the client device 701. The operating system further manages security of the FFTS 702, peripheral devices connected to the client device 701, and network connections. The operating system employed on the client device 701 recognizes, for example, inputs provided by the users using one of the input devices 709, the output display, files, and directories stored locally on the fixed media drive 710. The operating system on the client device 701 executes different computer programs using the processor 704. The processor 704 and the operating system together define a computer system for which application programs in high level programming languages are written.

The processor 704 of the client device 701 retrieves instructions defined by the content reception module 702a, the content reflow module 702b, the space and block identification module 702c, the tagging module 702d, the pagination element processing module 702e, the position tracking module 702f, and the compiler 702g, for performing respective functions disclosed above. The processor 704 retrieves instructions for executing the modules, for example, 702a, 702b, 702c, 702d, 702e, 702f, 702g, etc., of the FFTS 702 from the memory unit 703. A program counter determines the location of the instructions in the memory unit 703 of the client device 701. The program counter stores a number that identifies the current position in the computer program of each of the modules, for example, 702a, 702b, 702c, 702d, 702e, 702f, 702g, etc., of the FFTS 702. The instructions fetched by the processor 704 from the memory unit 703 after being processed are decoded. The instructions are stored in an instruction register in the processor 704. After processing and decoding, the processor 704 executes the instructions, thereby performing one or more processes defined by those instructions.

At the time of execution, the instructions stored in the instruction register are examined to determine the operations to be performed. The processor 704 then performs the specified operations. The operations comprise arithmetic operations and logic operations. The operating system performs multiple routines for performing a number of tasks required to assign the input devices 709, the output devices 712, and memory for execution of the modules, for example, 702a, 702b, 702c, 702d, 702e, 702f, 702g, etc., of the file format transformation system (FFTS) 702. The tasks performed by the operating system comprise, for example, assigning memory to the modules, for example, 702a, 702b, 702c, 702d, 702e, 702f, 702g, etc., of the FFTS 702, and to data used by the FFTS 702, moving data between the memory unit 703 and disk units, and handling input/output operations. The operating system performs the tasks on request by the operations and after performing the tasks, the operating system transfers the execution control back to the processor 704. The processor 704 continues the execution to obtain one or more outputs. The outputs of the execution of the modules, for example, 702a, 702b, 702c, 702d, 702e, 702f, 702g, etc., of the FFTS 702 are displayed to the user on the display unit 705.

Figure 7B:
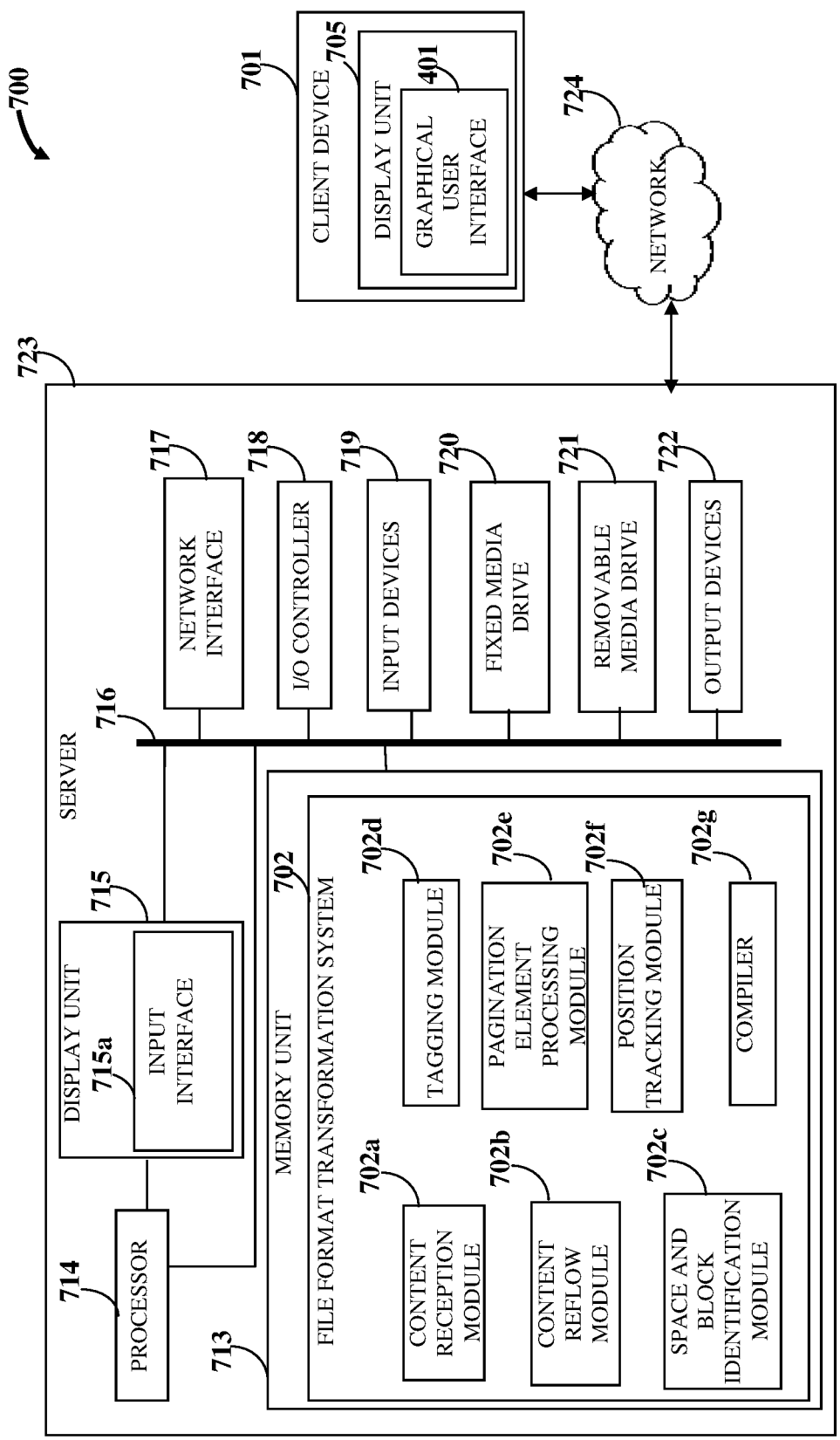
FIG. 7B exemplarily illustrates an embodiment of the system comprising the file format transformation system deployed on a server for transforming marked-up content in a first file format to a second file format that enables automated browser based pagination.

FIG. 7B exemplarily illustrates an embodiment of the system 700 comprising the file format transformation system (FFTS) 702 deployed on a server 723 for transforming marked-up content in a first file format to a second file format that enables automated browser based pagination. In an embodiment, the FFTS 702 is deployed on the server 723 using programmed and purposeful hardware as exemplarily illustrated in FIG. 7B. In this embodiment, the server 723 communicates with a client device 701 over a network 724. The server 723 is, for example, a personal computer, a tablet computing device, a mobile computer, a portable computing device, a laptop, a touch centric device, a workstation, a portable electronic device, a network enabled computing device, an interactive network enabled communication device, any other suitable computing equipment, combinations of multiple pieces of computing equipment, etc. In an embodiment, the FFTS 702 is implemented as a standalone software application on the server 723. In the server 723, the FFTS 702 employs a headless browser as a command-line server application. In an embodiment, the FFTS 702 is accessible to a user through a broad spectrum of technologies and devices, for example, cellular phones, tablet computing devices, etc., with access to the internet. In another embodiment, the FFTS 702 is implemented in a cloud computing environment. As used herein, "cloud computing environment" refers to a processing environment comprising configurable computing physical and logical resources, for example, networks, servers, storage media, applications, virtual machines, services, etc., and data distributed over the network 724. The cloud computing environment provides on-demand network access to a shared pool of the distributed computing physical and logical resources.

The network 724 is, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks.

As exemplarily illustrated in FIG. 7B, the server 723 comprises a non-transitory computer readable storage medium such as a memory unit 713 for storing computer programs and data, a processor 714 communicatively coupled to the non-transitory computer readable storage medium, a display unit 715, a data bus 716, a network interface 717, an input/output (I/O) controller 718, input devices 719, a fixed media drive 720 such as a hard drive, a removable media drive 721 for receiving removable media, output devices 722, etc., similar to the memory unit 703, the processor 704, the display unit 705, the data bus 706, the network interface 707, the I/O controller 708, the input devices 709, the fixed media drive 710, the removable media drive 711, the output devices 712, etc., of the client device 701 respectively, disclosed in the detailed description of FIG. 7A. The structure and functions of the modules 713, 714, 715, 716, 717, 718, 719, 720, 721, and 722 of the server 723 are similar to the structure and functions of the corresponding modules 703, 704, 705, 706, 707, 708, 709, 710, 711, and 712 of the client device 701 respectively, disclosed in the detailed description of FIG. 7A.

The display unit 715 of the server 723, via the input interface 715a, displays a command line interface to issue commands to the server 723. The display unit 705 of the client device 701, via the graphical user interface (GUI) 401, displays information such as the marked-up content, display interfaces, user interface elements such as text fields, etc., for allowing a user of the file format transformation system (FFTS) 702 to view an input page in the first file format and a processed, transformed and paginated output page in the second file format as programmed on the input interface 715a. The processor 714 of the server 723 retrieves instructions defined by the content reception module 702a, the content reflow module 702b, the space and block identification module 702c, the tagging module 702d, the pagination element processing module 702e, the position tracking module 702f, and the compiler 702g for performing respective functions disclosed in the detailed description of FIG. 7A. In this embodiment, the pseudocodes of the content reception module 702a, the content reflow module 702b, the space and block identification module 702c, the pagination element processing module 702e, the position tracking module 702f, and the compiler 702g disclosed in the detailed description of FIG. 7A, are executed by the processor 714 of the server 723 for performing their respective functions. An example of a pseudocode of the compiler 702g executed by the processor 714 of the server 723 for injecting a pagination script to the original input hypertext markup language (HTML) marked-up content is provided below:

```
html = getArticleHtml( )
html = injectPaginationScript(html)
browser = headlessBrower.execute(html)
brow ser.onPaginate(paginatedHtml) {
    savePaginatedHtml(paginatedHtml)
}
```

An example of a pseudocode of the compiler 702g or a browser based pagination script executed by the compiler 702g on a command line interface using the headless browser for rendering pages of the marked-up content ahead of demand is provided below:

```
phantomjs paginate.js
Where paginate.js:
    var page = require('webpage').create( );
    page.openchttp://ph5URL', function( ) {
        page.render('PH5.html');
        phantom.exit ( );
    });
```

For purposes of illustration, the detailed description refers to the file format transformation system (FFTS) 702 being run locally as a single computer system, for example, the client device 701 exemplarily illustrated in FIG. 7A, or the server 723 exemplarily illustrated in FIG. 7B; however the scope of the computer implemented method and system 700 disclosed herein is not limited to the FFTS 702 being run locally on a single computer system via the operating system and the processor 704 or 714 exemplarily illustrated in FIGS. 7A-7B, but may be extended to run remotely over the network 724 by employing a web browser and a remote server, a mobile phone, or other electronic devices. In an embodiment, one or more portions of the FFTS 702 are distributed across one or more computer systems (not shown) coupled to the network 724.

The non-transitory computer readable storage medium on the client device 701 exemplarily illustrated in FIG. 7A, or on the server 723 exemplarily illustrated in FIG. 7B, disclosed herein stores computer program codes comprising instructions executable by at least one processor 704 or 714 respectively, for transforming marked-up content in a first file format to a second file format that enables automated browser based pagination, where the second file format is a reversible file format, or a partially reversible file format, or a non-reversible file format. The computer program codes comprise a first computer program code for receiving the marked-up content of the first file format; a second computer program code for reflowing the received marked-up content of the first file format into a continuous page having a configurable page width; a third computer program code for identifying spaces and block elements in the reflown marked-up content of the first file format; and a fourth computer program code for generating and appending tags to the identified spaces and the identified block elements in the reflown marked-up content of the first file format. For each of the identified spaces and the identified block elements, the computer program codes further comprise a fifth computer program code for determining line breaks in the reflown marked-up content of the first file format based on preconfigured criteria associated with the appended tags; and a sixth computer program code for tagging the determined line breaks. For each of the determined line breaks, the computer program codes further comprise a seventh computer program code for identifying anchored floats in the reflown marked-up content of the first file format; an eight computer program code for tagging the identified anchored floats; a ninth computer program code for positioning the tagged anchored floats on a current page based on availability of space for the tagged anchored floats on the current page; a tenth computer program code for identifying footnotes in the reflown marked-up content of the first file format; an eleventh computer program code for tagging the identified footnotes; a twelfth computer program code for positioning the tagged footnotes at a footnote section on the current page based on availability of space for the tagged footnotes on the current page; a thirteenth computer program code for positioning page breaks in the continuous page based on a configurable page height and the determined line breaks for positioning the tagged anchored floats and the tagged footnotes on a subsequent page on non-availability of space on the current page; a fourteenth computer program code for grouping the marked-up content with the positioned anchored floats and the positioned footnotes on each page; and a fifteenth computer program code for inserting one or more of multiple pagination elements, for example, page numbers, a header, a footer, a footnote ruler, fillers, etc., on each page containing the grouped marked-up content. The ninth computer program code positions the tagged anchored floats proximal to associated float citations on the current page based on the availability of space for the tagged anchored floats on the current page. The twelfth computer program code positions the tagged footnotes proximal to associated footnote citations on the current page based on the availability of space for the tagged footnotes on the current page. The computer program codes further comprise a sixteenth computer program code for rendering the grouped marked-up content with the inserted pagination elements in the second file format based on a selected level of reversibility.

In an embodiment, the computer program codes further comprise a seventeenth computer program code for tracking positions of the identified anchored floats and the identified footnotes in the reflown marked-up content of the first file format, and positions of the page breaks in the continuous page prior to the grouping of the marked-up content and the insertion of the pagination elements on each page for rendering the grouped marked-up content with the inserted pagination elements in the second file format based on the selected level of reversibility; and an eighteenth computer program code for tracking positions of the inserted pagination elements for rendering the grouped marked-up content with the inserted pagination elements in the second file format based on the selected level of reversibility. The computer program codes further comprise one or more additional computer program codes for performing additional steps that may be required and contemplated for transforming marked-up content in a first file format to a second file format that enables automated browser based pagination. In an embodiment, a single piece of computer program code comprising computer executable instructions performs one or more steps of the computer implemented method disclosed herein for transforming marked-up content in a first file format to a second file format that enables automated browser based pagination. The computer program codes comprising computer executable instructions are embodied on the non-transitory computer readable storage medium. The processor 704 of the client device 701 exemplarily illustrated in FIG. 7A, or in an embodiment, the processor 714 of the server 723 exemplarily illustrated in FIG. 7B, retrieves these computer executable instructions and executes them. When the computer executable instructions are executed by the processor 704 or 714, the computer executable instructions cause the processor 704 or 714 to perform the steps of the computer implemented method for transforming marked-up content of a first file format to a second file format that enables automated browser based pagination.

Figure 8C:
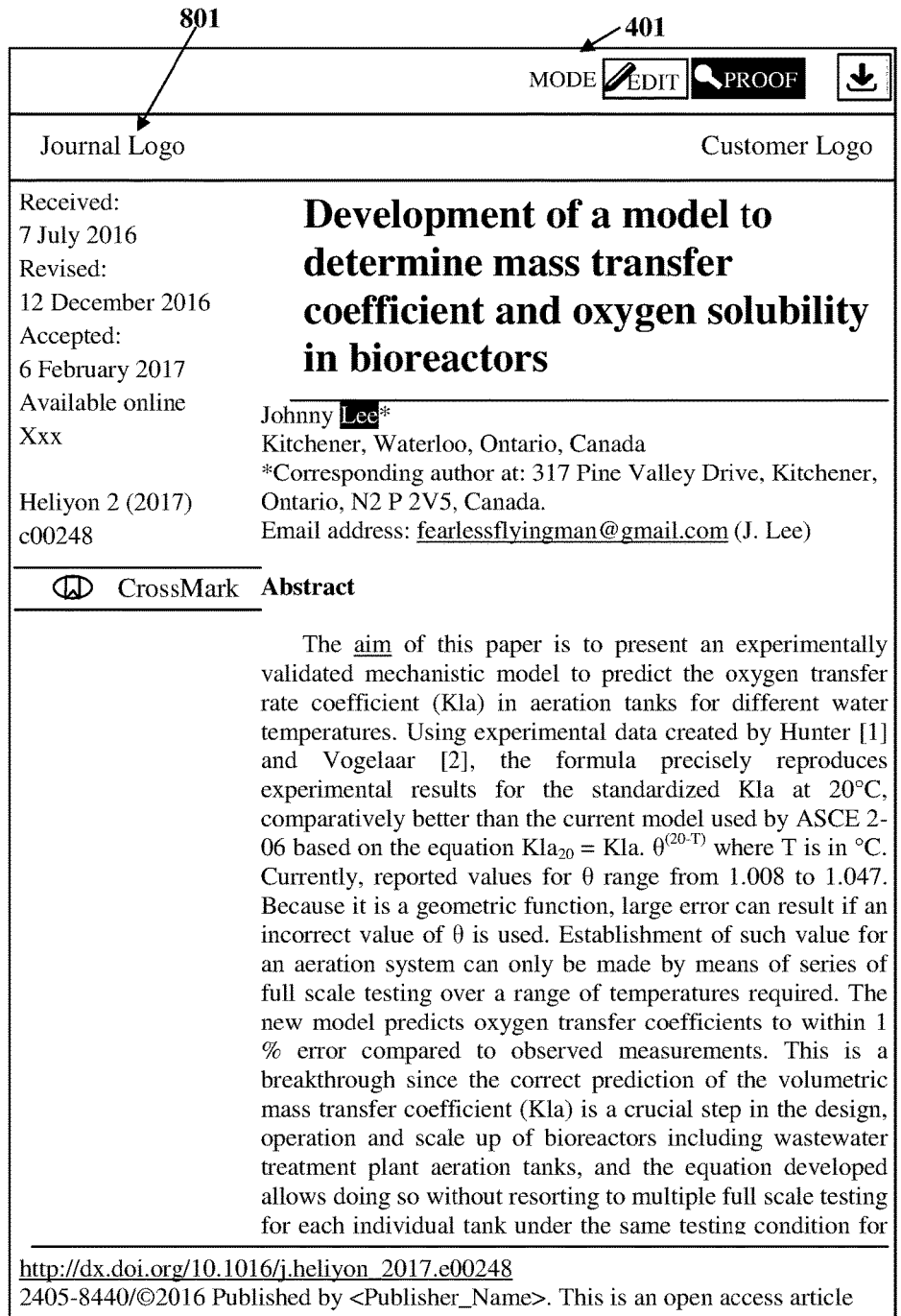
FIGS. 8A-8Q exemplarily illustrate screenshots showing transformation of marked-up content in a first file format to a reversible file format in edit views and proof views.
Figure 8F:
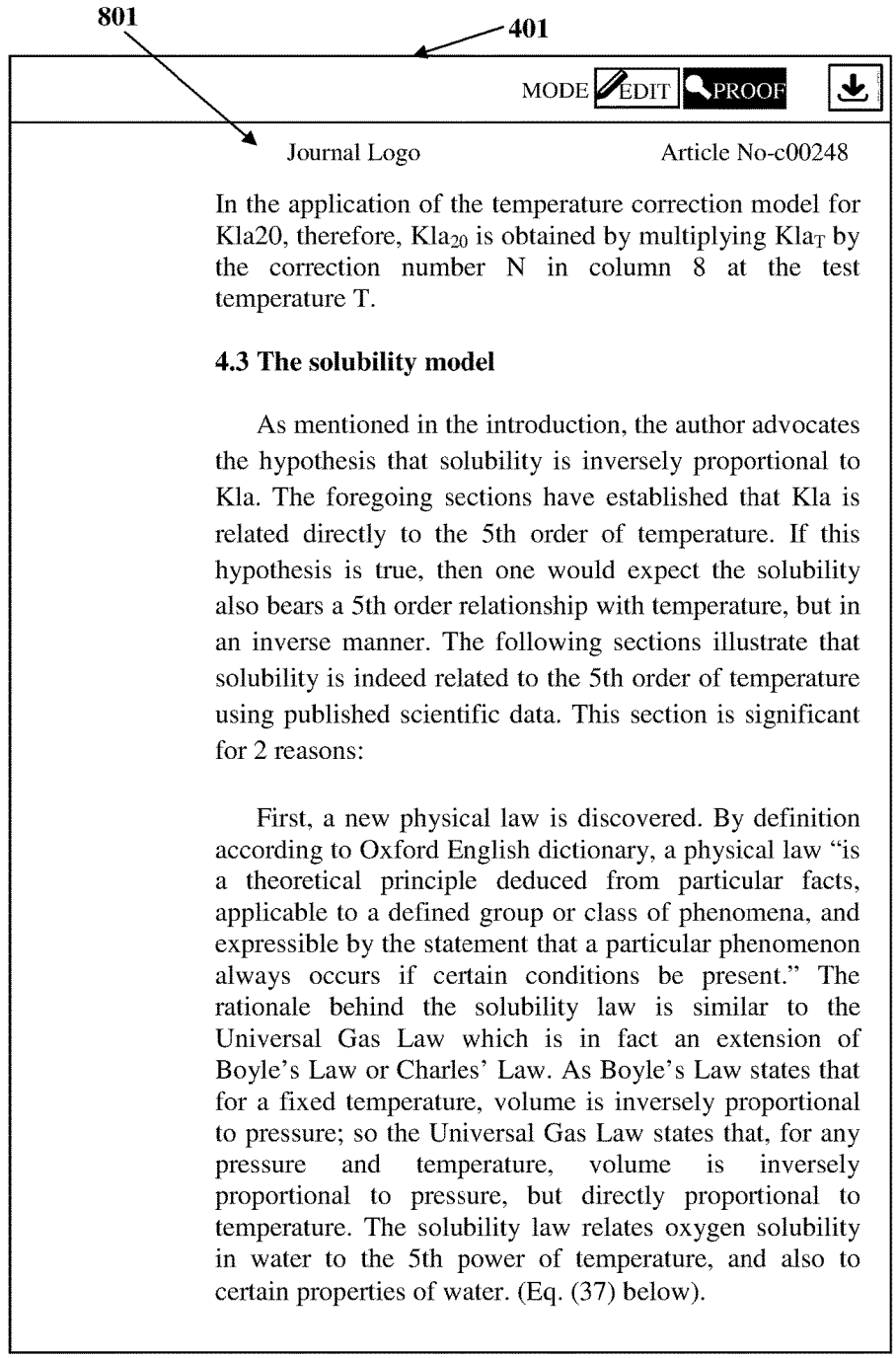
Figure 8G:
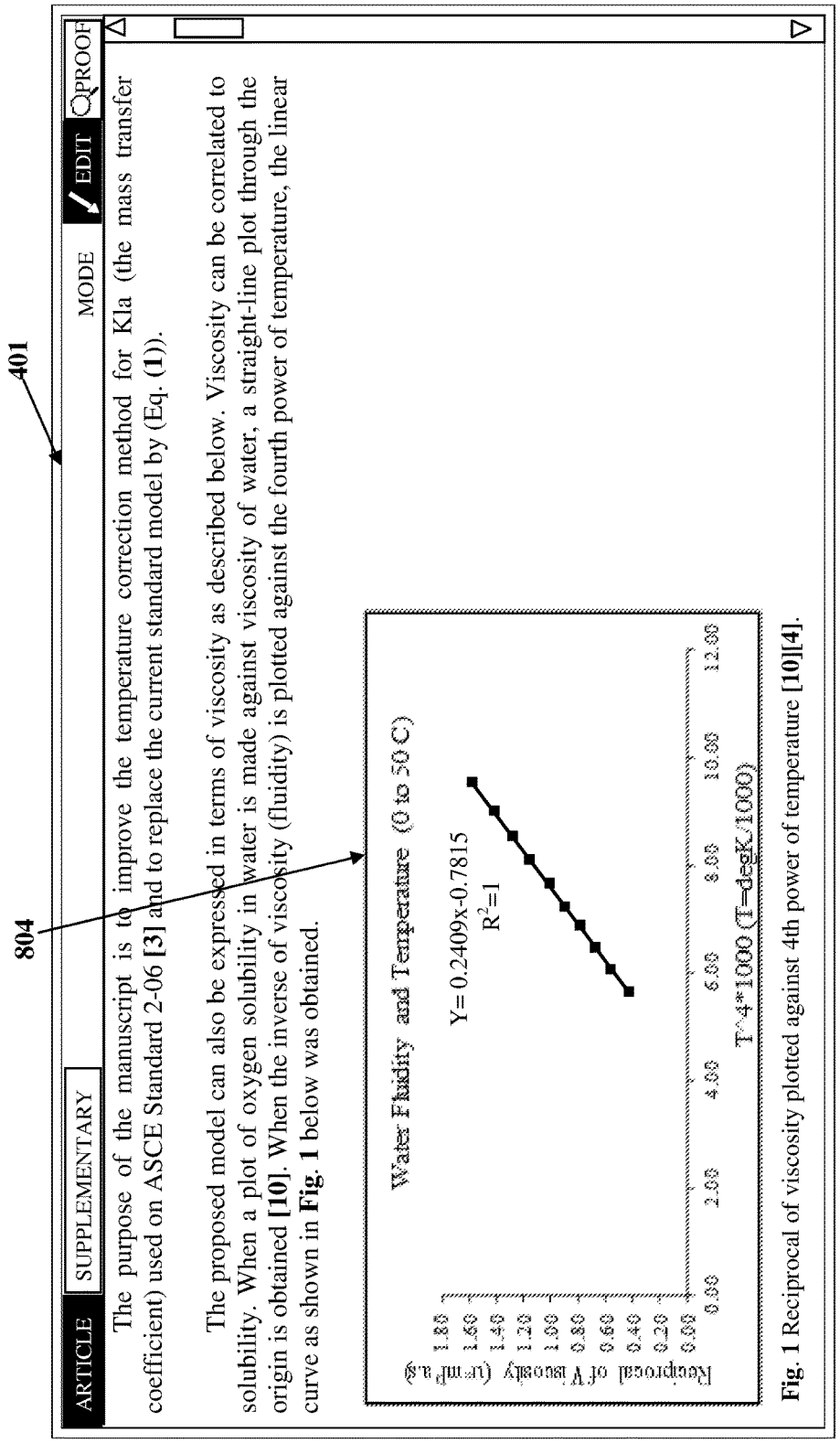
Figure 8H:
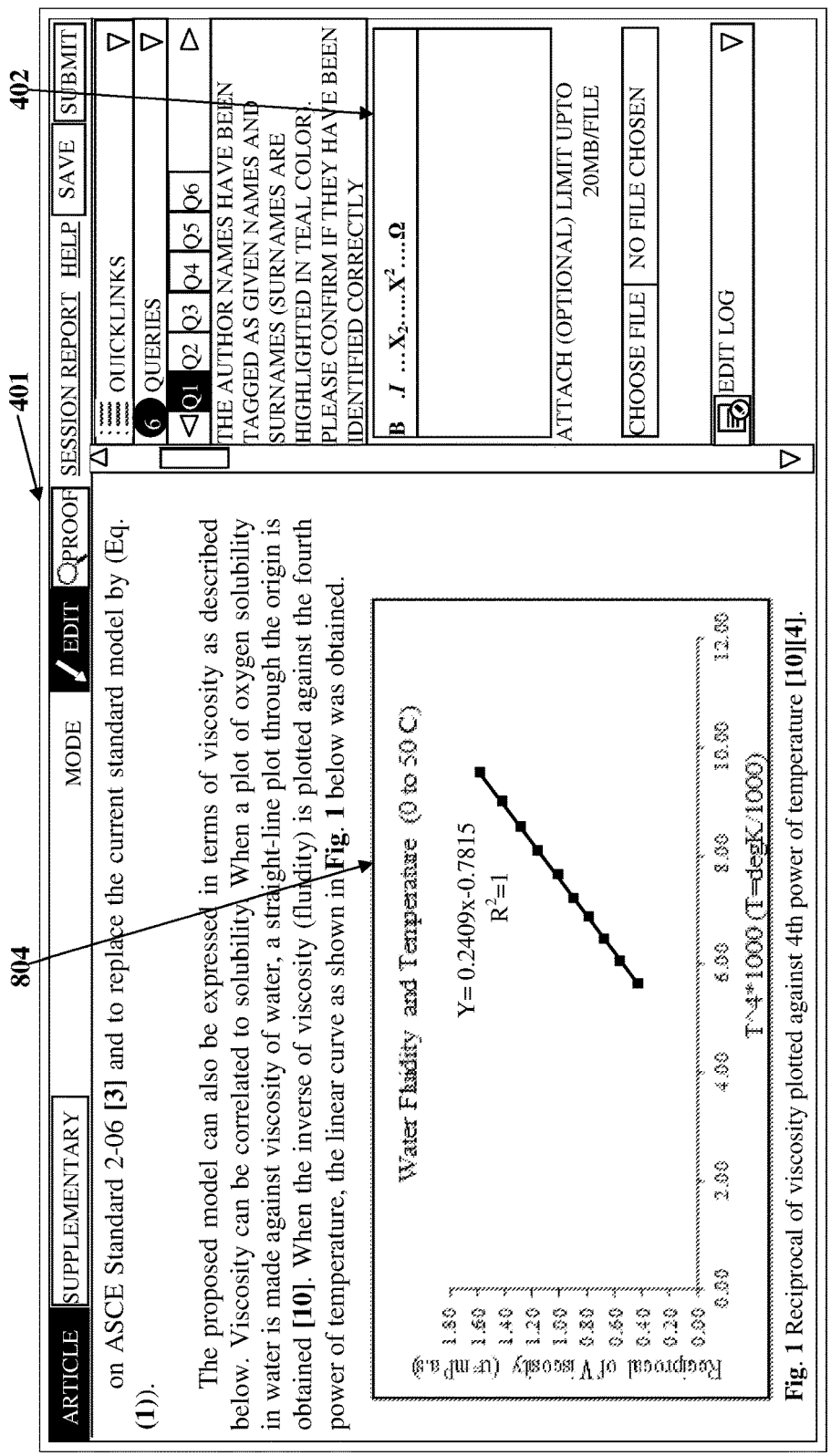
Figure 8I:
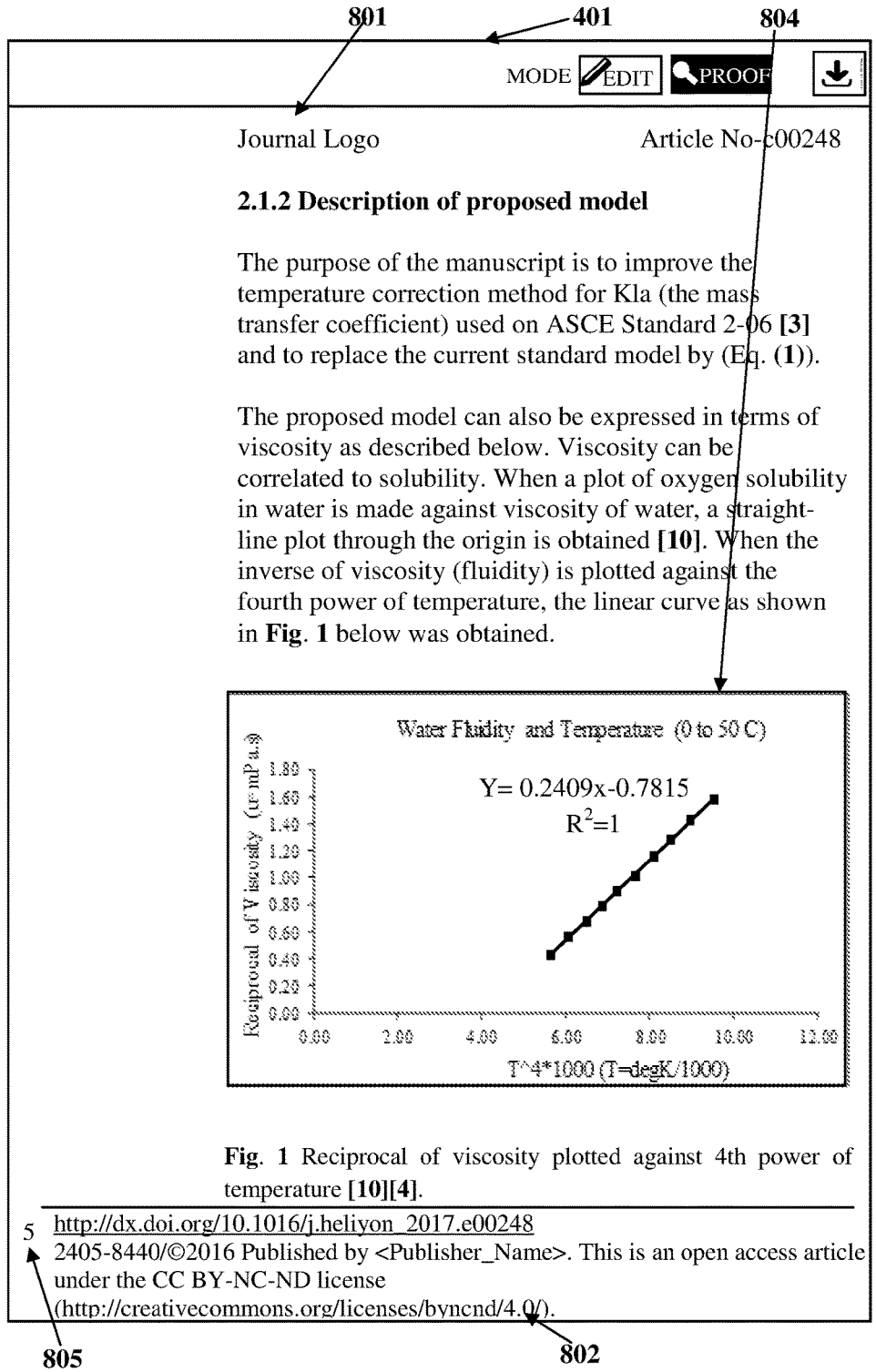
Figure 8N:
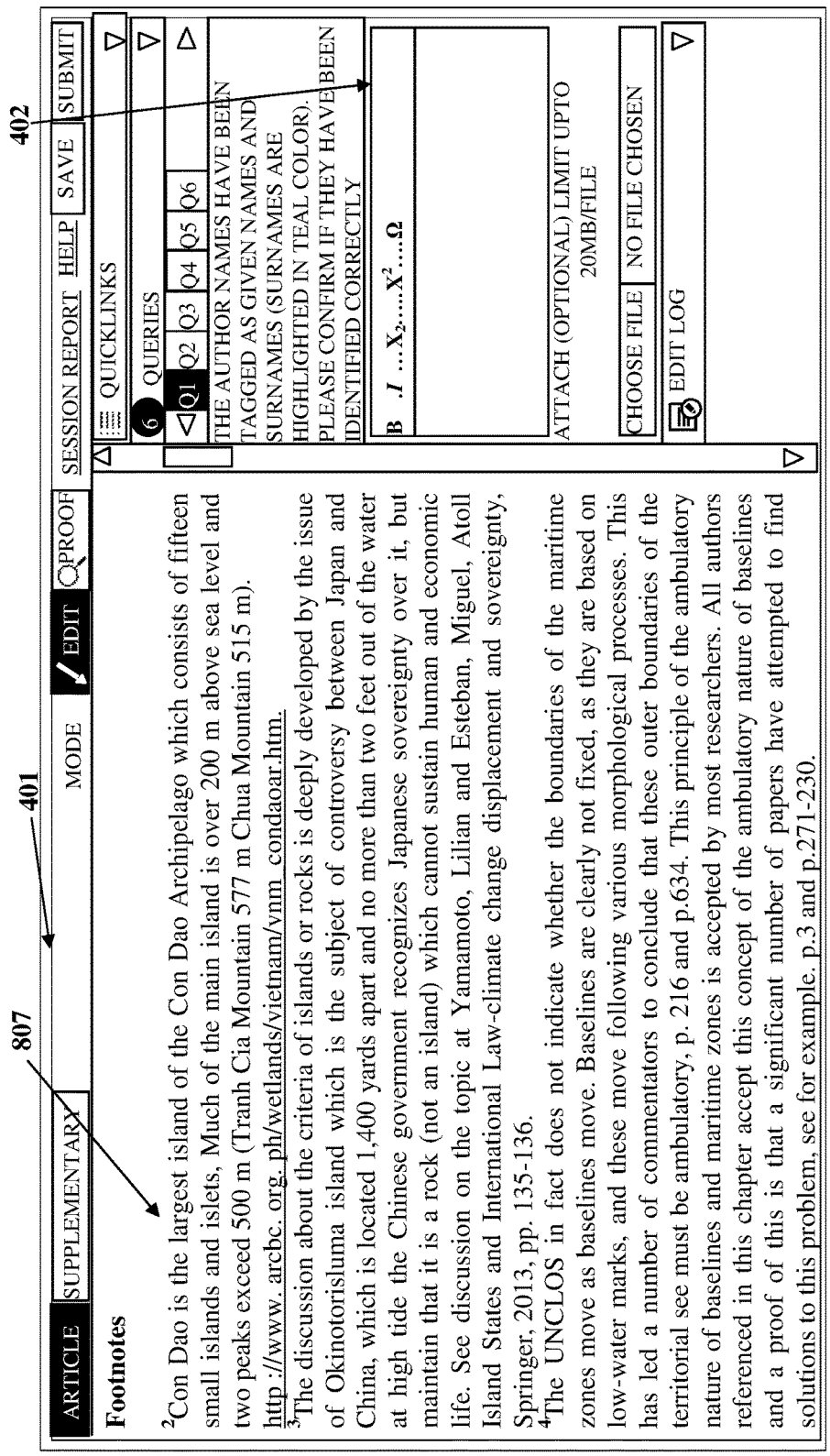
Figure 8P:
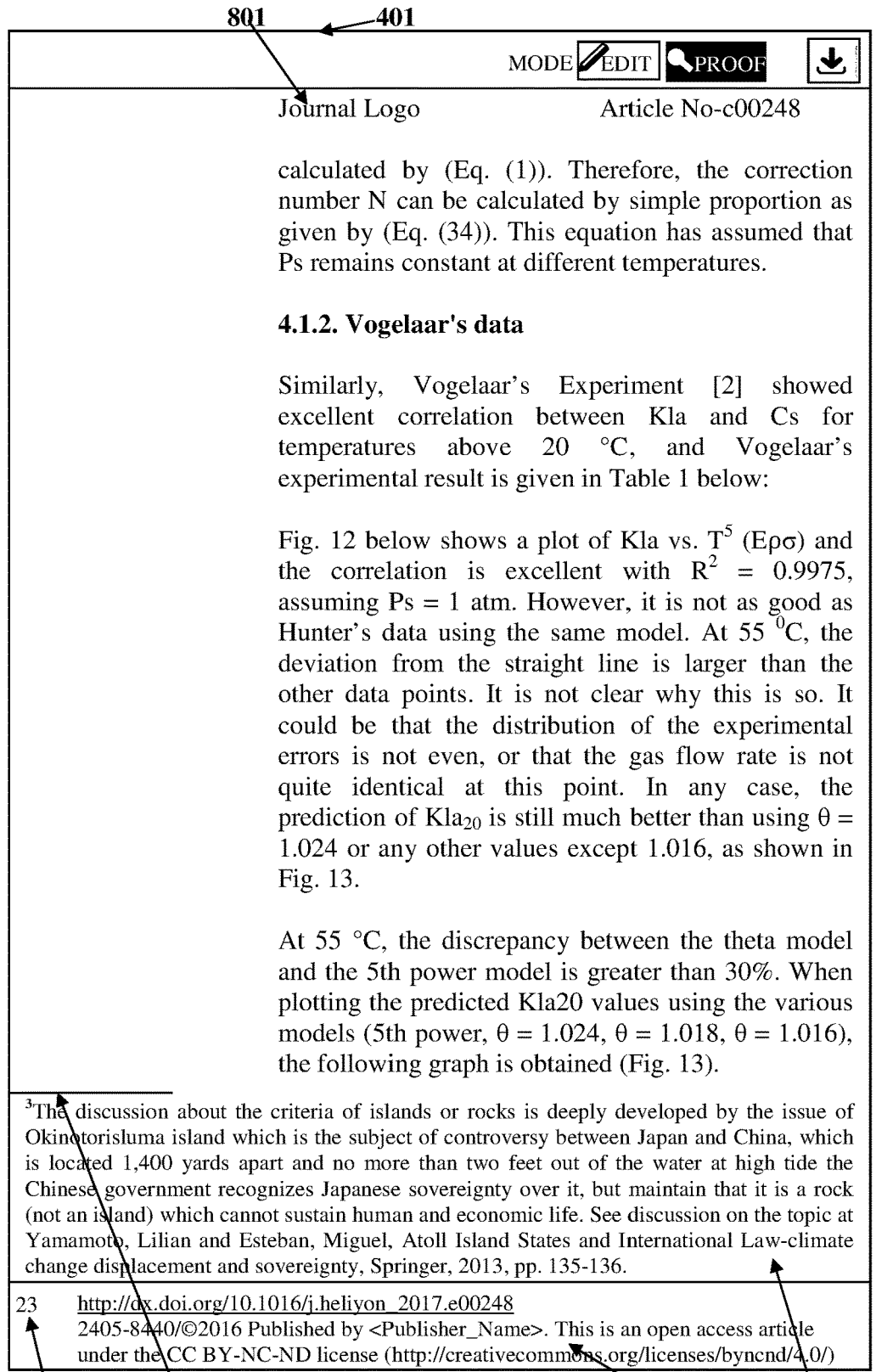
Figure 8Q:
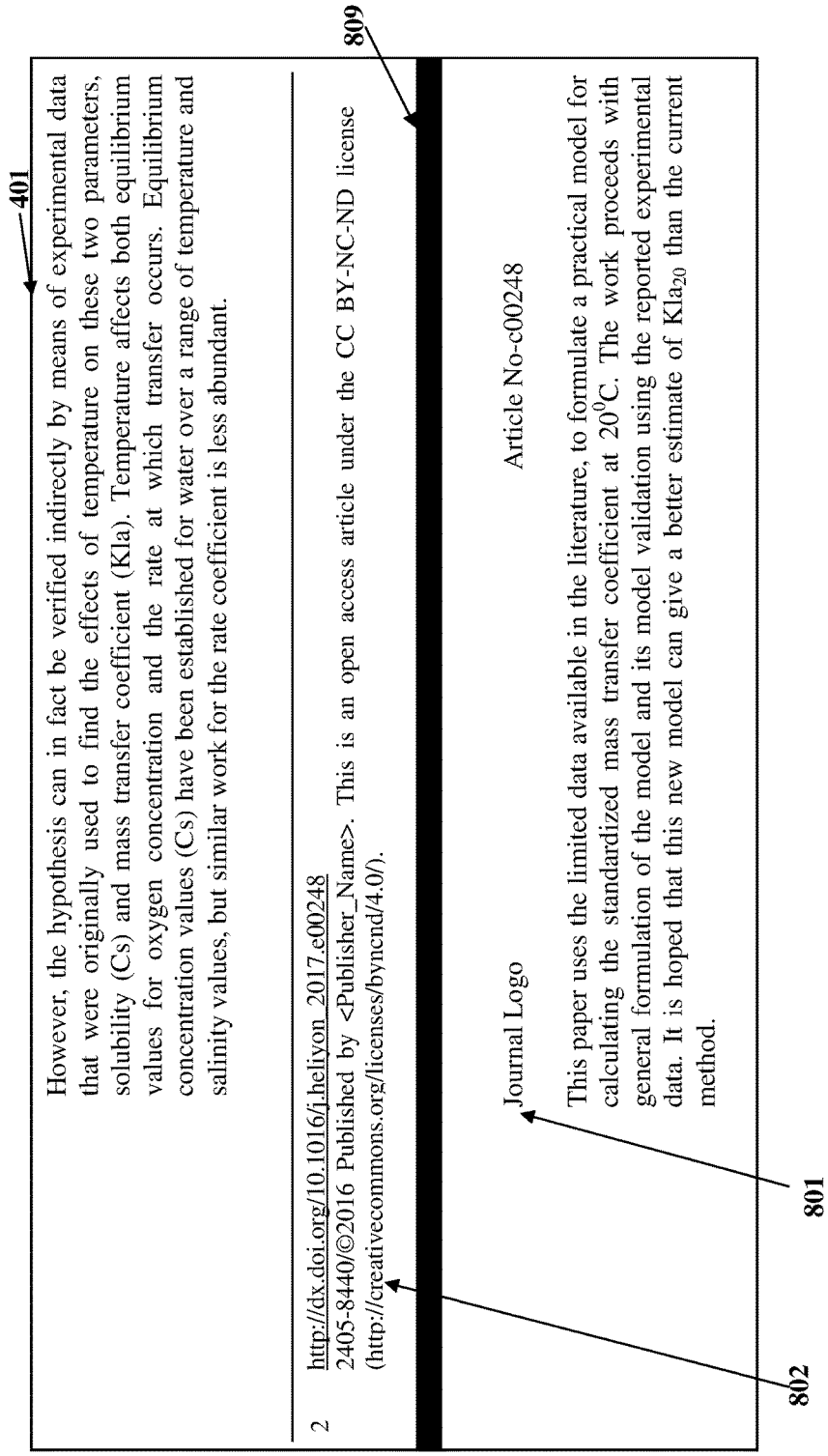

FIGS. 8A-8Q exemplarily illustrate screenshots showing transformation of marked-up content in a first file format to a reversible second file format in edit views and proof views. Consider an example where the file format transformation system (FFTS) 702 is configured as a software application on a client device 701 as exemplarily illustrated in FIG. 7A, or in an embodiment, on a server 723 as exemplarily illustrated in FIG. 7B. A user of the client device 701 may want to edit and review a technical document of, for example, a hypertext markup language (HTML) format that is viewed as a running continuous page. The user invokes the FFTS 702 on the client device 701 and loads the input HTML document into the FFTS 702. The FFTS 702 allows the user to view the input HTML document via a graphical user interface (GUI) 401 of the FFTS 702. FIG. 8A exemplarily illustrates a screenshot of an opening page of the loaded input HTML document without an edit window 402 in the right pane of the GUI 401. FIG. 8B exemplarily illustrates a screenshot of the opening page of the loaded input HTML document, showing the edit window 402 in the right pane of the GUI 401. The edit window 402 allows the user to edit the input HTML document or accept suggested changes made by other users to the input HTML document in an edit view as exemplarily illustrated in FIG. 8B. FIG. 8C exemplarily illustrates a screenshot of the output HTML page transformed by the FFTS 702 to a reversible file format, showing a header 801 and a footer 802 entered on the opening page in a proof view. The FFTS 702 positions the marked-up content in an appropriate location close to their respective citations in the proof view. The opening page in the reversible file format can be reversed to the first file format in the edit view.

FIG. 8D exemplarily illustrates a screenshot without the edit window 402 in the right pane of the graphical user interface (GUI) 401, showing hyphenations 803 entered in a page of the input hypertext markup language (HTML) document. FIG. 8E exemplarily illustrates a screenshot with the edit window 402 in the right pane of the GUI 401, showing the hyphenations 803 entered in the input HTML page. The user can edit the input HTML page using the edit window 402 in the right pane of the GUI 401 as exemplarily illustrated in FIG. 8E. The edit window 402 allows the user to edit the input HTML page with the hyphenations 803. FIG. 8F exemplarily illustrates a screenshot of the output HTML page with the hyphenations 803 exemplarily illustrated in FIGS. 8D-8E, transformed by the file format transformation system (FFTS) 702 exemplarily illustrated in FIG. 7A or FIG. 7B, to a reversible file format, showing the header 801 entered in the output HTML page in a proof view.

FIG. 8G exemplarily illustrates a screenshot of a page of the input hypertext markup language (HTML) document containing a float, for example, a figure 804, without the edit window 402 in the right pane of the graphical user interface (GUI) 401. FIG. 8H exemplarily illustrates a screenshot of the page of the input HTML document containing the figure 804, showing the edit window 402 in the right pane of the GUI 401. The edit window 402 allows the user to edit the input HTML page containing the figure 804. FIG. 8I exemplarily illustrates a screenshot of the output HTML page containing the figure 804 transformed by the file format transformation system (FFTS) 702 exemplarily illustrated in FIG. 7A or FIG. 7B, to a reversible file format, showing the header 801, the footer 802, and a page number 805 entered on the output HTML page in a proof view. The FFTS 702 positions the figure 804 in an appropriate location close to a respective citation in the proof view.

FIG. 8J exemplarily illustrates a screenshot of a page of the input hypertext markup language (HTML) document containing a float, for example, a table 806, without the edit window 402 in the right pane of the graphical user interface (GUI) 401. FIG. 8K exemplarily illustrates a screenshot of the page of the input HTML document containing the table 806, showing the edit window 402 in the right pane of the GUI 401. The edit window 402 allows the user to edit the input HTML page containing the table 806. FIG. 8L exemplarily illustrates a screenshot of the output HTML page transformed by the file format transformation system (FFTS) 702 exemplarily illustrated in FIG. 7A or FIG. 7B, to a reversible file format, showing the header 801, the footer 802, and a page number 805 entered on the page in a proof view. The FFTS 702 positions the table 806 in an appropriate location close to a respective citation in the proof view.

FIG. 8M exemplarily illustrates a screenshot of a page of the input hypertext markup language (HTML) document containing footnotes 807, without the edit window 402 in the right pane of the graphical user interface (GUI) 401. FIG. 8N exemplarily illustrates a screenshot of the page of the input HTML document containing the footnotes 807, showing the edit window 402 in the right pane of the GUI 401. The edit window 402 allows the user to edit the page containing the footnotes 807. FIG. 8O exemplarily illustrates a screenshot of the output HTML page transformed by the file format transformation system (FFTS) 702 exemplarily illustrated in FIG. 7A or FIG. 7B, to a reversible file format, showing the header 801, the footer 802, a page number 805 entered on the page, and the footnotes 807 positioned in the footnote section below a footnote ruler 808 in a proof view.

FIG. 8P exemplarily illustrates a screenshot of an output hypertext markup language (HTML) page transformed by the file format transformation system (FFTS) 702 exemplarily illustrated in FIG. 7A or FIG. 7B, to a reversible file format, showing the header 801 and the footer 802 at the top and the bottom of the page respectively, in a proof view. The output HTML page also contains a page number 805 and a footnote 807 positioned in the footnote section below the footnote ruler 808 in the proof view.

FIG. 8Q exemplarily illustrates a screenshot of output hypertext markup language (HTML) pages transformed by the file format transformation system (FFTS) 702 exemplarily illustrated in FIG. 7A or FIG. 7B, to a reversible file format, showing a page break 809 in a proof view. The FFTS 702 breaks the running continuous input HTML page into individual reversible file format pages containing a header 801 and a footer 802, and renders the output on the graphical user interface (GUI) 401.

Figure 9A:
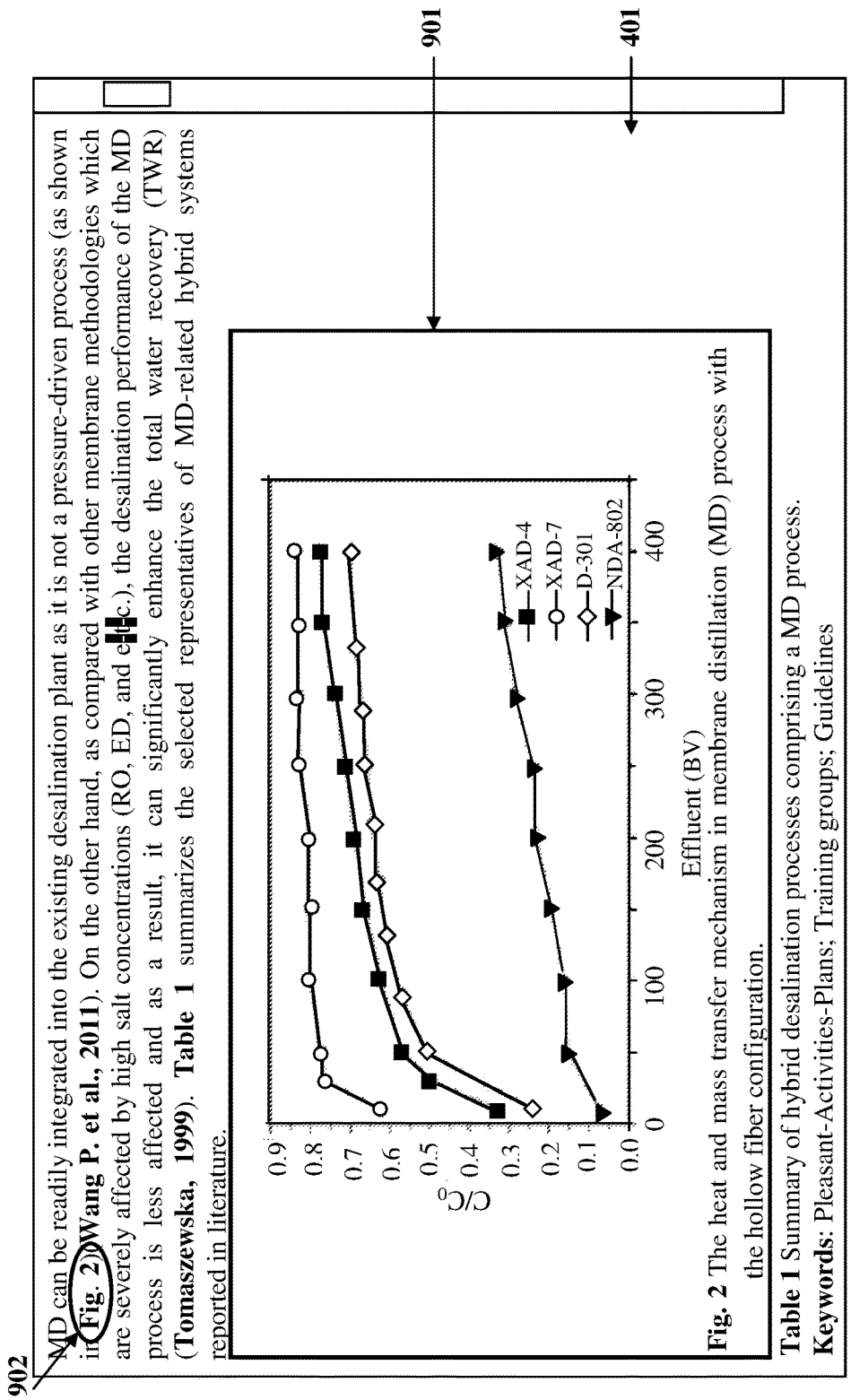
FIGS. 9A-9F exemplarily illustrate screenshots showing transformation of marked-up content in a first file format to a second file format based on a selected level of reversibility in edit views and proof views.
Figure 9B:
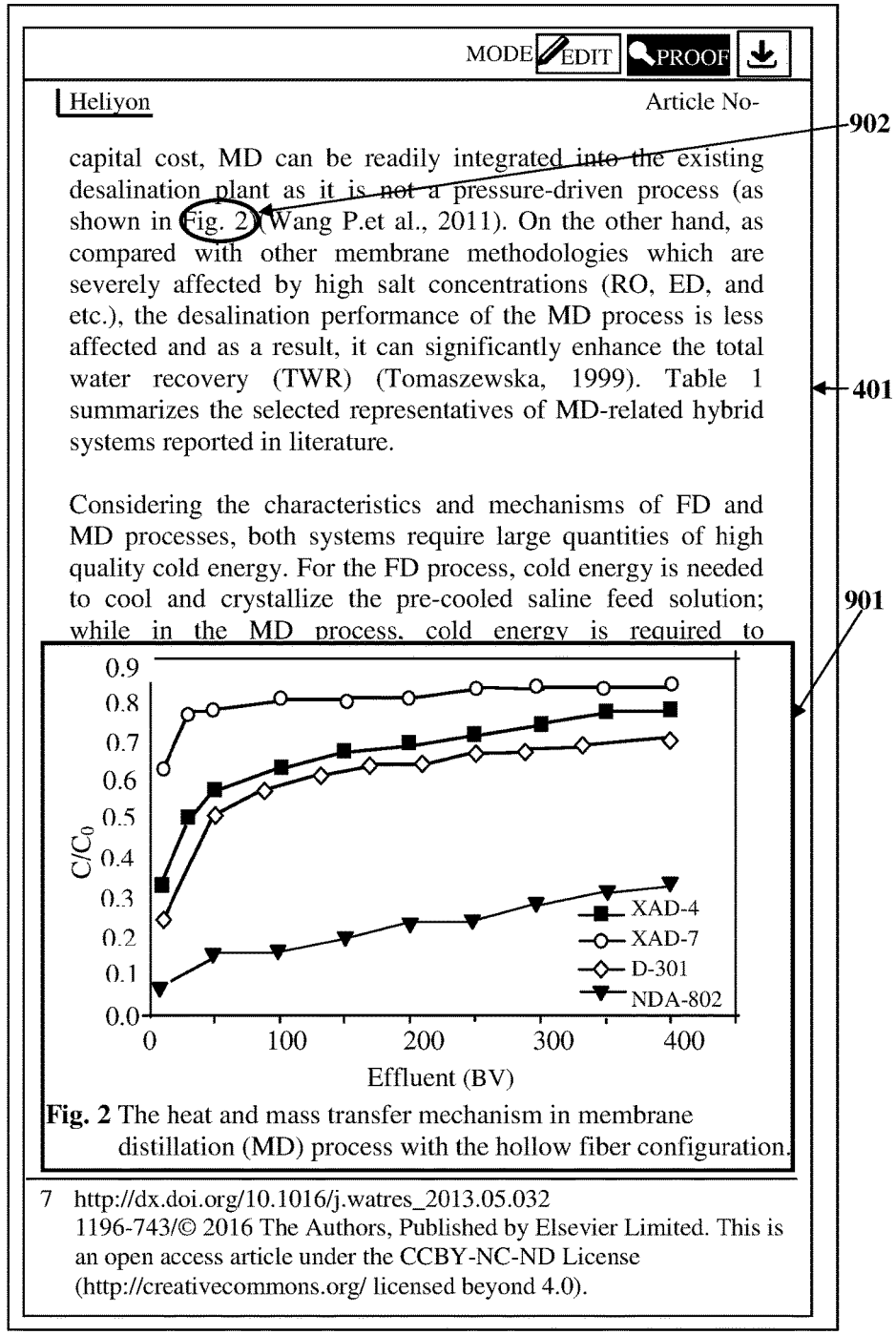

FIGS. 9A-9F exemplarily illustrate screenshots showing transformation of marked-up content in a first file format to a second file format based on a selected level of reversibility in edit views and proof views. FIG. 9A exemplarily illustrates a screenshot of the graphical user interface (GUI) 401 provided by the file format transformation system (FFTS) 702 exemplarily illustrated in FIG. 7A or FIG. 7B, showing marked-up content containing a float, for example, a figure 901 in the first file format prior to inserting pagination elements in the marked-up content in an edit view. The figure 901 has a citation 902 in the marked-up content. The FFTS 702 tracks the position of the figure 901 in the marked-up content of the first file format prior to inserting the pagination elements for rendering the marked-up content in the second file format. FIG. 9B exemplarily illustrates a screenshot of the GUI 401 showing the marked-up content, after pagination, with the float, that is, the figure 901 moved to a new position in a proof view. The FFTS 702 moves the figure 901 to the new position in the marked-up content of the second file format and positions the figure 901 on the same page where the citation 902 resides. In this example, the selected level of reversibility of the marked-up content in the second file format to the first file format is complete reversibility and therefore FIG. 9B exemplarily illustrates the marked-up content in the reversible file format. If the selected level of reversibility is non-reversibility of the marked-up content in the second file format to the first file format, the FFTS 702 does not track the position of the figure 901.

Figure 9C:
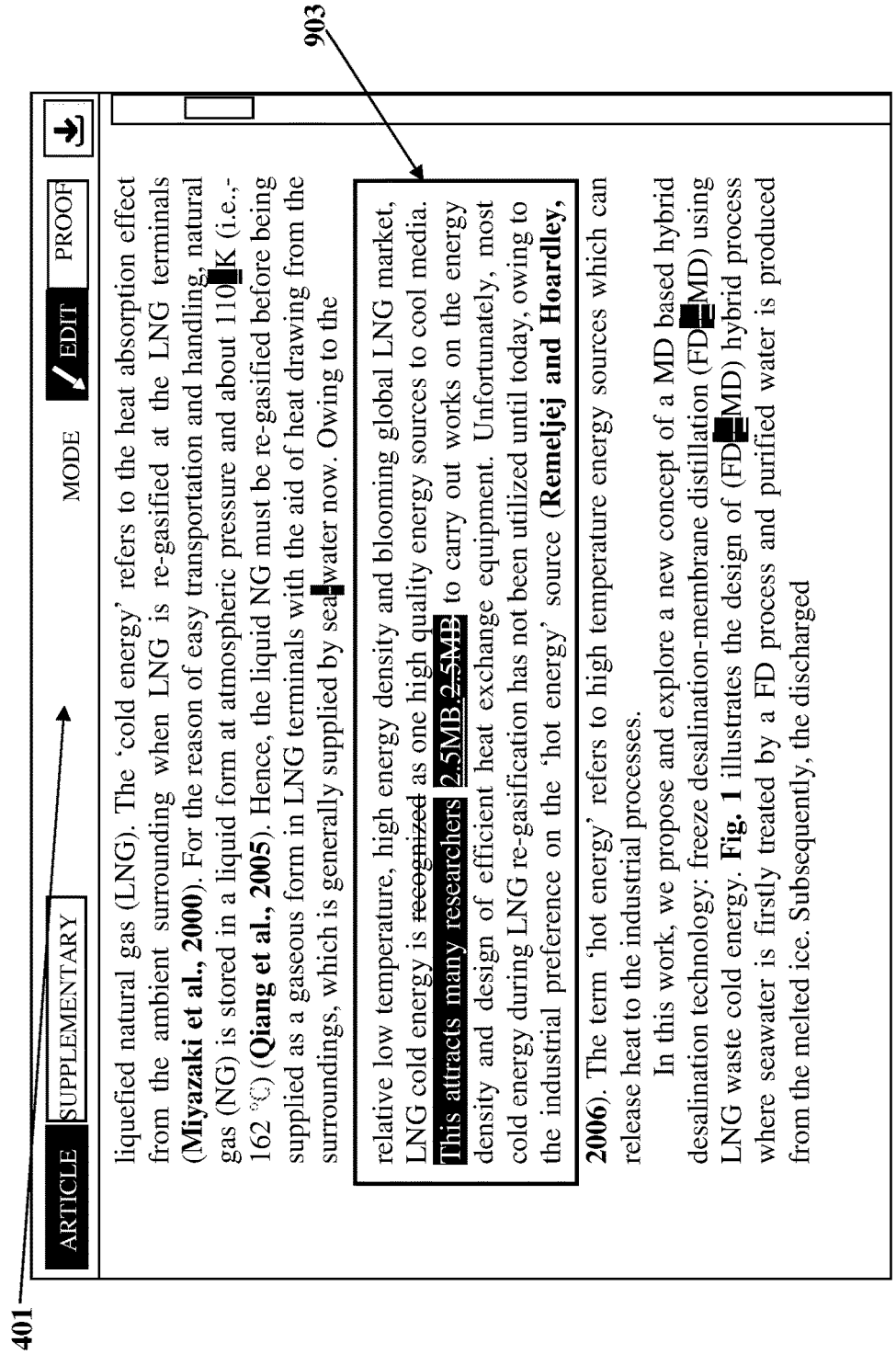
Figure 9D:
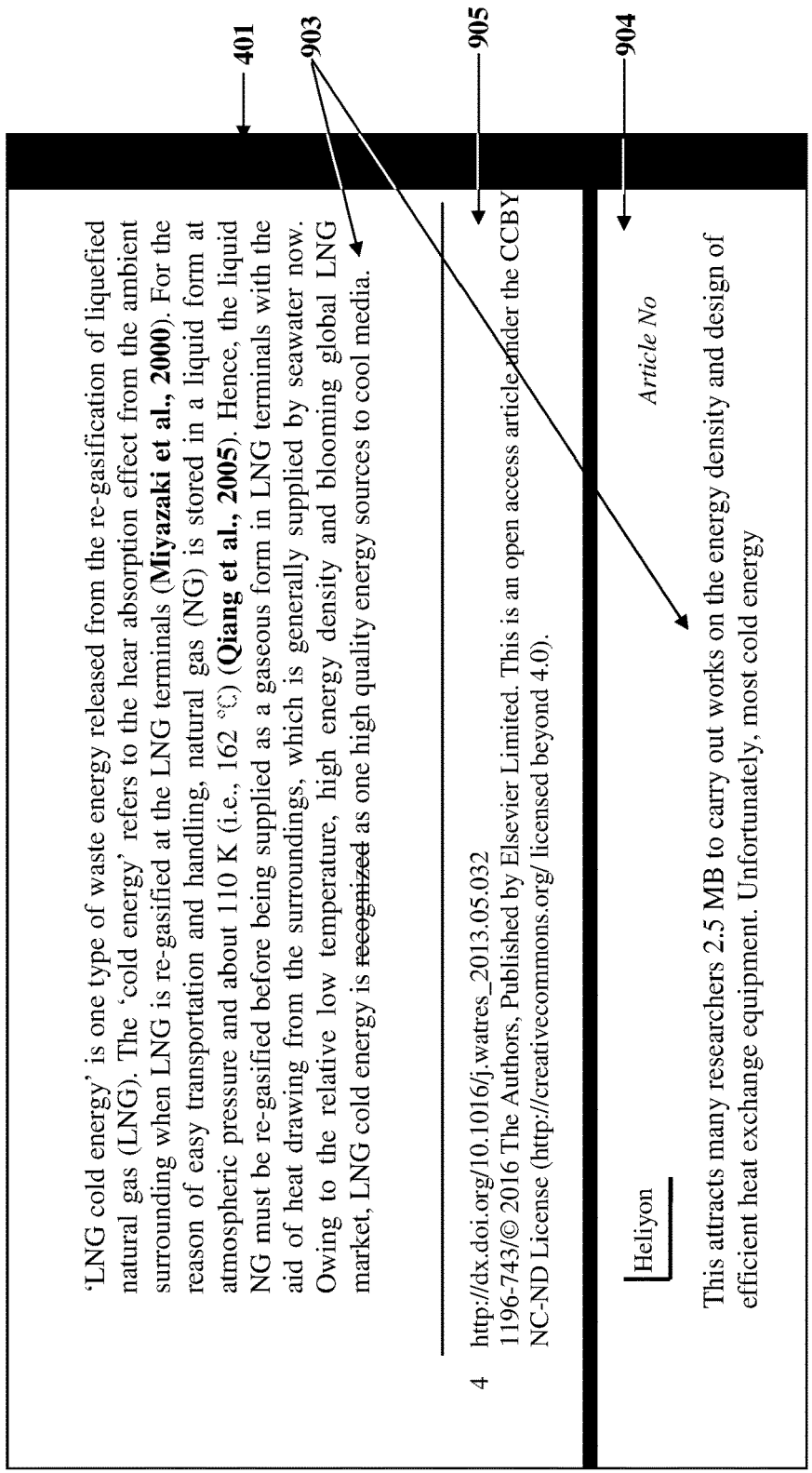

FIG. 9C exemplarily illustrates a screenshot of the graphical user interface (GUI) 401 showing the marked-up content 903 in the first file format, before pagination, without a header and a footer in an edit view. FIG. 9D exemplarily illustrates a screenshot of the GUI 401 showing the marked-up content 903 after pagination with a header 904 and a footer 905 in a proof view. The file format transformation system (FFTS) 702 exemplarily illustrated in FIG. 7A or FIG. 7B, reflows the marked-up content 903 with the introduction of the header 904 and the footer 905. The FFTS 702 positions the marked-up content 903 in an appropriate position close to respective citations. The FFTS 702 tracks the positions of the inserted header 904 and the inserted footer 905 that were not present in the first file format exemplarily illustrated in FIG. 9C. Tracking the positions of the inserted header 904 and the inserted footer 905 allows the FFTS 702 to reverse the marked-up content 903 from the second file format to the first file format. In this example, the selected level of reversibility of the marked-up content 903 in the second file format to the first file format is complete reversibility and therefore the FFTS 702 tracks the positions of the inserted header 904 and the inserted footer 905 in the second file format such that the marked-up content 903 in the second file format can be completely restored to the first file format. If the selected level of reversibility is non-reversibility of the marked-up content 903 in the second file format to the first file format, the FFTS 702 does not track the positions of the inserted header 904 and the inserted footer 905.

Figure 9E:
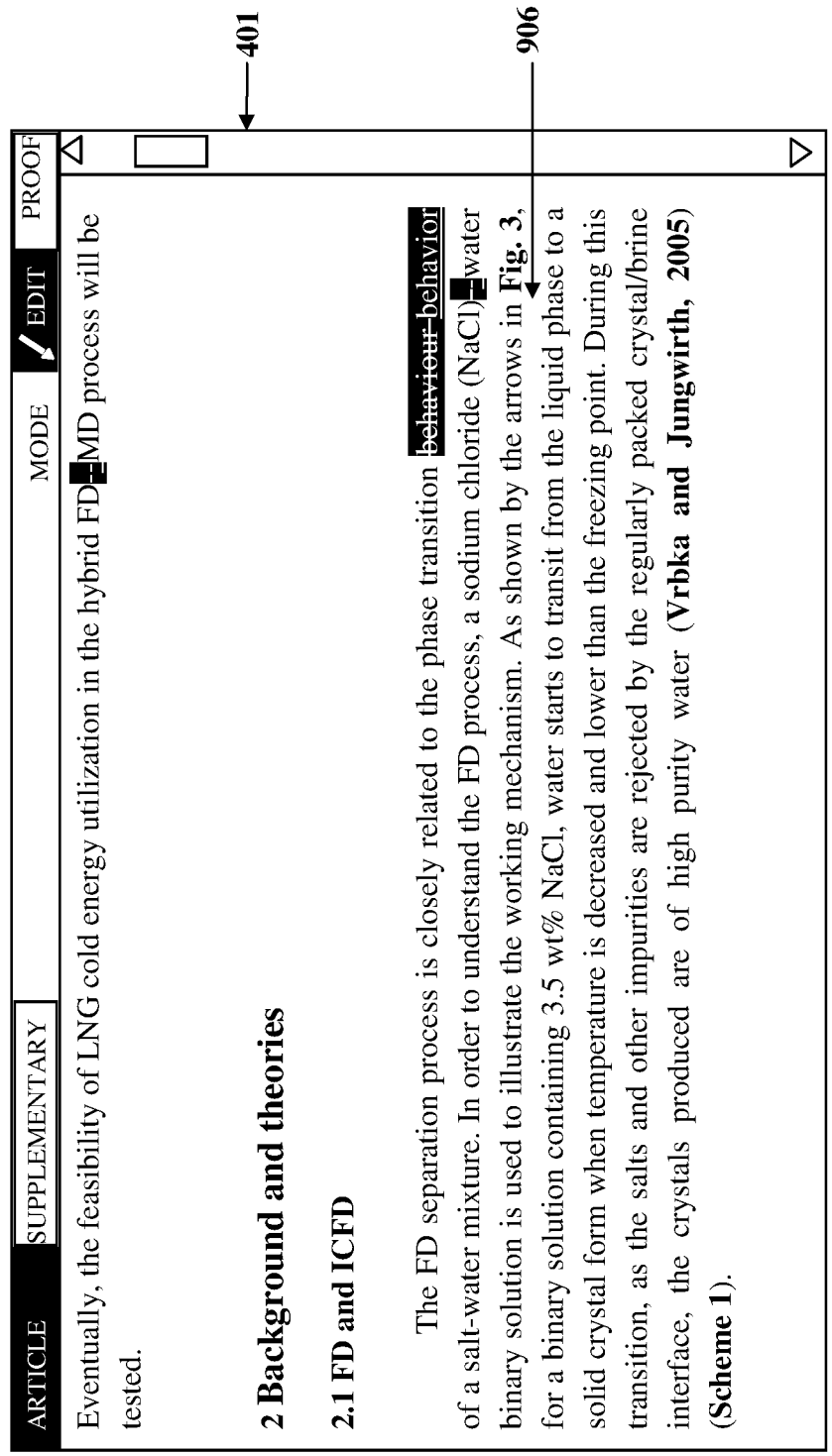
Figure 9F:
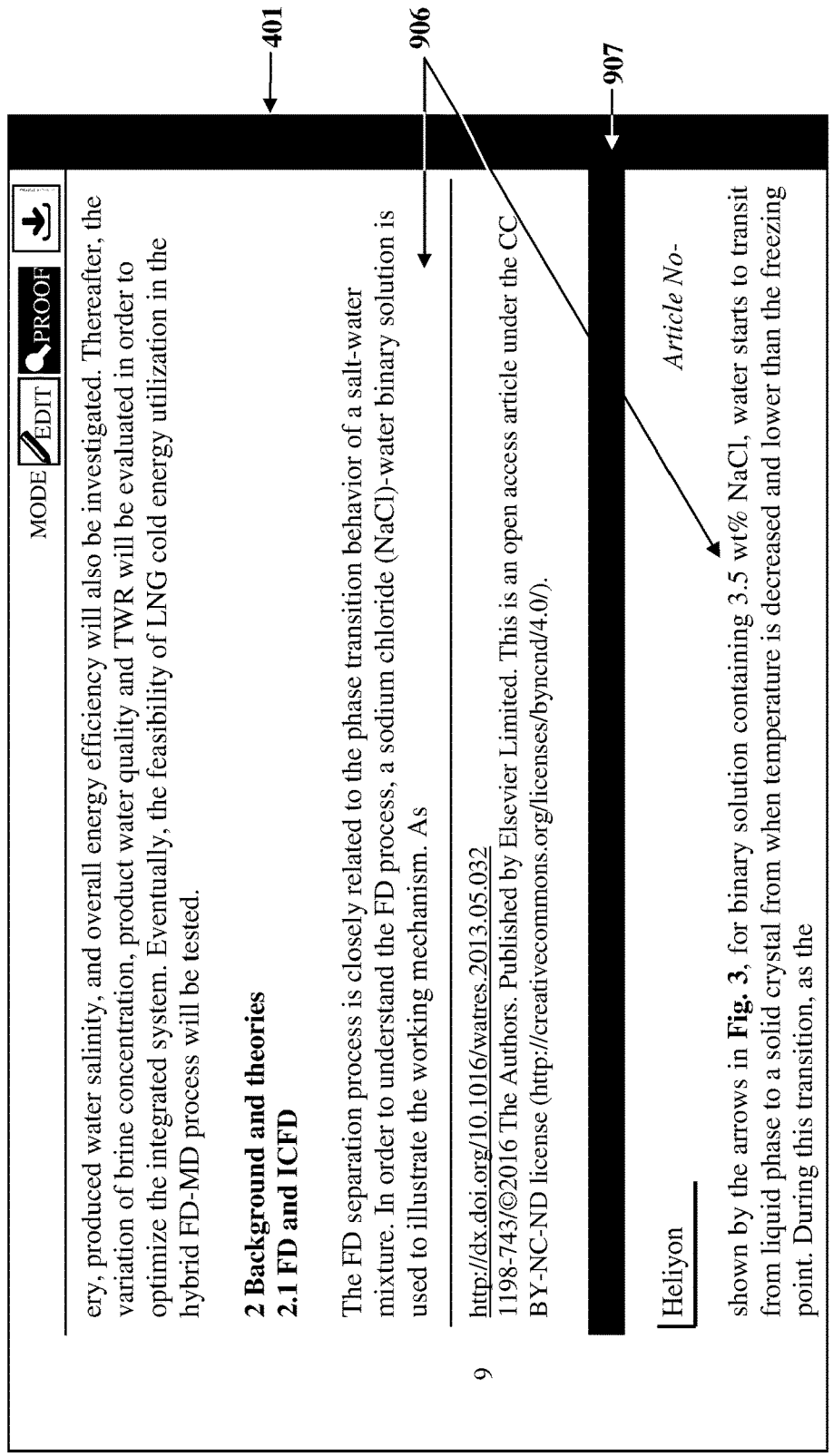

FIG. 9E exemplarily illustrates a screenshot of the graphical user interface (GUI) 401 showing the marked-up content 906 in the first file format, before pagination, without a page break in an edit view. FIG. 9F exemplarily illustrates a screenshot of the GUI 401 showing the marked-up content 906, after pagination, with a page break 907 in a proof view. The file format transformation system (FFTS) 702 exemplarily illustrated in FIG. 7A or FIG. 7B, tracks the position of the page break 907 that was not present in the first file format exemplarily illustrated in FIG. 9E. Tracking the position of the page break 907 allows the FFTS 702 to reverse the marked-up content 906 from the second file format to the first file format. In this example, the selected level of reversibility of the marked-up content 906 in the second file format to the first file format is complete reversibility and therefore the FFTS 702 tracks the position of the page break 907 in the second file format such that the marked-up content 906 in the second file format can be completely restored to the first file format. If the selected level of reversibility is non-reversibility of the marked-up content 906 in the second file format to the first file format, the FFTS 702 does not track the position of the page break 907.

It will be readily apparent in different embodiments that the various methods, algorithms, and computer programs disclosed herein are implemented on non-transitory computer readable storage media appropriately programmed for computing devices. The non-transitory computer readable storage media participate in providing data, for example, instructions that are read by a computer, a processor or a similar device. In different embodiments, the "non-transitory computer readable storage media" also refer to a single medium or multiple media, for example, a centralized database, a distributed database, and/or associated caches and servers that store one or more sets of instructions that are read by a computer, a processor or a similar device. The "non-transitory computer readable storage media" also refer to any medium capable of storing or encoding a set of instructions for execution by a computer, a processor or a similar device and that causes a computer, a processor or a similar device to perform any one or more of the methods disclosed herein. Common forms of the non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementation of the processes of various embodiments. Therefore, the embodiments are not limited to any specific combination of hardware. The computer program codes comprising computer executable instructions can be implemented in any programming language that runs on an internet browser, for example, Chrome® of Google Inc., Firefox® of Mozilla Foundation, Safari® of Apple Inc., Internet Explorer® of Microsoft Corporation, etc., on any operating system. In an embodiment, the computer program codes or software programs are stored on or in one or more mediums as object code. In another embodiment, various aspects of the computer implemented method and the file format transformation system (FFTS) 702 exemplarily illustrated in FIG. 7A or FIG. 7B, disclosed herein are implemented in a non-programmed environment comprising documents created, for example, in a hypertext markup language (HTML) format, an extensible markup language (XML) format, or other format that render aspects of the graphical user interface (GUI) 401 exemplarily illustrated in FIGS. 4A-4C, FIGS. 8A-8Q, and FIGS. 9A-9F, or perform other functions, when viewed in a visual area or a window of a browser program. In another embodiment, various aspects of the computer implemented method and the FFTS 702 disclosed herein are implemented as programmed elements, or non-programmed elements, or any suitable combination thereof.

The computer implemented method and the file format transformation system (FFTS) 702 disclosed herein can be configured to work in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, examples of which are disclosed above. While the operating system may differ depending on the type of computer, the operating system provides the appropriate communications protocols to establish communication links with the network. Any number and type of machines may be in communication with the computers.

The computer implemented method and the file format transformation system (FFTS) 702 disclosed herein are not limited to a particular computer system platform, processor, operating system, or network. In an embodiment, one or more aspects of the computer implemented method and the FFTS 702 disclosed herein are distributed among one or more computer systems, for example, servers configured to provide one or more services to one or more client computers, or to perform a complete task in a distributed system. For example, one or more aspects of the computer implemented method and the FFTS 702 disclosed herein are performed on a client-server system that comprises components distributed among one or more server systems that perform multiple functions according to various embodiments. These components comprise, for example, executable, intermediate, or interpreted code, which communicate over a network using a communication protocol. The computer implemented method and the FFTS 702 disclosed herein are not limited to be executable on any particular system or group of systems, and are not limited to any particular distributed architecture, network, or communication protocol.

The foregoing examples have been provided merely for the purpose of explanation and are in no way to be construed as limiting of the computer implemented method and the file format transformation system (FFTS) 702 disclosed herein. While the computer implemented method and the FFTS 702 have been described with reference to various embodiments, it is understood that the words, which have been used herein, are words of description and illustration, rather than words of limitation. Further, although the computer implemented method and the FFTS 702 have been described herein with reference to particular means, materials, and embodiments, the computer implemented method and the FFTS 702 are not intended to be limited to the particulars disclosed herein; rather, the computer implemented method and the FFTS 702 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the computer implemented method and the FFTS 702 disclosed herein in their aspects.

We claim:

1. A computer implemented method for transforming marked-up content in a first file format to a second file format that enables automated browser based pagination, said method employing a file format transformation system deployed on one of a client device and a server comprising at least one processor configured to execute computer program instructions for performing said method, said method comprising:
receiving said marked-up content of said first file format by said file format transformation system;
reflowing said received marked-up content of said first file format into a continuous page having a configurable page width by said file format transformation system;
identifying spaces and block elements in said reflown marked-up content of said first file format by said file format transformation system;
generating and appending tags to said identified spaces and said identified block elements in said reflown marked-up content of said first file format by said file format transformation system;
for each of said identified spaces and said identified block elements:
determining line breaks in said reflown marked-up content of said first file format based on preconfigured criteria associated with said appended tags by said file format transformation system and tagging said determined line breaks by said file format transformation system;
for each of said determined line breaks:
identifying anchored floats in said reflown marked-up content of said first file format by said file format transformation system and tagging said identified anchored floats by said file format transformation system;
positioning said tagged anchored floats on a current page by said file format transformation system based on availability of space for said tagged anchored floats on said current page;
identifying footnotes in said reflown marked-up content of said first file format by said file format transformation system and tagging said identified footnotes by said file format transformation system;
positioning said tagged footnotes at a footnote section on said current page by said file format transformation system based on availability of space for said tagged footnotes on said current page;
positioning page breaks in said continuous page by said file format transformation system based on a configurable page height and said determined line breaks for said positioning of said tagged anchored floats and said tagged footnotes on a subsequent page on non-availability of said space on said current page;
grouping said marked-up content with said positioned anchored floats and said positioned footnotes on each page by said file format transformation system; and
inserting one or more of a plurality of pagination elements on said each page containing said grouped marked-up content by said file format transformation system; and
rendering said grouped marked-up content with said inserted one or more of said pagination elements in said second file format based on a selected level of reversibility by said file format transformation system.

2. The computer implemented method of claim 1, wherein said second file format is one of a reversible file format, a partially reversible file format, and a non-reversible file format, and wherein said reversible file format allows said marked-up content to be reversed to said first file format to restore said continuous page.

3. The computer implemented method of claim 1, further comprising tracking positions of said identified anchored floats and said identified footnotes in said reflown marked-up content of said first file format, and positions of said page breaks in said continuous page prior to said grouping of said marked-up content and said insertion of said one or more of said pagination elements on said each page by said file format transformation system for rendering said grouped marked-up content with said inserted one or more of said pagination elements in said second file format based on said selected level of said reversibility.

4. The computer implemented method of claim 1, further comprising tracking positions of said inserted one or more of said pagination elements by said file format transformation system for rendering said grouped marked-up content with said inserted one or more of said pagination elements in said second file format based on said selected level of said reversibility.

5. The computer implemented method of claim 1, wherein said tagged anchored floats are positioned proximal to associated float citations on said current page based on said availability of said space for said tagged anchored floats on said current page.

6. The computer implemented method of claim 1, wherein said tagged footnotes are positioned proximal to associated footnote citations on said current page based on said availability of said space for said tagged footnotes on said current page.

7. The computer implemented method of claim 1, wherein said first file format is one of a hypertext markup language format, an extensible hypertext markup language format, and an extensible markup language format.

8. The computer implemented method of claim 1, wherein said determined line breaks retain integrity of said second file format by hyphenating and adjusting spaces in said rendered marked-up content.

9. The computer implemented method of claim 1, further comprising handling grouped elements comprising a float and a caption associated with said float in said second file format at a position assigned in said marked-up content of said first file format to said float by said file format transformation system.

10. The computer implemented method of claim 1, wherein said pagination elements comprise page numbers, a header, a footer, a footnote ruler, fillers, and any combination thereof.

11. The computer implemented method of claim 1, further comprising hyphenation and justification of said rendered marked-up content in said second file format by said file format transformation system to provide kerning based on aesthetics.

12. The computer implemented method of claim 1, wherein said rendered marked-up content in said second file format is accessible on a plurality of browsers on a plurality of operating systems.

13. A system for transforming marked-up content in a first file format to a second file format that enables automated browser based pagination, said system comprising:

a non-transitory computer readable storage medium for storing computer program instructions defined by modules of a file format transformation system;
at least one processor communicatively coupled to said non-transitory computer readable storage medium, said at least one processor configured to execute said defined computer program instructions; and
said file format transformation system deployed on one of a client device and a server, said file format transformation system comprising:
  a content reception module for receiving said marked-up content of said first file format;
  a content reflow module for reflowing said received marked-up content of said first file format into a continuous page having a configurable page width;
  a space and block identification module for identifying spaces and block elements in said reflown marked-up content of said first file format;
  a tagging module for generating and appending tags to said identified spaces and said identified block elements in said reflown marked-up content of said first file format;
  for each of said identified spaces and said identified block elements:
    a pagination element processing module for determining line breaks in said reflown marked-up content of said first file format based on preconfigured criteria associated with said appended tags, wherein said tagging module tags said determined line breaks;
    for each of said determined line breaks:
      said pagination element processing module for identifying anchored floats in said reflown marked-up content of said first file format, wherein said tagging module tags said identified anchored floats;
      said pagination element processing module for positioning said tagged anchored floats on a current page based on availability of space for said tagged anchored floats on said current page;
      said pagination element processing module for identifying footnotes in said reflown marked-up content of said first file format, wherein said tagging module tags said identified footnotes;
      said pagination element processing module for positioning said tagged footnotes at a footnote section on said current page based on availability of space for said tagged footnotes on said current page;
      said pagination element processing module for positioning page breaks in said continuous page based on a configurable page height and said determined line breaks for said positioning of said tagged anchored floats and said tagged footnotes on a subsequent page on non-availability of said space on said current page;
      a compiler for grouping said marked-up content with said positioned anchored floats and said positioned footnotes on each page; and
      said pagination element processing module for inserting one or more of a plurality of pagination elements on said each page containing said grouped marked-up content; and
said compiler for rendering said grouped marked-up content with said inserted one or more of said pagination elements in said second file format based on a selected level of reversibility.

14. The system of claim 13, wherein said second file format is one of a reversible file format, a partially reversible file format, and a non-reversible file format, and wherein said reversible file format allows said marked-up content to be reversed to said first file format to restore said continuous page.

15. The system of claim 13, wherein said file format transformation system further comprises a position tracking module for tracking positions of said identified anchored floats and said identified footnotes in said reflown marked-up content of said first file format, and positions of said page breaks in said continuous page prior to said grouping of said marked-up content and said insertion of said one or more of said pagination elements on said each page for rendering said grouped marked-up content with said inserted one or more of said pagination elements in said second file format based on said selected level of said reversibility.

16. The system of claim 13, wherein said file format transformation system further comprises a position tracking module for tracking positions of said inserted one or more of said pagination elements for rendering said grouped marked-up content with said inserted one or more of said pagination elements in said second file format based on said selected level of said reversibility.

17. The system of claim 13, wherein said pagination element processing module positions said tagged anchored floats proximal to associated float citations on said current page based on said availability of said space for said tagged anchored floats on said current page.

18. The system of claim 13, wherein said pagination element processing module positions said tagged footnotes proximal to associated footnote citations on said current page based on said availability of said space for said tagged footnotes on said current page.

19. The system of claim 13, wherein said first file format is one of a hypertext markup language format, an extensible hypertext markup language format, and an extensible markup language format.

20. The system of claim 13, wherein said pagination element processing module handles grouped elements comprising a float and a caption associated with said float in said second file format at a position assigned in said marked-up content of said first file format to said float.

21. The system of claim 13, wherein said pagination elements comprise page numbers, a header, a footer, a footnote ruler, fillers, and any combination thereof.

22. A non-transitory computer readable storage medium having embodied thereon, computer program codes comprising instructions executable by at least one processor for transforming marked-up content in a first file format to a second file format that enables automated browser based pagination, said computer program codes comprising:
  a first computer program code for receiving said marked-up content of said first file format;
  a second computer program code for reflowing said received marked-up content of said first file format into a continuous page having a configurable page width;
  a third computer program code for identifying spaces and block elements in said reflown marked-up content of said first file format;
  a fourth computer program code for generating and appending tags to said identified spaces and said identified block elements in said reflown marked-up content of said first file format;
  for each of said identified spaces and said identified block elements:

a fifth computer program code for determining line breaks in said reflown marked-up content of said first file format based on preconfigured criteria associated with said appended tags and a sixth computer program code for tagging said determined line breaks; for each of said determined line breaks:

- a seventh computer program code for identifying anchored floats in said reflown marked-up content of said first file format and an eight computer program code for tagging said identified anchored floats;
- a ninth computer program code for positioning said tagged anchored floats on a current page based on availability of space for said tagged anchored floats on said current page;
- a tenth computer program code for identifying footnotes in said reflown marked-up content of said first file format and an eleventh computer program code for tagging said identified footnotes;
- a twelfth computer program code for positioning said tagged footnotes at a footnote section on said current page based on availability of space for said tagged footnotes on said current page;
- a thirteenth computer program code for positioning page breaks in said continuous page based on a configurable page height and said determined line breaks for said positioning of said tagged anchored floats and said tagged footnotes on a subsequent page on non-availability of said space on said current page;
- a fourteenth computer program code for grouping said marked-up content with said positioned anchored floats and said positioned footnotes on each page; and
- a fifteenth computer program code for inserting one or more of a plurality of pagination elements on said each page containing said grouped marked-up content; and
- a sixteenth computer program code for rendering said grouped marked-up content with said inserted one or more of said pagination elements in said second file format based on a selected level of reversibility.

23. The non-transitory computer readable storage medium of claim 22, wherein said second file format is one of a reversible file format, a partially reversible file format, and a non-reversible file format, and wherein said reversible file format allows said marked-up content to be reversed to said first file format to restore said continuous page.

24. The non-transitory computer readable storage medium of claim 22, wherein said computer program codes further comprise a seventeenth computer program code for tracking positions of said identified anchored floats and said identified footnotes in said reflown marked-up content of said first file format, and positions of said page breaks in said continuous page prior to said grouping of said marked-up content and said insertion of said one or more of said pagination elements on said each page for rendering said grouped marked-up content with said inserted one or more of said pagination elements in said second file format based on said selected level of said reversibility.

25. The non-transitory computer readable storage medium of claim 22, wherein said computer program codes further comprise an eighteenth computer program code for tracking positions of said inserted one or more of said pagination elements for rendering said grouped marked-up content with said inserted one or more of said pagination elements in said second file format based on said selected level of said reversibility.

* * * * *